(12) United States Patent
Bol'shakov et al.

(10) Patent No.: US 11,835,464 B1
(45) Date of Patent: Dec. 5, 2023

(54) LASER INDUCED BREAKDOWN SPECTROSCOPY OF LIQUID

(71) Applicant: Applied Spectra, Inc.

(72) Inventors: Alexander A. Bol'shakov, Union City, CA (US); Chunyi Liu, Fremont, CA (US); Sudeep J. Pandey, Sacramento, CA (US); Richard E. Russo, Walnut Creek, CA (US)

(73) Assignee: Applied Spectra, INC., West Sacramento, CA (US)

( * ) Notice: Subject to any disclaimer, the term of this patent is extended or adjusted under 35 U.S.C. 154(b) by 0 days.

(21) Appl. No.: 17/672,678

(22) Filed: Feb. 15, 2022

Related U.S. Application Data

(63) Continuation-in-part of application No. 17/073,292, filed on Oct. 16, 2020, now Pat. No. 11,247,295.

(60) Provisional application No. 62/915,653, filed on Oct. 16, 2019.

(51) Int. Cl.
    *G01N 21/71*      (2006.01)

(52) U.S. Cl.
    CPC ... *G01N 21/718* (2013.01); *G01N 2201/0636* (2013.01); *G01N 2201/06113* (2013.01); *G01N 2201/08* (2013.01)

(58) Field of Classification Search
    CPC .... G01N 21/718; G01N 21/714; H01J 49/105
    See application file for complete search history.

(56) References Cited

U.S. PATENT DOCUMENTS 6,359,687 B1 * 3/2002 Cheng ............... G01N 21/718
                                                             356/318

FOREIGN PATENT DOCUMENTS

| CN | 107907530 A | * | 4/2018 | |
|---|---|---|---|---|
| CN | 109085151 A | * | 12/2018 | ........ G01N 21/658 |
| CN | 109540295 A | * | 3/2019 | ........ G01J 3/02 |
| DE | 112013004973 T5 | * | 8/2015 | ........ B05B 17/0607 |
| KR | 20160065033 A | * | 6/2016 | ........ E21B 49/08 |

OTHER PUBLICATIONS

Dr. Mike Brown, "An Evaluation of Femtosecond/nanosecond Laser Induced Breakdown Spectroscopy (LIBS) for Measuring Total Particulate Emissions", May 2009 (Year: 2009).*

Akshaya Kumar, "Detection of trace elements in liquids by laser-induced breakdown spectroscopy with a Meinhard nebulizer", 2003 (Year: 2003).*

(Continued)

*Primary Examiner* — Maurice C Smith
(74) *Attorney, Agent, or Firm* — Microtechnology Law & Analysis; Daniel L. Flamm

(57) ABSTRACT

Chemical composition of liquid phase samples is determined based on laser induced ablation spectroscopy of droplets. An aerosol jet comprising a carrier gas and liquid phase sample droplets, less than about 10 microns in diameter, is formed. An emissive plasma plume is generated from the sample droplets using a pulsed laser to deposit energy at a focal point in the aerosol jet. Light from the plasma plume is gathered with a concave mirror and focused into one end of a fiber optic lightguide. The lightguide can transmit spectral emissions from the plume to a spectrometer/detector which can send wavelength and intensity values to a computer. The computer is operable to determine a liquid sample composition based on the wavelength and intensity values.

4 Claims, 31 Drawing Sheets

(56) References Cited

OTHER PUBLICATIONS

"A hydrogel-based solidification method for the direct analysis of liquid samples by laser-induced breakdown spectroscopy", Anal. At. Spectrom., 2017 (Year: 2017).*

Marmatakis, "Elemental and molecular analysis of metal containing biomolecules using laser induced breakdown spectroscopy and sonic spray ionization mass spectrometry: A step towards full integration and simultaneous analysis", Oct. 28, 2016 (Year: 2016).*

* cited by examiner

| Element | ICP-OES oil | LIBS-Ar aqueous | LIBS-Ar oil (a) | LIBS-N$_2$ oil (b) | LIBS-N$_2$ oil (c) |
|---|---|---|---|---|---|
| Aluminum | 6 | | 0.47 | 0.49 | 1.4 |
| Barium | 0.5 | 1.5 | 1.0 | | |
| Boron | 4 | | 0.44 | | |
| Calcium | 40 | 0.4 | 1.7 | | |
| Chromium | 1 | 5.8 | 0.6 | 0.5 | 1.5 |
| Cobalt | - | 8.8 | | | |
| Copper | 2 | 6.0 | 0.10 | 0.11 | 0.18 |
| Iron | 2 | 14 | 0.94 | 0.52 | 1.2 |
| Lead | 10 | 40 | 7.0 | 10 | 9.6 |
| Lithium | - | 0.2 | 0.04 | 0.01 | 0.1 |
| Magnesium | 5 | 0.16 | 0.03 | 0.02 | 0.04 |
| Manganese | 5 | 2.7 | 0.39 | | |
| Mercury | - | | 10 | | |
| Nickel | 5 | | 1.4 | 1.4 | 1.5 |
| Phosphorus | 10 | | 8 | | |
| Potassium | 40 | 11 | 0.4 | 1.6 | 1.7 |
| Silicon | 8 | | 0.6 | 0.8 | |
| Silver | 0.5 | | 0.37 | 0.2 | |
| Sodium | 7 | 1.6 | 0.36 | 0.2 | 0.2 |
| Strontium | - | 0.44 | | | |
| Tin | 10 | | 2.0 | 3.2 | 3.6 |
| Titanium | 5 | | 0.17 | 0.24 | |
| Vanadium | 1 | | 0.6 | 0.27 | 0.7 |
| Zinc | 60 | 6.2 | 0.31 | | 0.2 |

FIG. 17

| Organic samples | Mg(ppm) | Mg 279.5 nm Avg | Mg 279.5 nm SD | Mg predicted |
|---|---|---|---|---|
| S1 | 1.8 | 102503.3 | 3009.21 | 1.78 |
| S2 | 7.7 | 547195.6 | 12482.83 | 9.75 |
| S3 | 6.1 | 400526.1 | 13162.73 | 7.12 |
| S4 | 6.6 | 443573.8 | 11215.88 | 7.89 |
| S5 | 8.4 | 602147.7 | 16081.67 | 10.73 |

FIG. 22

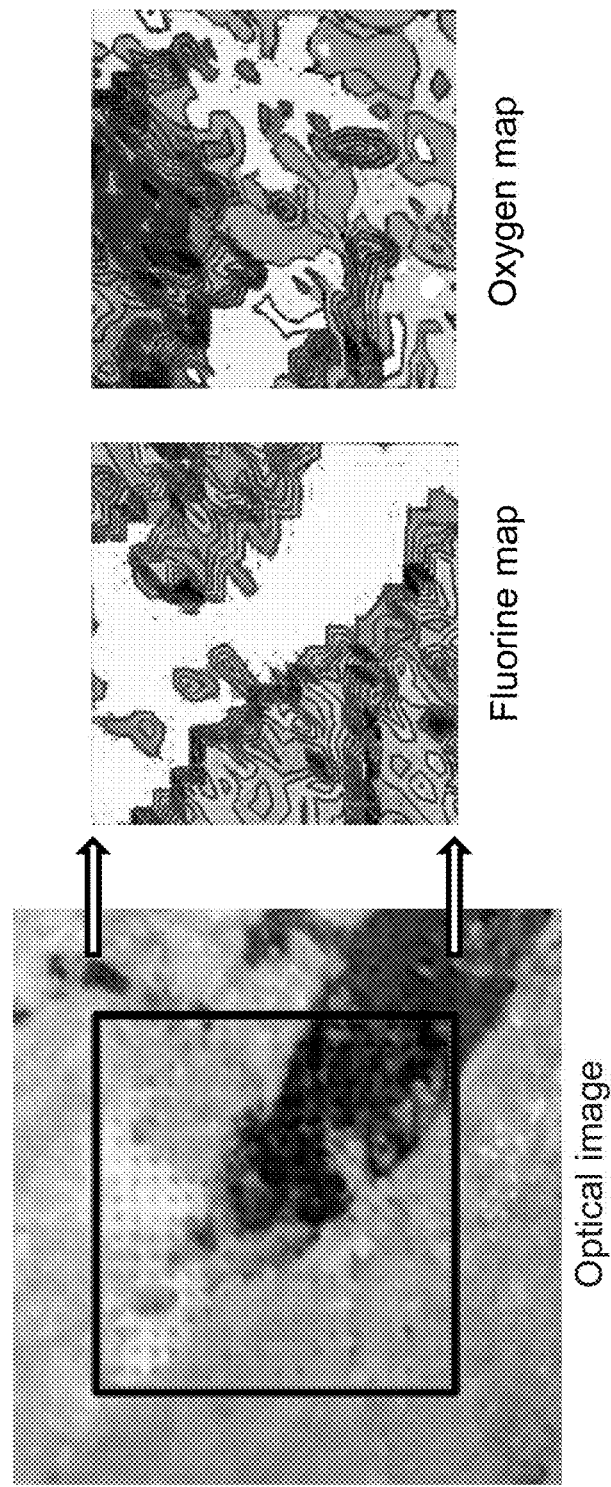

LASER INDUCED BREAKDOWN SPECTROSCOPY OF LIQUID

CROSS-REFERENCES TO RELATED APPLICATIONS

This present application is a continuation-in-part of pending application U.S. patent application Ser. No. 17/072,292 filed Oct. 16, 2020, which claims the benefit of U.S. Provisional Application No. 62/915,653 filed Oct. 16, 2019, all of which are hereby incorporated by reference in their entirety for all purposes.

This invention was made with government support under DE-SC0015804 awarded by the Department of Energy. The government has certain rights in the invention.

FIELD OF THE INVENTION

The present disclosure relates generally to the art of chemical analysis, and more particularly relates to improved apparatus and methods for determining the composition of liquid samples using laser induced ablation spectroscopy.

BACKGROUND

Elemental composition analysis is essential to determine the safety and quality of products in various industries including petroleum, cosmetics, metallurgy, recycling, mining, pharmaceutical, medical, food industry, and others. However, relatively few low cost, rapid, reliable, and practical instruments and methods are available that can perform elemental composition analysis of samples comprising diverse phases, material characteristics, and sample geometries.

Laser induced breakdown optical emission spectroscopy (LIBS) as well as other laser ablation spectrometry methods can be used to verify and/or analyze the composition of a wide variety of products, materials, and compositions. Although laser ablation analysis has gained commercial acceptance, prior art LIBS has often shown excessive variability. A major source of this variability has been inconsistent laser pulse plasma plume generation. LIBS analyses have often failed to match known standards with the level of accuracy routinely achieved using alternative analytical methods.

Traditional chemical analysis has traditionally been based on various standard methods in which each method was suitable for, or sufficiently sensitive to measure only a relatively small number of elements. General multi-element analysis providing sub-ppm (sub-part-per-million) detection limits for metals can be performed using inductively coupled plasma-optical emission spectrometry (ICP-OES) based ultraviolet spectral region. However, this ICP-OES requires complex sample preparation including acid digestion of samples, as well as sophisticated equipment, fast flow of high-purity argon, quartz/glassware and expensive consumables. The process generates hazardous chemical waste that must be disposed after an ICP measurement. Lengthy sample handling, high power requirements (~3 kW) and large equipment dimensions have impeded the use of ICP-OES for rapid field measurement of species found in petroleum sources. ICP operation has not been adaptable to be performed outside of a laboratory environment.

LIBS is particularly sensitive to light elements and halogens (e.g. Hydrogen (H), Lithium (Li), Beryllium (Be), Boron (B), Carbon (C), Oxygen (O), Nitrogen (N), Fluorine (F), and Chlorine (Cl) which are difficult or impossible to measure with adequate sensitivity using conventional and/or more costly instrumental techniques such as ICP-OES and inductively coupled plasma mass spectrometry (ICPMS). As regards commercial instruments in industrial applications however, LIBS has only been used to perform solid sample analysis despite a long history of prior art attempts to develop practical apparatus and methods that might provide useful elemental analysis of a liquid phase using LIBS.

In principle, LIBS would be extraordinarily useful to determine the elemental composition of materials in the solid or liquid phase. A commercial LIBS instrument operable to reliably analyze liquids could improve refinery manufacturing by eliminating lag times and providing the both major and minor and trace element compositions in petroleum fractions and fuels. The composition of petroleum feedstock, particularly metals content, is a critical factor in deciding how a specific lot of crude oil is used and the specific refining requirements. Various crude oils have very different composition, and these differences critically affect the refining methods that are used to produce fuels and other petroleum and petrochemical products. Crude petroleum contains traces of inorganic salts, nitrogen, oxygen, sulfur, halogens and metals. For example, vanadium (V), nickel (Ni), iron (Fe), and sodium (Na) are often major metallic constituents of crude oil. Other metals can be unintentionally introduced during production, transportation and storage. As well, halide impurities such as salts, when present, can hydrolyze to form highly corrosive acids. Even trace amounts of such elements can impair refining. LIBS has been well suited to determining these elements in a solid.

LIBS analysis of liquid phase samples has been difficult for a number of reasons. Depending somewhat on the sample liquid volatility and surface tension, liquids can adhere to, coat, and/or form droplets attaching to optical and/or other elements of the apparatus. Liquid analysis using LIBS requires that a liquid to be rapidly vaporized using one or more laser pulses. However, rapid laser vaporization has resulted in an uncontrolled formation of wide size and density distributions of droplets and/or uncontrolled liquid drops splashing and/or wetting optical components, depending on containment and/or amounts and flows of liquid during the vaporization process. Fine liquid mists, droplets, and/or condensate generally scatter light, cause uncontrolled light scattering, blur, and spoil focus of optical elements, and/or otherwise disturb optical alignment, transmission, and/or other aspects of light collection which thereby degrades analytical sensitivity and stability. These phenomena have made constant cleaning mandatory even for even intermittent operation. For at least these reasons, it has been prohibitively difficult and/or impossible to sustain reliable LIBS analysis of a liquid.

Prior art attempts to use LIBS for measuring elemental composition of a liquid in a laboratory have shown poor sensitivity and accuracy and have been relatively complex and difficult to perform. For example, Lin et al. first transformed a liquid into a solid phase using a using a laborious hydrogel-based solidification technique before performing LIBS on the solid (Lin et al. "A hydrogel-based solidification method for the direct analysis of liquid samples by laser-induced breakdown spectroscopy" in Journal of Analytical Atomic Spectrometry, 32(7), 1412-1419, 2017).

Cheng (U.S. Pat. No. 6,359,687) discloses an aerosol generator for LIBS analysis. However, Cheng's apparatus produced weak signals and the design suffered from molecular continuum and atomic line interferences, and low excitation efficiency and sensitivity. Kumar et. al. (Detection of trace elements in liquids by laser-induced breakdown spectroscopy with a Meinhard nebulizer", Appl. Optics, Vol. 42, 6040, October 2003) teach using a Meinhard nebulizer to emit a downward flowing aerosol. Kumar used a wide droplet size distribution comprising many large droplets that resisted evaporation and/or plasma plume formation. These large droplets also tended to defocus deflect, and scatter the laser ablation beam.

It can be seen that there has long felt, unmet need for commercial analytical instruments capable of performing LIBS analysis of a liquid. Furthermore, there has long been need for a single analytical instrument operable to perform such analyses of both liquid and solid samples. More particularly, there has been a need for a single, readily transportable analytical instrument with these capabilities in the petroleum, aviation, semiconductor, metallurgy, recycling, mining, pharmaceutical, medical, and food industries. Prior art attempts to provide methods and apparatus operable to perform reliable, low maintenance, real-time, automated analysis, of liquids with LIBS have been unsuccessful, and no LIBS instruments and/or methods for analysis of liquid samples have found commercial success.

SUMMARY

In a first aspect of the present disclosure, a laser ablation spectroscopy apparatus is provided. A pulsed laser is focused on a sample site to generate a plasma plume during a laser ablation process. The plasma plume can be detected with an optical spectrometer having an intensified charge coupled device. A sample of material is coupled to a stage movable in independent x, y and z directions using an array of x-y-z motors. A change in the height of the sample is detected using a sensor. Preferably, the sensor is a triangulation sensor. The apparatus includes a system computer for synchronizing the movement of the stage in the x, y and z direction during the laser ablation process. The height of the sample site can be automatically adjusted following each laser ablation. In one embodiment, the system computer includes a controller, application software and a graphical user interface (GUI).

In another aspect of the present disclosure, a method of laser ablation spectroscopy is provided. The method includes a protocol of generating one or more laser ablations to a sample site. The spectral data of the individual laser ablation sites can be used to form a chemical map of the sample surface or the total number of laser ablations for the sites can be averaged together. In some embodiments, the total number of laser ablations for a sample site equals three laser ablations. The protocol includes laser ablating additional sample sites and averaging the spectral data of the total number of sample sites. In some embodiments, there can be more than 30,000 sample sites.

An innovative aspect of the subject matter described in this disclosure is an implementation of a laser induced breakdown spectroscopy apparatus for liquid and solid samples that provide quantitative data with high accuracy, sensitivity and reproducibility. Furthermore, the disclosed LIBS apparatus can be designed as a compact and portable single instrument comprising modular units effectuating measurement and detection of trace elements along with minor and major elemental composition of any liquid and/or solid samples. Another embodiment is a single LIBS instrument capable of measuring every element of the Periodic chart that has a known optical spectrum simultaneously.

The present disclosure provides a novel apparatus for performing rapid chemical analysis of liquid samples using laser induced breakdown spectroscopy (LIBS). The apparatus includes a pulsed laser, a pump to introduce liquid sample material, a nebulizer to generate an aerosolized portion of the liquid, means to confine and/or control a flow pattern of the gaseous aerosol, and means to exhaust and/or collect the aerosol. The apparatus also comprises an optical system that can steer and/or focus a laser beam to a predetermined location in the aerosol flow to produce an emissive plasma plume comprising the aerosolized sample material. There is also an optical system that can gather a portion of the characteristic light emitted from the plume and couple said light into one of more spectrographs having respective detectors. A predetermined combination of a spectrograph and a detector are configured to measure spectral data and generate intensity values, wavelength values and composition values of one or more elements of the sample optimally. The spectrograph can have a scanning single channel configuration, a cross-dispersion echelle configuration, or a multi-channel configuration of several spectrographs. The detector can be a high speed triggered/gated detector (e.g. CCD or CMOS camera), a high-speed intensified detector (e.g. ICCD), an electron multiplying charge coupled device (EMCCD), or an arrangement of several photomultipliers. A predetermined set of a spectrograph with a detector for analysis of both liquid and solid samples can be same or different depending on the applications.

Another aspect of the present disclosure includes a novel method of measuring major, minor and trace elements in liquid samples using the LIBS apparatus. The method includes generating a narrow stream of aerosol from a portion of a liquid sample which is carried by a flow of a carrier gas such as air, nitrogen and/or any inert gas selected based on the characteristics of the sample and the types of elements being detected. A laser beam with a preselected power, frequency, and duration, and wavelength values is directed to and focused in a preselected region of the aerosol jet, which generates a luminous plasma plume comprising an atomized, partially ionized, and optically excited molecular species of the sample material. The emission spectra from the aerosolized sample material is recorded by a device preferably an optical spectrograph including an ICCD, EMCCD, CMOS or CCD detector(s) which digitizes the spectral data for further computational analysis in real time. The optical spectrum provides a signature of the chemical species present in the sample. Then the concentrations of one or more specific chemical species in the sample are quantified using previously known standard reference spectra.

Extremely viscous liquids and/or fluids that cannot be aerosolized can be analyzed within a time scale during which they are substantially equivalent to solid samples. It has been found that sufficiently high viscosity materials do not splash during laser ablation. These materials can be analyzed is the same manner as "solids". In practice, depending on the viscosity, it may be convenient or necessary to put the highly viscous material in a small container such as a beaker, or other container that can in turn be on the solid sample stage within the LIBS apparatus. Venezuelan crude oil such as the NIST research material RM-8505 is an example of a viscous material that can be measured as if it were a solid sample, thus requiring no sample preparation (e.g. dissolving and/or diluting of viscous sample materials). It was observed that laser ablation events produce voids (e.g. "craters") on the surface of Venezuelan crude oil in a container. Such craters persist longer than 30 seconds before the surface of the viscous crude is restored by gravity and surface tension.

The present disclosure also includes various embodiments for performing rapid chemical imaging of any solid samples in 2D and 3D using the LIBS described herein. The embodiments provide a 2D and/or 3D elemental composition of a solid sample by mapping and effectuating LIBS analysis of a series of preselected sample sites in x, y and z axes, quantifying and compiling these chemical composition data. The solid samples are placed in a chamber operable to move in x, y and z axes independently using translation motors. The sample chamber is built with a transparent window through which a collimated laser beam passes to ablate a preselected specific site of the sample. A compact CMOS camera provides magnified images of the sample surface for visual inspection, monitoring and controlling the movement of the sample. Furthermore, a triangulation sensor detects and measures exact position of the sample surface. Using the signal from the triangulation sensor, an ablating laser beam can be focused on a preselected sample site on the sample surface automatically. The sample surface can be flat and/or curved. The sample chamber has an inlet and outlet openings allowing the flow of an unreactive carrier gas such as Nitrogen ($N_2$), Argon (Ar), Helium (He), and/or air through. The preselected gas carrier gas flow rate is controlled preferably by a mass flow controller. The apparatus includes a system computer with operation software that controls all working functions of the instrument and through which a preselected protocol depending on the application can be entered and executed to generate a 3D chemical imaging of a solid sample.

The present disclosure also compromises a novel method for detecting and measuring major, minor and trace elements in solid samples with high spatial resolution in 2D and/or 3D using the LIBS described herein. The method includes a protocol of generating on a sample site at least one laser ablation or a series of ablations in a predetermined pattern, for example a grid of sample sites on the surface of a solid sample and at a specific depth of a sample sensed by a triangulation sensor. The spectral data of the individual laser ablation events can be used to form a chemical image of the sample and/or the spectra from any number of laser ablations can be summed up together for averaging depending on the structure and the material of the sample. Lateral resolution of the resulting chemical image is determined by a preselected ablation spot size and a pattern used. Depth resolution is determined by preselected energy of laser pulses and a sample material. In some embodiments, there can be more than 10000 sample ablation events to construct such as a chemical image of a solid sample.

Further aspects of the present disclosure include novel methods for measuring elemental composition of samples which are significantly smaller than a laser spot size on the sample site, particularly analysis of samples with sub-micron (<1 mm) sizes and sub-nanogram (<1 ng) masses. Examples of such samples can include individual solid particles on a substrate such as filter paper, swipes, adhesive tape, or other surfaces. The sample can be prepared by embedding of the minute sample in ice and/or other types of matrix materials to detect specific individual particles using high spatial resolution LIBS. Additionally, biological tissue samples can be prepared by administration of nanoparticles-based biomarkers and the distribution and interaction of the biomarker in the tissue can be analyzed using LIBS precisely. The disclosed method includes means of navigating through an embedded sample surface images to place an inspected particle into a laser spot, and obliterating the whole particle located in a laser spot with a single laser pulse to obtain a spectrum corresponding to the select particle. Sensitivity of this method meets that of ICP-MS, which can measure only average elemental concentrations of all particles from an acid-digested macroscopic sample.

Further embodiments included in the present disclosure are the capabilities of LIBS fully automated mode of all operations and the real time computational analysis of digital spectral data to identify at least partially chemical composition and characterize the elemental composition of a plurality of sample forms. The computational methods enabling real time analysis of elemental composition include quantifying the elements according to the known spectral standards, and performing explorative (visualization), qualitative (classification), or quantitative (calibration) statistical analysis. One protocol to quantify emission spectra data includes univariate calibration using standard reference materials and/or the calibration standards directly added to the aliquots of analyzed sample (standard additions) depending on the applications. The spectral analysis protocol is performed using statistical analysis methods often referred to as "chemometric analysis" or "chemometrics". The chemometric algorithms are operable to compare a real-time measured spectrum to the spectra stored in a reference database in memory of a system computer. This method allows users to detect, identify, and quantify chemical elements present in a sample using an automated mode of operation. Accordingly, simplified operation showing symbolic red, amber or green "lights" can be realized for rapid monitoring or quality control of the samples. Alternatively, all generated and calibrated spectral data, and/or elemental concentrations can be presented on a graphical user interface.

Some embodiments include a true universal LIBS analyzer that can measure the elemental composition, major, minor and trace elements in any solid or liquid sample. The disclosed apparatus requires only about 750 µl of a liquid sample, or only a few nanogram of solid sample, consumes only low power (<400W) and generates no acidic waste. The capability of LIBS to measure major elements within most materials, particularly of organic materials comprising Carbon (C), Hydrogen (H), Oxygen (O), and/or Nitrogen (N) facilitates normalization and correction of signals from the trace elements on the distribution of major matrix elements to improve accuracy and precision of quantitative analysis. This is especially important for heterogeneous matrices and matrices of variable density, such as biological matrices.

Various further embodiments include a laser ablation analysis instrument operable to determine a quantitative elemental chemical composition of liquid phase and/or solid phase samples using laser induced breakdown spectroscopy. The instrument can include a movable stage operable to support the solid phase sample; a gas flow system operable to supply a stream of a carrier gas, and a nebulizer operable to aerosolize a portion of the liquid phase sample into the carrier gas to produce an aerosol jet comprising the portion of the liquid phase sample to perform laser induced breakdown of material from the liquid phase sample. There can also be a single laser operable to emit a plurality of individual laser light pulses less than 100 ns in duration within a time interval of one second wherein the pulses are operable to be focused and ablate solid phase material from a site on the solid phase sample into a luminous plasma plume, and/or vaporize aerosolized liquid phase material proximate to a laser focus location in the aerosol jet into a luminous plasma plume; a moveable mirror operable to move to a first position where it does not intercept a first optical path from the single laser to a first plume location, and operable to move to an alternate second position in an alternate second optical path from the single laser to a second plume location In this embodiment, the first plume location is a location selected from the group consisting of a location adjacent to the site on the solid phase material sample and the laser focus location in the aerosol jet, and the second plume location is the other member of said group. Furthermore, there can be a detector coupled to a spectrometer, the spectrometer and detector being configured to receive electromagnetic radiation emanating from the plasma plume and to detect intensity and wavelength values of the electromagnetic radiation; and a computer operable to receive the wavelength and the intensity values from the detector and spectrometer, determine a representation of a sample composition based on the received wavelength and the intensity values, and output and/or record the representation and/or wavelength and intensity values.

Another aspect is an apparatus operable to analyze a composition of a liquid phase sample by aerosolizing a portion of the liquid sample and using laser induced ablation spectroscopy to analyze the aerosolized liquid sample portion. The apparatus comprises a laser operable to emit a plurality of individual laser light pulses less than 100 ns in duration within a time interval of one second, wherein each of the pulses is operable to be focused and produce a luminous plasma plume comprising a composition of liquid sample aerosol surrounding the focal point; an aerosol jet source operable to receive a flow of a pressurized carrier gas and a flow of the liquid phase sample, and emanate an aerosol jet from an orifice of the aerosol jet source in a vertical direction selected from the group consisting of upward and downward vertical directions, wherein the aerosol jet contains the pressurized carrier gas and aerosol droplets no larger than 10 micrometers comprising the liquid sample portion, and the diameter of the aerosol jet diameter is less than 130 percent of the orifice diameter while flowing a distance of at least five orifice diameters from orifice. The embodiment further includes means for sending the plurality of individual laser light pulses along an optical path and directing each of the pulses to a preselected focal point above the orifice within the aerosol jet stream, wherein each of the pulses is operable to produce a luminous plasma plume comprising the composition of aerosolized liquid sample surrounding the focal point; and means for gathering light emanating from the luminous plasma plume into the proximal end of a fiber optic lightguide. It also has a fiber optic lightguide having a proximal end configured to receive the gathered light from the luminous plasma plume couple at least a portion of the light into a spectrometer from a distal end; an optical spectrometer comprising a detector, configured to receive at least a portion of the gathered plasma plume light from the distal end of the fiber optic lightguide and detect intensity and wavelength values of the light; and a system computer comprising tangible media having data and instructions operable to receive a signal to analyze the composition of the liquid phase sample from a human interface, receive the wavelength and intensity values from the spectrometer, and determine a representation of the liquid phase sample composition based on the wavelength and intensity values. Furthermore, it has means for capturing the entire portion of the liquid phase sample in the aerosol jet and removing said entire portion of liquid phase sample from the apparatus; and means for simultaneously supplying the flow of the pressurized carrier gas and the flow of the liquid phase sample material to the aerosol jet source.

In some embodiments of the forementioned apparatus, the vertical direction is upward, the aerosol jet diameter is less than 120 percent of the orifice diameter within a distance of at least 20 orifice diameters over the orifice, and the laser focal point position is less than 10 orifice diameters above the orifice. In still further embodiments, the vertical direction can be downward.

In yet still further embodiments, the aerosol jet diameter can be less than 150 percent of the orifice diameter while flowing up to a distance of at least five orifice diameters from orifice. In some aspects, the aerosol jet maintains a substantially constant diameter when flowing from an initial position about 1 orifice diameter from the AJS orifice to a position at least 20 orifice diameters from that initial position.

Other features will become apparent from consideration of the following description taken in conjunction with the accompanying drawings.

BRIEF DESCRIPTION OF DRAWINGS

Various embodiments are illustrated in an exemplary manner by the accompanying drawings. The drawings and accompanying description should be understood to explain principles of the embodiments rather than be limiting. Other embodiments will become apparent from the description and the drawings:

FIG. 1 is a simplified diagram of a laser ablation apparatus embodiment.

FIG. 1A is another diagram of a laser ablation apparatus embodiment.

FIG. 2 illustrates a detail of a laser ablation graphical user interface.

FIG. 3 illustrates a plan view of a testing protocol.

FIGS. 4A and 4B illustrate side views of a topology of a sample according to an embodiment.

FIG. 5 illustrates a plot of spectral information according to an embodiment.

FIG. 6 illustrates a plot of intensities of known standards according to an embodiment.

FIG. 7 illustrates a process flow diagram for a method of ablating.

FIG. 8 is a simplified diagram of apparatus for laser induced ablation spectral analysis including LIBS and LA-ICP-MS.

FIG. 9 is a simplified diagram of apparatus for laser induced ablation spectroscopic analysis comprising collection optics modules and fiber bundles to couple optical emission to spectrometers.

FIG. 10 is a simplified diagram showing an apparatus for LIBS having optical collection modules and lightguides for an internal and optional spectrometer modules.

FIG. 11 is a simplified diagram of apparatus for laser induced ablation spectroscopic analysis for LIBS having one optical collection module coupled to an optical fiber bundle having split ends for an internal spectrometer and an optional spectrometer module.

FIG. 12A is an isometric view of an optical frame for a LIBS apparatus.

FIG. 12B is an overhead view of the optical frame shown in FIG. 12A.

FIG. 13A is a side view of the optical frame shown in FIGS. 12A and 12B.

FIG. 13B is a simplified diagram of an apparatus for liquid LIBS analysis.

FIG. 14A is an overview of an embodiment of a liquid LIBS apparatus.

FIG. 14B is a side view of the liquid LIBS apparatus shown in FIG. 14A.

FIG. 14C is a top view of the liquid LIBS apparatus shown in FIG. 14A.

FIG. 15A has a photo showing an aerosol jet source and various optical components in a liquid LIBS embodiment.

Figure 16A:
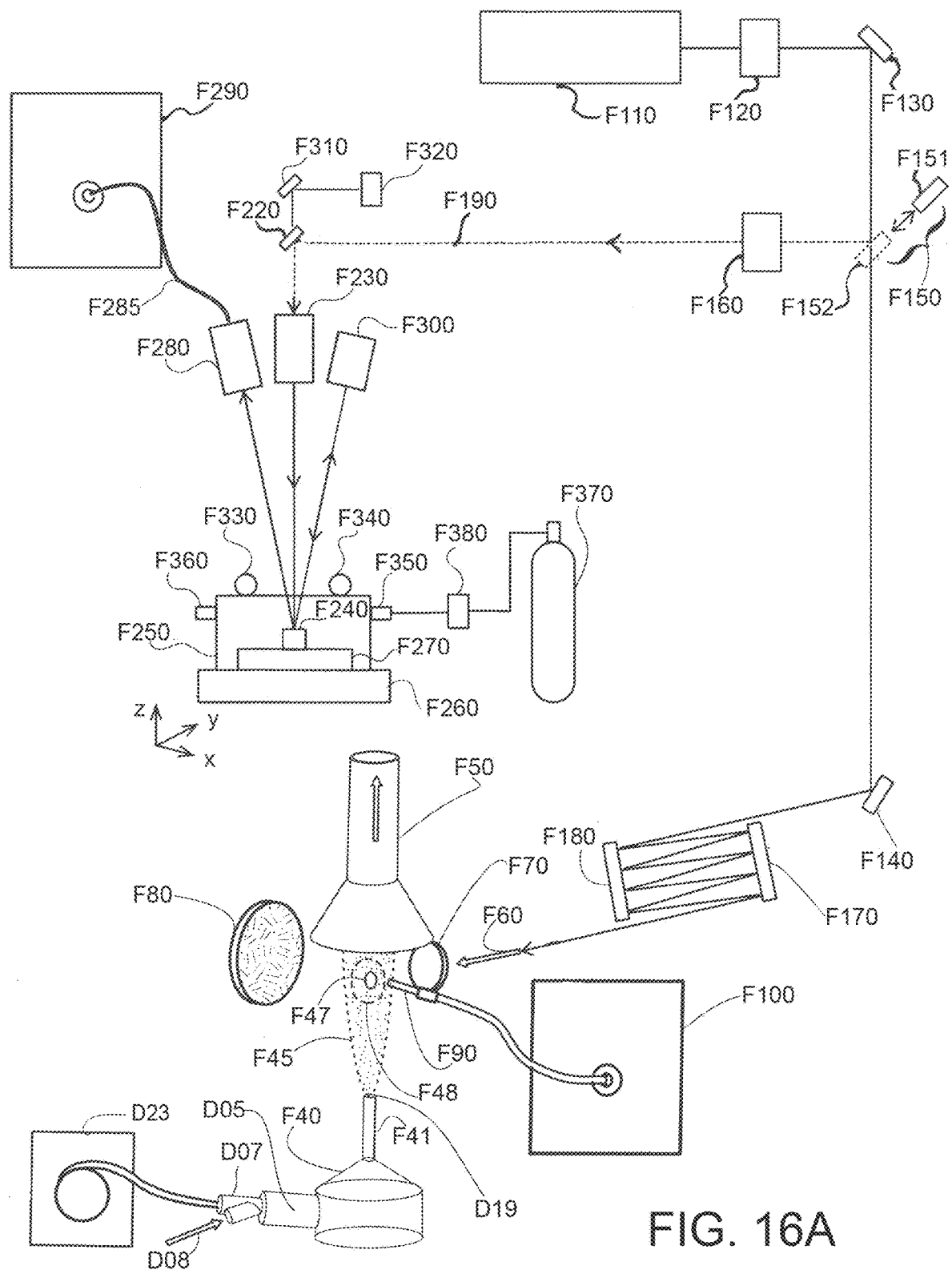

FIG. 16A has a simplified diagram of an embodiment for analysis of a liquid or a solid sample.

Figure 16B:
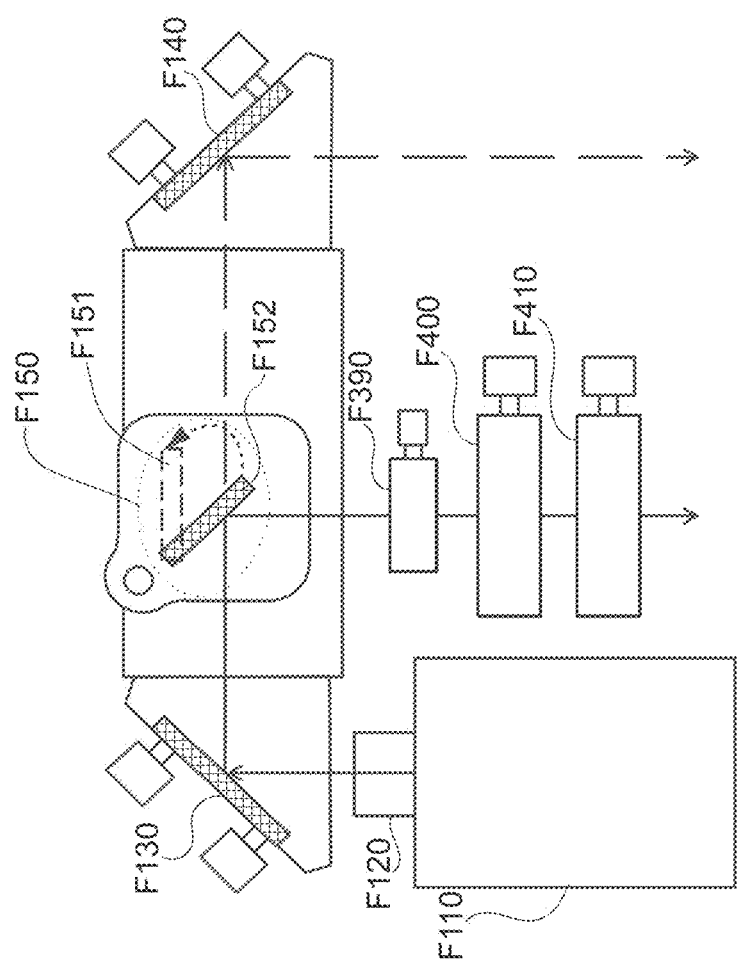

FIG. 16B is a simplified diagram showing optical elements in an embodiment for redirecting a laser beam from a liquid analysis configuration to a solid sample analysis configuration as depicted generally in FIG. 16A.

FIG. 17 shows lower limits of detection for elements in aqueous or nonaqueous solutions in an ICP-OES analysis and using an embodiment of the disclosed LIBS apparatus.

Figure 18:
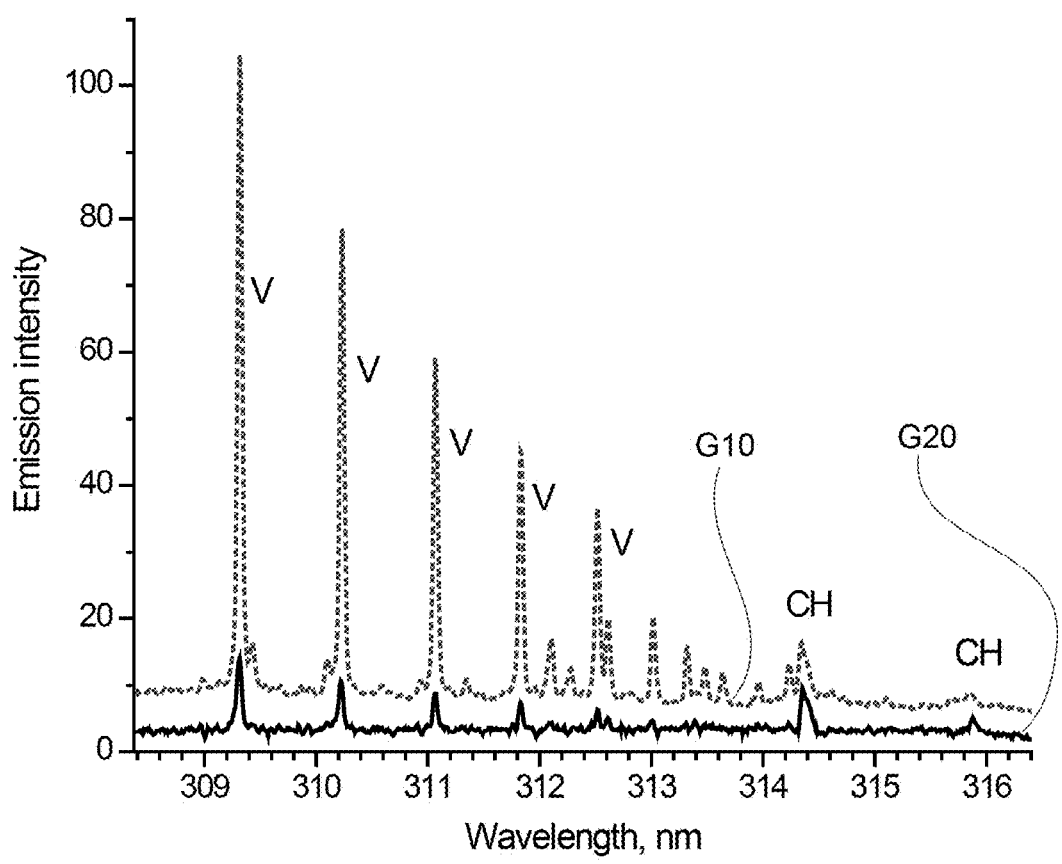

FIG. 18 shows spectra of high viscosity NIST reference materials RM-8505 and SRM-1634c in an embodiment.

Figure 19:
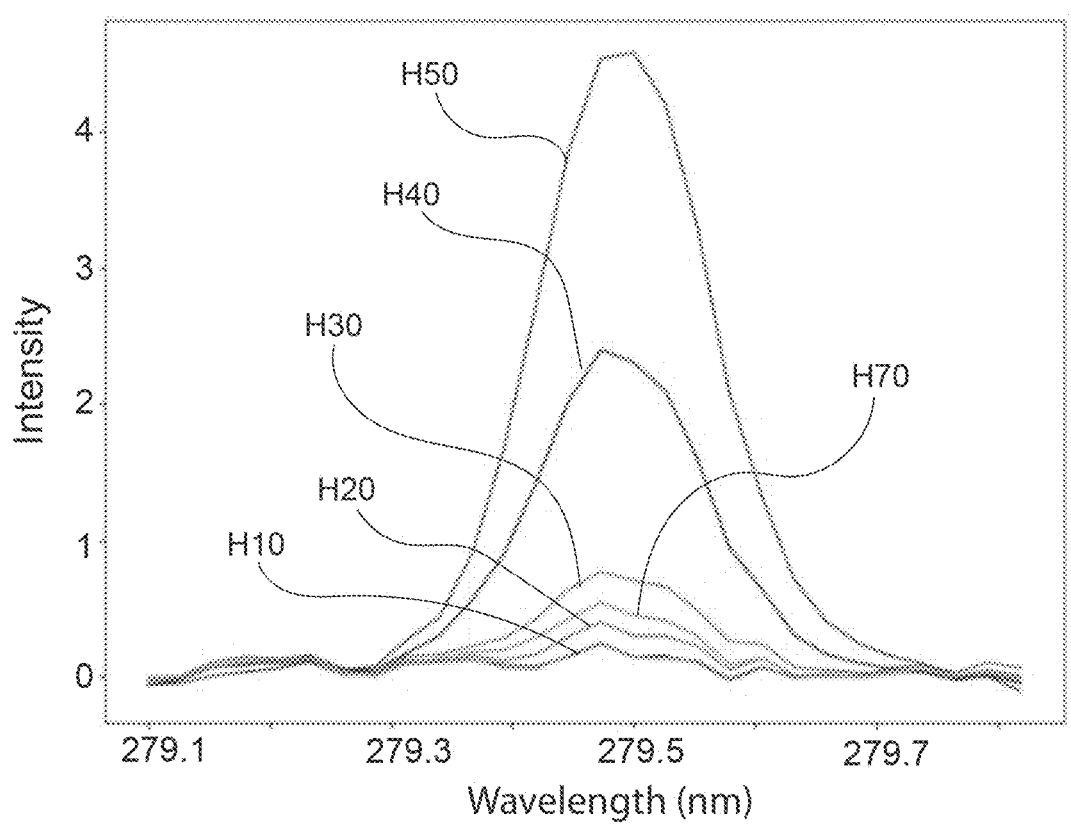

FIG. 19 shows LIBS spectra of Mg peak at 279.5 nm from a gasoline sample and various concentrations of Mg calibration standards in PremiSolV solvent.

Figure 20:
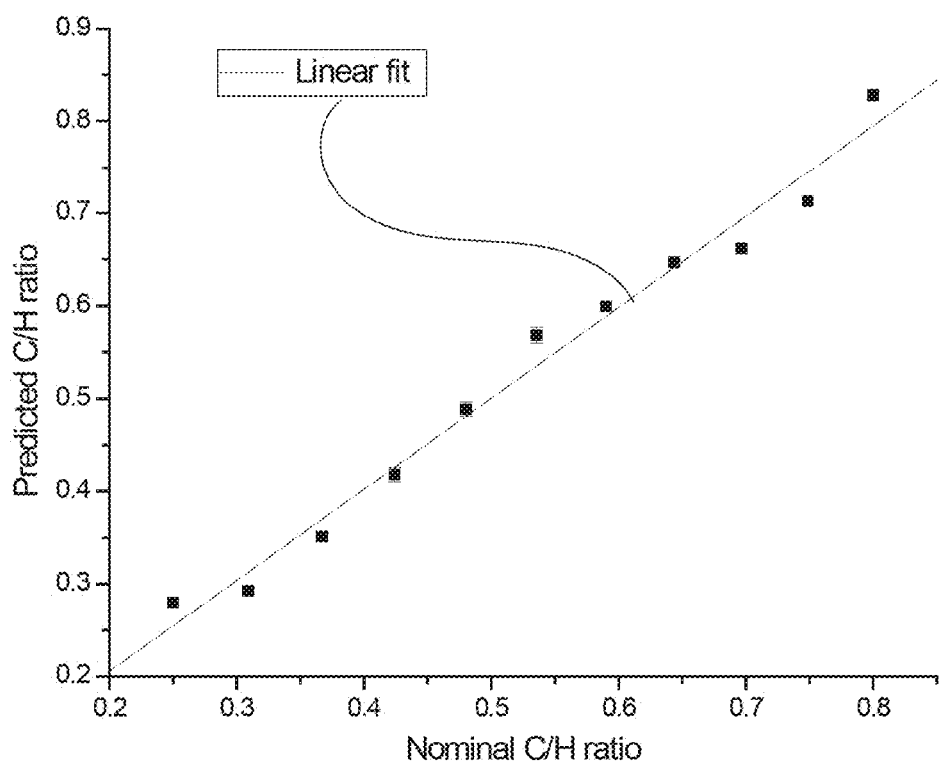

FIG. 20 shows a multivariate calibration graph using LIBS to determine the C/H ratio in organic solvents after an embodiment.

Figure 21:
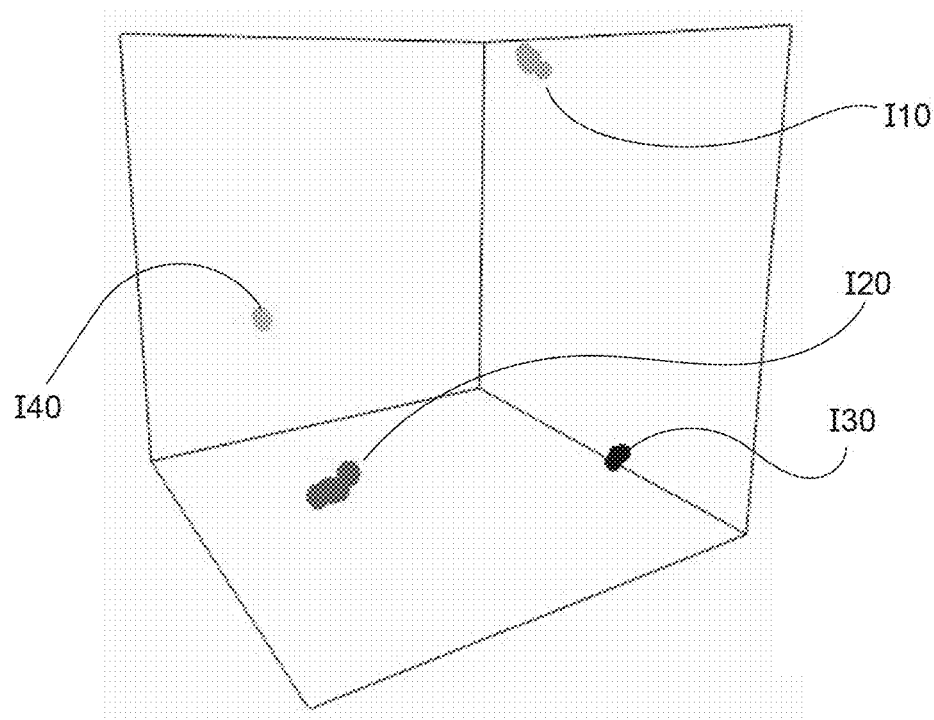

FIG. 21 shows an example principal component analysis of LIBS spectra.

FIG. 22 presents the LIBS and ICP-OES measurements of Mg in low-viscosity nutrient liquid samples in an embodiment.

Figure 23A:
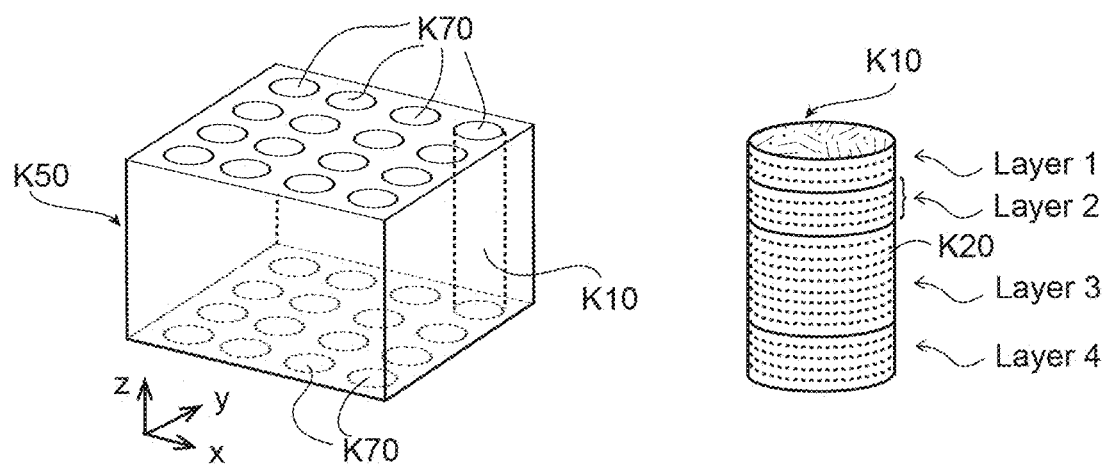

FIG. 23A illustrates sample sites in profiling various layers of a 3-dimensional solid battery cell structure.

Figure 23B:
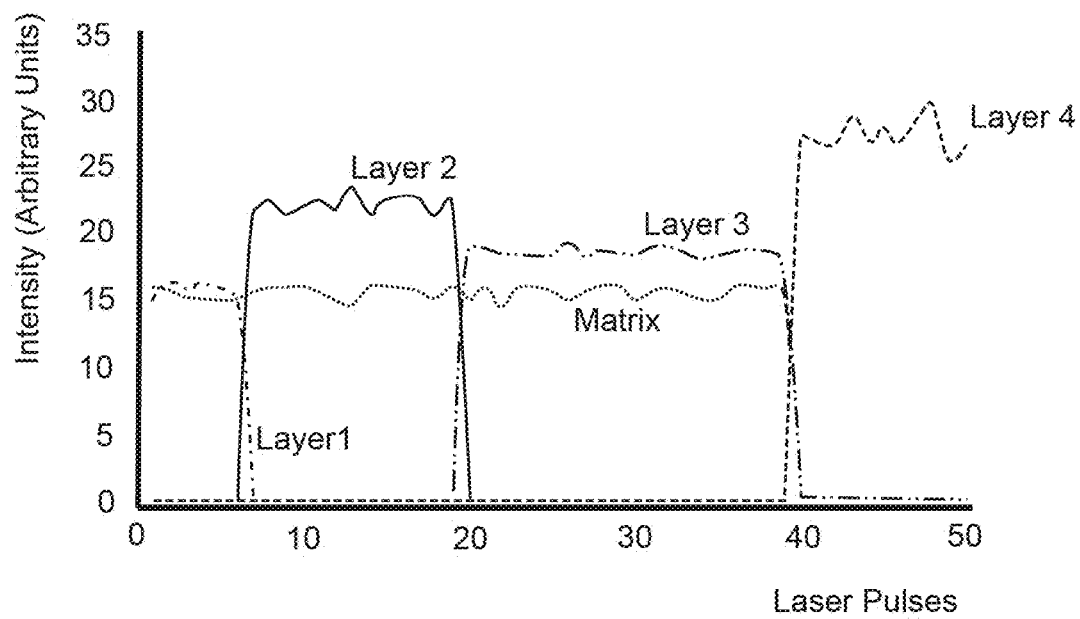

FIG. 23B shows the spectral intensities from various layers in FIG. 23A.

FIG. 24A is an image of a mineral sample and a mapped area according to an embodiment.

FIG. 24B shows a distribution of fluorene in the mapped area of FIG. 24A.

FIG. 24C shows a distribution of oxygen in the mapped area of FIG. 24A.

DETAILED DESCRIPTION

Systems, methods, compositions, and apparatus for providing novel laser induced ablation spectroscopy are disclosed. In various embodiments, an apparatus comprises a sample site position sensor, stage position motors operable to move the stage in three independent spatial coordinate directions, and a stage position control circuit to move an analysis sample site to selected coordinate positions for laser ablation, with no human interaction. The ablation of material from an analysis sample site can displace its position from a point where the laser beam has a predetermined spot size. The embodiments can have a laser position sensor to detect a change in the position of the sample site and generate a displacement signal operable for the stage position control circuit to return the sample site to an original position using the stage motors.

In various embodiments, collection optics can gather light from a plasma plume produced with a laser ablation. The collection optics can couple the gathered light into a first end of a lightguide through which the light can be transmitted to a spectrometer. The lightguide can be a single fiber optic bundle including a plurality of optical fibers held generally parallel to one another in a geometric arrangement. However, in some embodiments, the various fibers in the single bundle (trunk) at the first end can advantageously be subdivided into smaller bundles (e.g. a plurality of branches) to divert various portions of the light to two or more spectrometers. Depending on the application, different branches can convey distinct preselected fractions of the light from the trunk to different spectrometers. For example, in an embodiment one branch from the trunk fiber bundle can convey a first portion of the light to a broadband spectrometer operable to analyze a relatively wide spectral segment, and a different branch can convey a second portion of the light to a high dispersion spectrometer operable to measure minor concentrations and/or trace elements. Emissions from a plasma plume can thereby be simultaneously analyzed in various ways using spectrometers having distinct and/or complementary capabilities. For example, a spectrometer having a high speed gated detector, a spectrometer having a high speed intensified detector (i.e. an ICCD), a spectrometer having an electron multiplying charge coupled device (EMCCD), and/or a spectrometer having enhanced sensitivity and/or selectivity in particular wavelength regions and or at particular wavelengths, can all receive and analyze radiation from the same plasma plume carried through different branches. It will be understood that various advantageous spectrometer characteristics may not be exclusive. For example, a spectrometer can be configured with a type of detector particularly well suited to the characteristic light throughput (efficiency) and resolution of its dispersive element(s), as well as being selectively gateable to detect light exclusively in a preselected interval following each laser pulse. In particular, an intensified multichannel charge coupled device detector can be intensified to provide very high sensitivity relative sensitivity, and/or can be synchronously gated on during a short interval following each laser pulse to discriminate against background continuum radiation.

The terminology herein is for the purpose of describing particular embodiments and is not intended to be limiting of the invention. It will be understood that, although the terms first, second, etc. may be used to describe various elements, these terms are only used to distinguish one element from another, and the elements should not be limited by these terms. For example, a first element could be termed a second element, and similarly a second element could be termed a first element, without departing from the scope of the instant description. As used herein, the singular forms "a", "an" and "the" are intended to include the plural forms as well, unless the context clearly indicates otherwise. It will be further understood that the terms "comprises," "comprising," "includes," "including," and/or "having," as used herein, are open-ended terms of art that signify the presence of stated features, integers, steps, operations, elements, and/or components, but do not preclude the presence or addition of one or more other features, integers, steps, operations, elements, components, and/or groups thereof. Reference in the specification to "one embodiment", "an embodiment", or some embodiment, etc. means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments.

This disclosure makes reference to various elements and features related to fluid flow and fluid transport such as a flow, an orifice, an axis of a flowing jet, and the like. As used here, where fluidic elements are referenced, terms denoting relative elevation such as above, below, upper, lower, and the like are to be understood to refer to their relative positions along a radius drawn from the center of the Earth. In the context of fluid flow, the terms vertical axis and/or vertical direction respectively are used here to refer to an axis or direction that can be parallel or antiparallel to the direction of gravity (e.g. running either up/down or down/up).

With respect to features unrelated to fluid flow or other material transport, various terms denoting spatial position such as above, below, upper, lower, leftmost, rightmost and the like are to be understood in a generally relative sense. For example, optical components in an apparatus can generally be configured in a vertical orientation or in a horizontal orientation. Hence a component or module that is described as being above another component or module in a first embodiment having a first orientation, could equivalently be described as being to the left of the other component or module in an equivalent second embodiment configured to be in a second orientation 90 degrees counterclockwise with respect to the first. It will be apparent that various aspects of the components described herein are operable without regard to their spatial orientation. For example, an optical spectrometer can be configured in a vertical orientation or in a horizontal orientation. Hence a component or module that is described as being above another component or module in a first embodiment having a first orientation, could equivalently be described as being to the left of the other component or module in an equivalent second embodiment configured to be in a second orientation where these components are 90 degrees counterclockwise with respect to the first.

The term module refers to a distinct unit that is operable to perform an identifiable function. A module can be a self-contained physical unit or piece of equipment. A module can also be a logical component effectuated by a processor and tangible media having instructions and/or data that are operable for the processor to perform the identifiable function. The term automatic refers to a module, service, or control system that is operable to perform with no human interaction. Monitoring or sensing refers to measuring a physical quantity. Monitoring is often performed for the purpose of regulation or control.

The term gas or gas phase species as used herein includes species not bound to each other that have thermal and/or directed motion in a gas phase. The term is not limited by a specific value of a mean free path between collisions. Hence the term "gas phase species" includes various different species in vapors, atomic or molecular beams, and gaseous suspensions such as aerosols, and the like.

A lightguide refers to a transmission channel for the directed transmission of luminous electromagnetic radiation over a distance. A lightguide can include one or more fine filamentary optical fibers comprised of dielectric material such as silicon dioxide, a transparent polymer, and the like. The outer surface of each individual optical fiber can have a cladding of relatively lower refractive index. A lightguide have a cross section that is circular, rectangular, U-shaped, ribbon-shaped, and others. The cross section can be solid or it can be hollow. By way of further example, a lightguide can be covered with a jacket comprised of transparent material, opaque material, and others.

The term spectrometer is generally used to identify an instrument that can used to view and/or analyze a characteristic of a substance. With reference to LIBS, an optical spectrometer (also referenced as "spectrometer") is an instrument operable to separate and detect different wavelength components in electromagnetic radiation within a range of about 180 nm to 1000 nm (ultraviolet to infrared). However, depending on the context, the term optical spectrometer ("spectrometer") can also be understood to mean the subsystem in an optical spectrometer operable to disperse and/or separate various wavelength components of the electromagnetic radiation (e.g. a monochromator or polychromator exclusive of an electromagnetic radiation detector). The intended meaning can be understood from the context.

The term a mass spectrometer (MS), as used herein, references an instrument that can separate and detect ions gas based on their charge to mass ratio. The term inductively coupled plasma mass spectrometer (ICP-MS) will be understood to mean an analysis instrument based on ionizing gaseous species in a high temperature inductively coupled (thermal) plasma, extracting such ionized species from the plasma, and determining their composition with a mass spectrometer.

The present teachings may be embodied in various different forms. In the following description, for purposes of explanation, numerous specific details are set forth in the description and drawings in order to provide a thorough understanding of the various principles. Furthermore, in various instances, structures and devices are described and/or drawn in simplified and/or block diagram form in order to avoid obscuring the concepts. However, it will be apparent to one skilled in the art that the principles can be practiced in various different forms without these specific details. Hence aspects of the invention should not be construed as being limited to the embodiments set forth herein.

Figure 1:
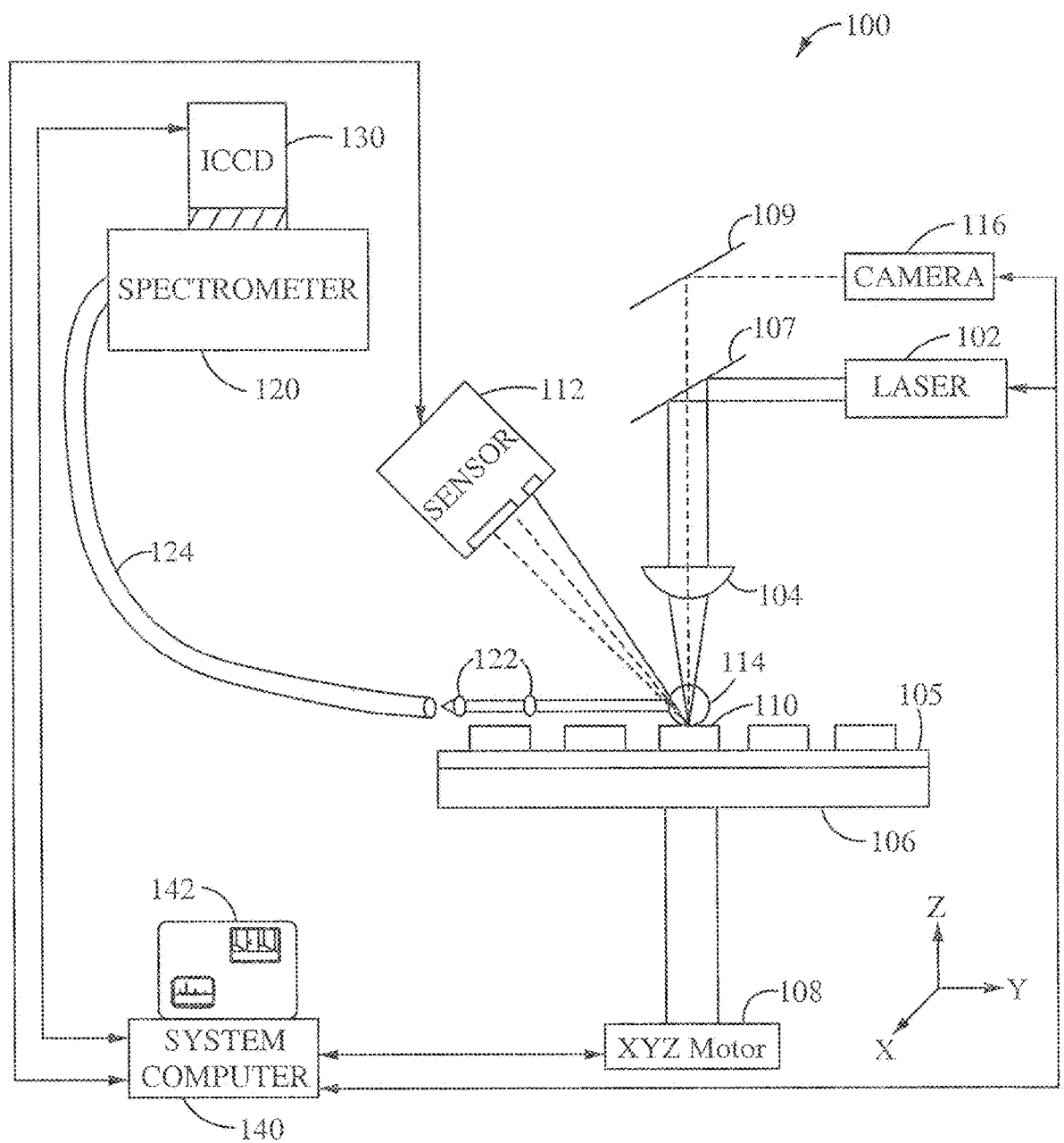

FIG. 1 shows a schematic overview of a laser ablation apparatus 100 according to the present invention. The apparatus 100 generally includes a pulse laser 102, a stage 106, a position sensor 112, a spectrometer 120 and a system computer 140. The apparatus 100 is configured to generate laser pulses from the pulse laser 102. The laser pulses are focused onto a sample 105 with a lens 104 to produce a plasma plume 114 of the sample 105 at a sample site 110. The position sensor 112 is electrically coupled with the system computer 140 for sending a displacement error signal to automatically correct positioning of the stage 106 during an ablating process as describe further below. The apparatus 100 can include a system frame for housing the various components described herein. The system frame can include an air filter for filtering contaminants produced during the ablating process.

The pulse laser 102 in an exemplary embodiment comprises a neodymium doped yttrium aluminum garnet (Nd: YAG) laser for generating energy in the near infrared region of the electromagnetic spectrum with a wavelength of 1064 nm. The pulse duration can be approximately 4 ns for generating a laser beam with a power density that can exceed one GW/cm.sup.2 at a focal point or ablation impact point. The laser 102 can have a repetition rate of approximately 10 hz or alternately lower than 10 hz in some embodiments. Alternatively, the pulse duration can vary to tens or hundreds of nanoseconds. In another embodiment, the pulse duration can be shortened to ultra short femtoseconds. The lens 104 comprises an objective lens used to focus the laser beam on a surface of the sample site 110. The laser beam can be focused to a spot size of approximately 10-500 micrometers on the sample site 110. In an exemplary embodiment, the laser beam can be focused to a spot size of approximately 150-200 micrometers on the sample site 110.

In an alternative embodiment, a spark generator can be used as the ablation source instead of the pulse laser 102 or a spark can be synchronized and used in combination with the laser pulse. An electric spark is passed through a sample material until the sample material reaches a temperature where characteristic spectral emissions can be detected. In an exemplary embodiment, the electric spark can be controlled in an argon atmosphere. A person of ordinary skill in the art can appreciate the construction of such spark generators in spark spectroscopy systems.

A dichroic mirror 107 is used for directing the laser beam toward the sample site 110 and a mirror 109 allows viewing of the sample site 110 using a video camera 116.

The stage 106 includes an attached array of 'x-y-z' motors 108 for providing translation of the stage 106 in a three dimensional space. The x-y-z motors can comprise suitable stepper motors driven by stepping motor controllers (not shown), as known by a person of skill in the art. In one embodiment, the stage 106 can have a translation rate of approximately 10 cm/s. The stage 106 can include a sample securing means.

Figure 1A:
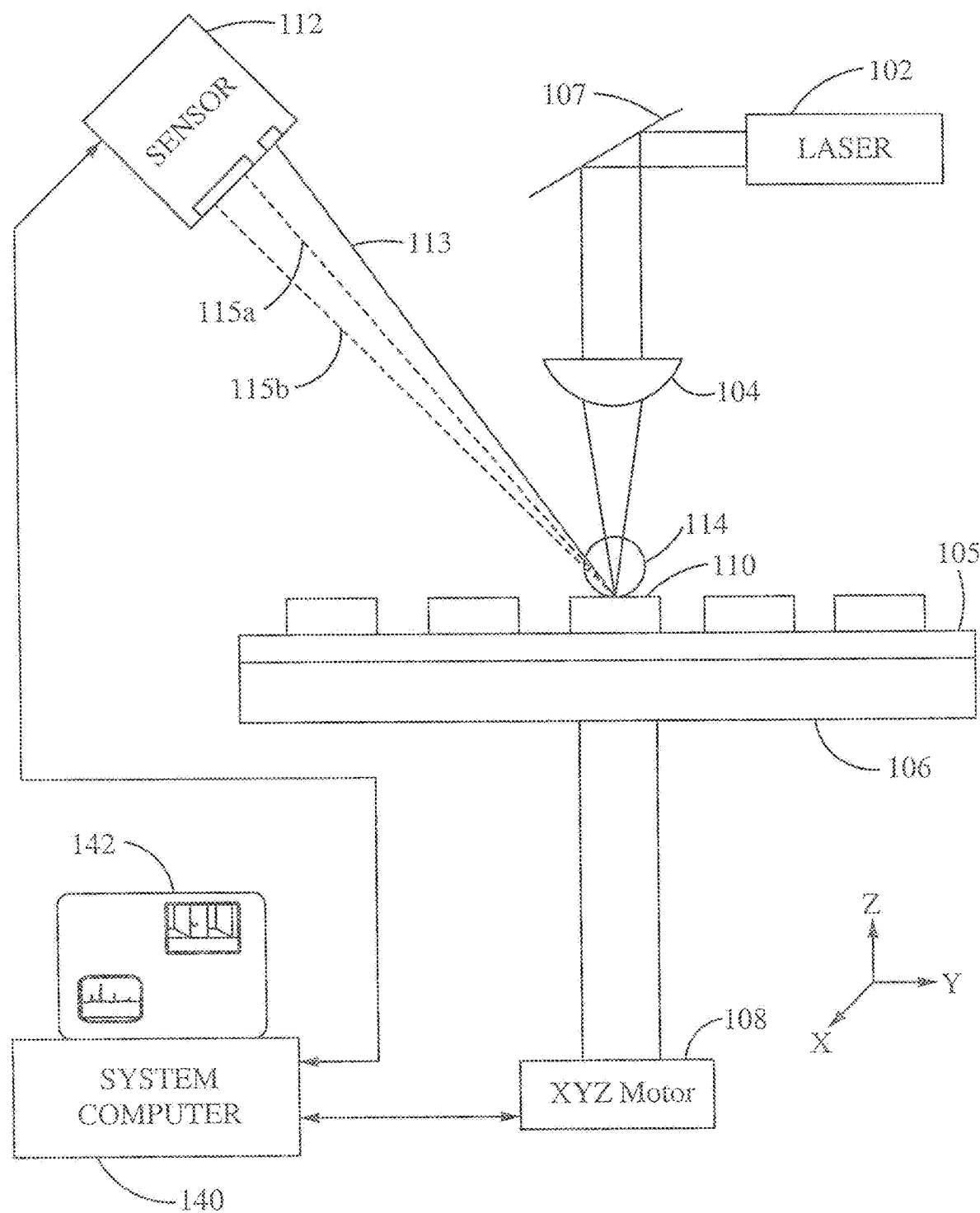

The position sensor 112 preferably comprises a laser triangulation sensor. The position sensor 112 preferably uses the principle of triangulation to determine changes in height of the stage 106 and the associated sample 105. As shown in greater detail in FIG. 1A, triangulation occurs when the position sensor 112 emits a triangulation laser beam 113 that is focused on the sample site and a first reflection 115a is sensed by a photodetector within the position sensor 112. A change in height of the sample site 110 causes a displacement in the triangulation laser beam 113 to produce a second reflection 115b and a displacement signal generated by the position sensor 112 is communicated to a system computer 140. The system computer 140 provides positioning information to maintain an optimum height of the sample site. The position sensor 112 can comprise a suitable laser displacement measuring device as known to a person of skill in the art. In one embodiment, the triangulation laser 113 coincides with a spot circle of the laser 102 generated at the sample site. The triangulation laser 113 can also be used as a targeting marker when selecting a specific point on the sample site 110 as seen with the video camera 116 as the triangulation laser 113 can produce a visible spot on the surface of the sample site 110.

The spectrometer 120 (FIG. 1) collects electromagnetic information from the plasma plume 114. The spectrometer 120 can be a monochromator or a polychomator with a detector. The electromagnetic information includes spectral information identifying an elemental composition of the sample site 110. A spectral range for the spectrometer 120 can be chosen to suit different applications. In an exemplary embodiment the spectral range can be approximately 35 nm for observing a portion of the electromagnetic wavelength range. Alternatively, the spectrometer 120 can detect electromagnetic radiation in a range of 200 to 900 nm. Collection optics 122 receive light and plasma lumina generated from the plasma plume 114 and transmits the light and plasma lumina through a fiber cable 124 to the spectrometer 120. The collection optics 122 can be orientated horizontally as shown in FIG. 1. Alternatively, the collection optics 122 can be orientated at any angle above the sample 105 surface plane. A mirror (not shown) within the spectrometer 120 reflects the plasma lumina to a grating that disperses the plasma lumina.

An intensified charge coupled device (ICCD) or detector 130 is coupled with the spectrometer 120 for detecting the dispersed plasma lumina. The detector 130 provides the detected plasma lumina to the system computer 140. The system computer 140 generates spectral information from the plasma lumina of the laser plume 114. The spectral information includes intensity data representing elemental information and composition of the sample site 110. The spectral information can be produced on a display 142.

The detector 130 provides increased resolution and greater selectivity of the spectral information. The detector 130 includes a microchannel image intensifier plate. The intensifier plate is preferably gated during period of time when the plasma plume 114 emits characteristic atomic emission lines of the elements. This period coincides with an optimum plume luminance period. This period follows emission of continuum radiation. Continuum radiation lacks useful specific species or elemental information. In one embodiment, a delay generator (not shown) can be included to provided gating of the detector 130 to allow temporal resolution of the detector 130 response time. Alternative embodiments of the detector 130 can include a detector other than an ICCD, for example a suitable charge coupled device (CCD) or suitable photomultiplier. Accuracy of the spectrometer 120 and detector 130 in one embodiment can generate compositional data in the range of 20 ppm or less. Alternatively, the accuracy can be in the range of a few %. In another embodiment, the accuracy can be in the range of 1%, which is approximately 10,000 ppm.

The system computer 140 can include application software and a controller in the system computer 140 for providing synchronization of the laser 102, spectrometer 120, detector 130, position sensor 112 and the x-y-z motors 108 positioning of the stage 106. The system computer 140 is electrically coupled with the laser 102, spectrometer 120, detector 130, position sensor 112, the x-y-z motors 108 and the camera 116. The system computer 140 includes a display 142 for displaying spectral information. The system computer 140 can present the spectral data generated on the display 142. Alternatively, a separate personal computer can also be coupled with the system computer 140 for separately analyzing the spectral information. The system computer 140 can include a power controller to regulate power to all the apparatus 100 components.

The application software decodes the spectral information from the detector 130 and facilitates analysis of the spectral information and generates composition information of the sample 105. In one embodiment, the intensity data of an elemental peak is subtracted from background data of the elemental peak to calculate a change in intensity (delta I). The application software allows setting of certain parameters for performing the laser ablations of the sample site 110. A laser spot circle size can be set as a parameter and can be consistently and precisely maintained through the laser ablation process described in further detail below. Alternatively, a z value for the sample site 110 can be set as a parameter and can be consistently and precisely maintained through the laser ablation process. The spot circle increases or decreases depending on the change in height of the sample site 110. Keeping the laser 102 spot circle precisely adjusted insures that the sample site 110 produces the plasma plume 114 with consistent optimum plume luminance. Height changes in the sample site can be detected by the position sensor 112 and a correction to the height of the sample site 110 is generated by the controller within the system computer 140. The application software and the controller generate correction signals to reposition the height of the stage 105 after each laser ablation of the sample site.

Figure 2:
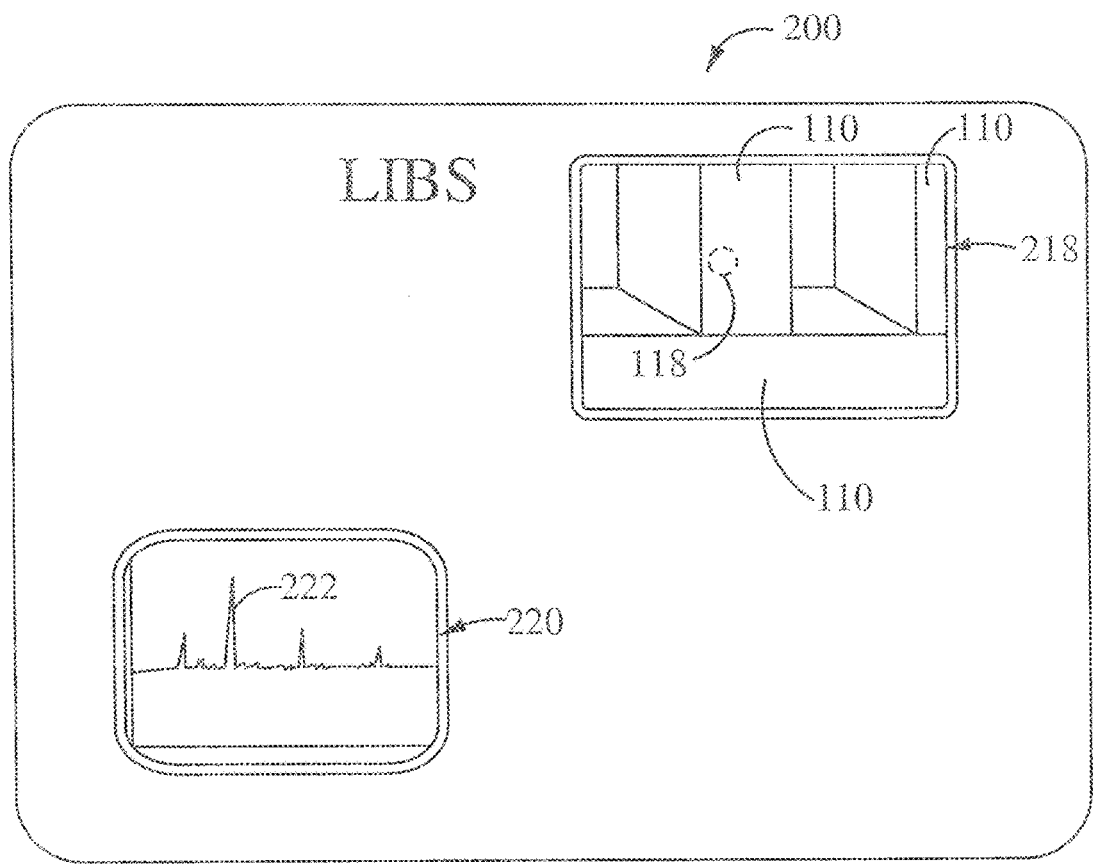

FIG. 2 shows a representative graphical user interface (GUI) 200 according to an embodiment of the present invention. The GUI 200 includes a first data window 218 and a second data window 220. The first data window 218 provides real-time video of a sample site 110. A spot circle 118 can be observed on the sample site 110 during and following an ablation. The second data window 220 provides spectral information generated from the system computer 140. In an exemplary embodiment, the spectral information includes a waveform 222 representing intensity and wavelength data of a sample site ablation.

Figure 3:
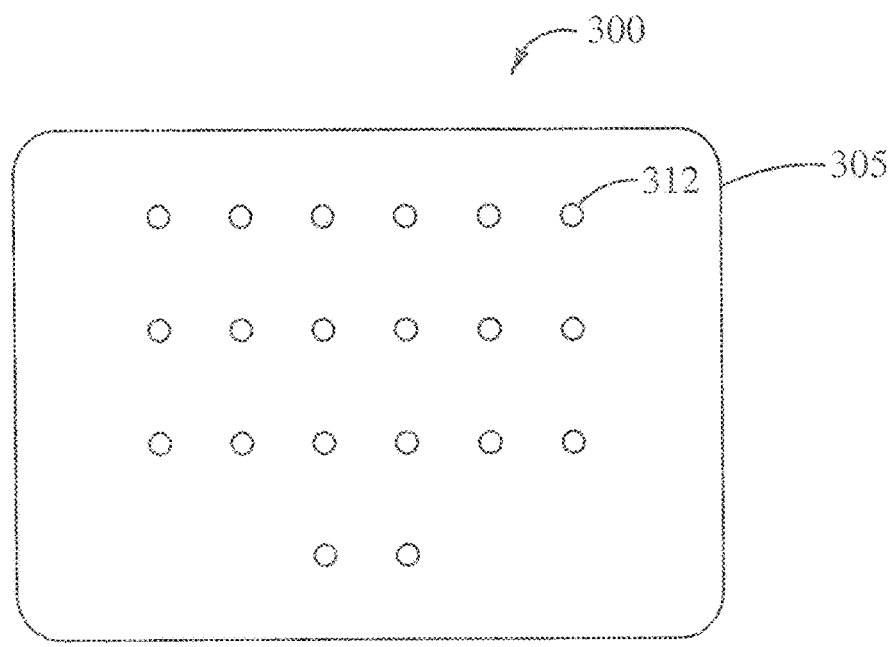

FIG. 3 shows a top view 300 of a protocol for ablating a sample 305 according to an embodiment of the present invention. The protocol includes ablating multiple sample sites 312. In an exemplary embodiment, the sample sites can be uniformly and evenly distributed throughout a surface of the sample 305. Alternatively, the sample sites 312 can be randomly distributed through the surface of the sample site. The number of sample sites 312 ablated can vary depending on a particular sample or a particular application. The spectral data of the individual laser ablation sites can be used to form a chemical map of the sample surface or the total number of laser ablations for the sites can be averaged together. In one embodiment, the number of sample sites comprises twenty. Alternatively, the number of sample sites can be ten or fewer. In another embodiment, the number of sample sites can be thirty or more.

The protocol 300 can include a specific number of pulse laser ablations per sample site 312. Heterogeneous material can include elements having varying thermal properties. A single shot laser ablation can vaporize disproportionately more volatile elements than the less volatile elements. Spectral information from a single ablation may not be a reliable indication of the composition of the sample 305. In an exemplary embodiment, the number of laser ablations per site comprises three laser ablations. Alternatively, the number of laser ablations per site comprises two. In another embodiment, the number of laser ablations per site comprises a single laser ablation. In still another embodiment, the number of laser ablations per site comprises four or more laser ablations.

Figure 4A:
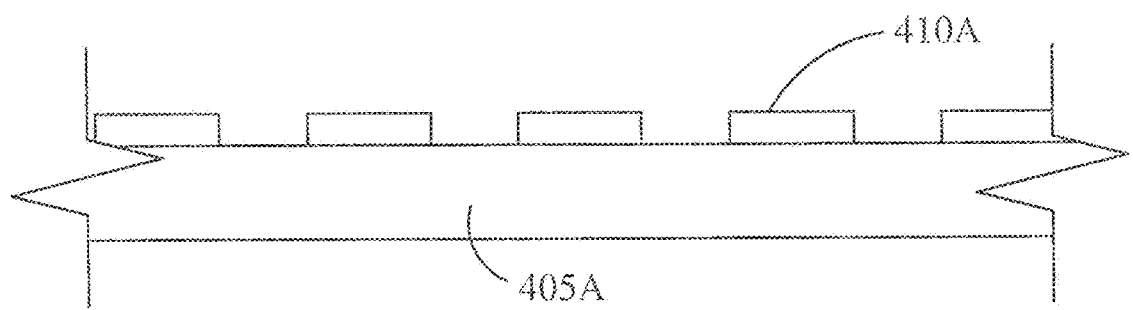
Figure 4B:
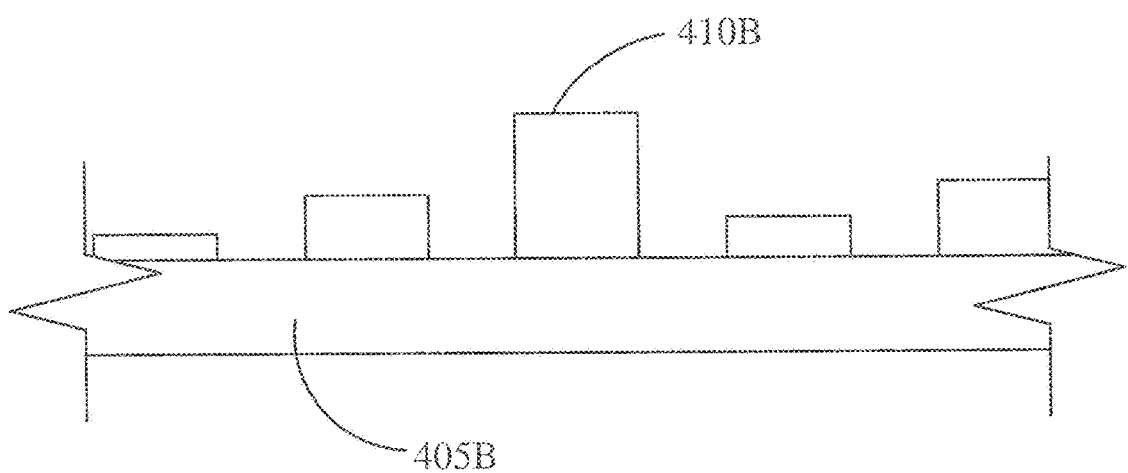

FIGS. 4A and 4B show side views of a first sample 405A and a second sample 405B according to an embodiment of the present invention. The first sample 405A comprises a material having sample sites 410A with substantially uniform topology. The height of the sample sites 410A are substantially the same. The second sample 405B, however, comprises a material having sample sites 410B with erratic or varying topology. The height of the sample sites 410B can be different. The apparatus 100 is configured to provide consistent spectral data for either the uniform sample sites 410A or sample sites 410B with varying heights. The system computer 140 adjusts the height of the stage 106 to achieve the optimal plasma lumina.

Figure 5:
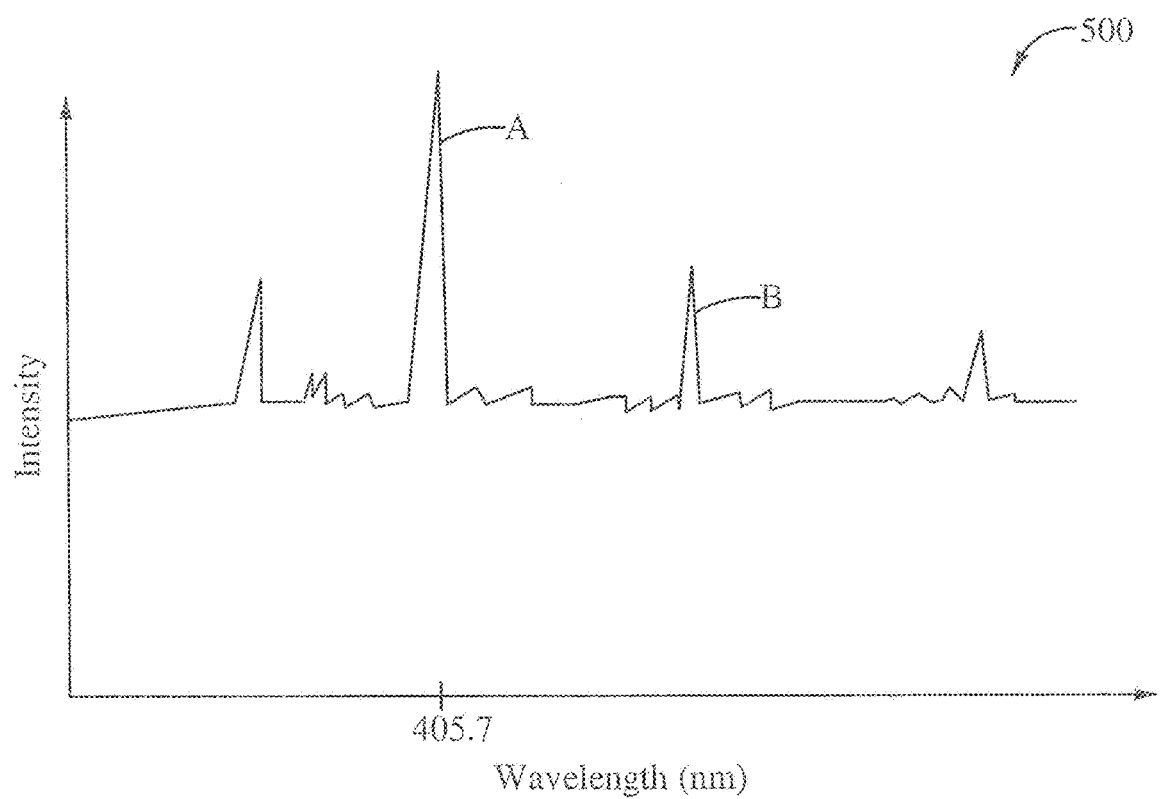

FIG. 5 shows a plot 500 of spectral data according to an embodiment of the present invention. The plot 500 includes a waveform plotted along a wavelength (nm) versus an intensity (a.u.). An elemental peak 'A' can represent the spectral information for the element Lead (Pb). The elemental peak 'B' can represent spectral information of a different element.

Figure 6:
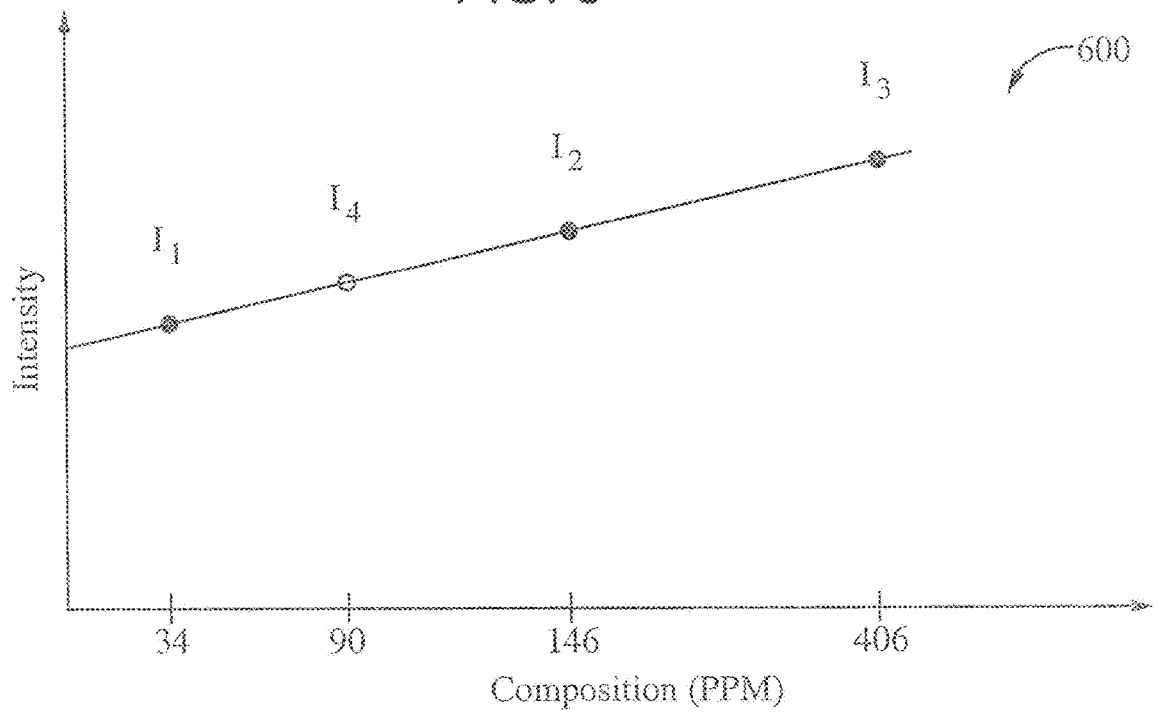

FIG. 6 shows a plot 600 of compositional data 600 according to an embodiment of the present invention. The plot 600 includes a waveform plotted along a composition (nm) versus an intensity (a.u.). The plot 600 is generated by performing laser ablation according to the method described herein on a known standard sample. The known standard produces intensities 11, 12 and 13 for associated elements at the respective compositions 34 ppm, 146 ppm and 406 ppm. Quantitative analysis of different elements of a particular sample is performed by comparing spectral data of the particular sample with the compositional data 600. For example, spectral information obtained from analysis with the apparatus 100 can include intensity 14. The quantity of the element can be approximated to 90 ppm.

Figure 7:
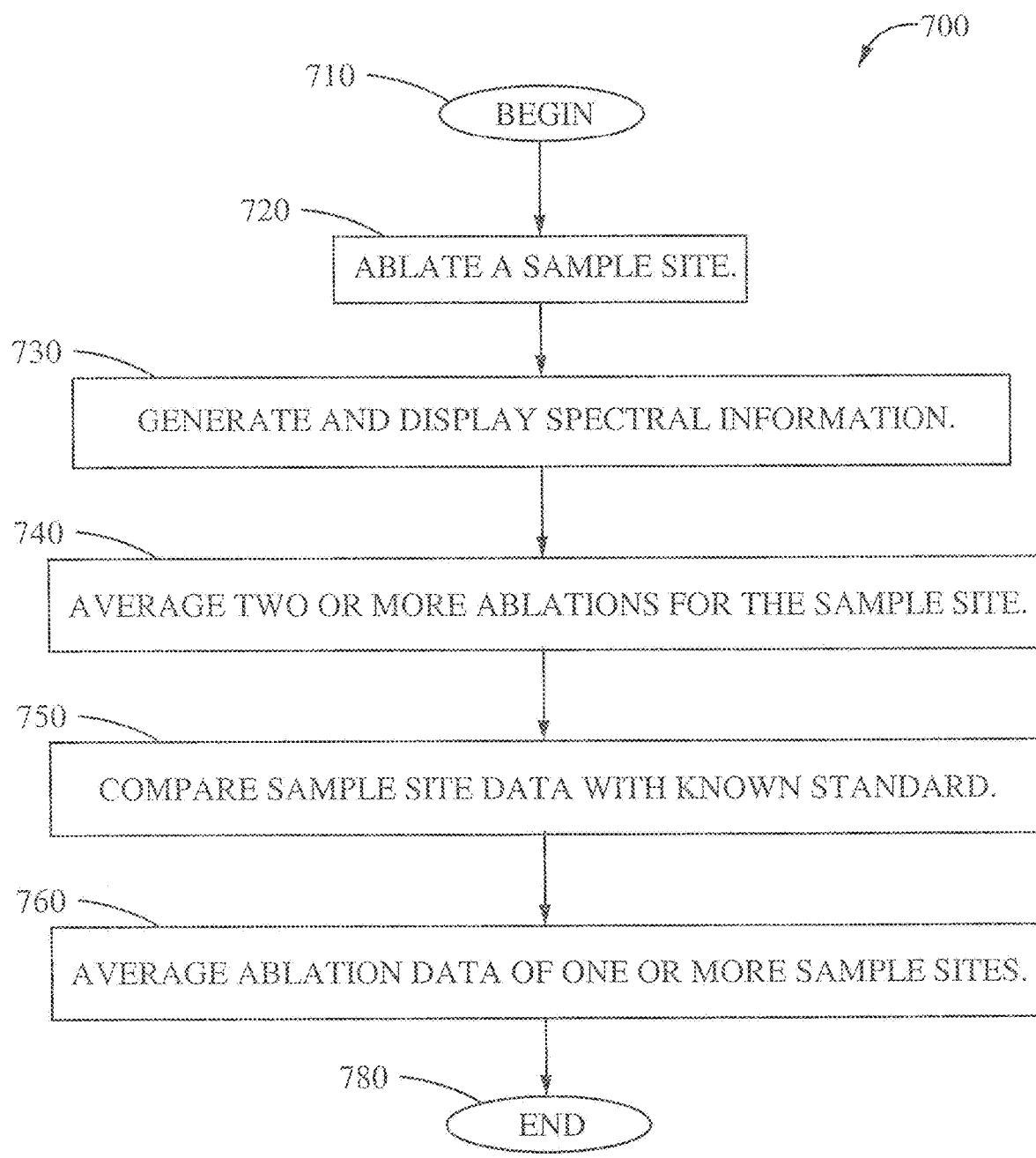

FIG. 7 shows a process flow diagram for a method 700 of laser spectroscopy according to an embodiment of the present invention. The laser ablation apparatus 100 (FIG. 1) is used as an example. The method 700 begins at the step 710. In one embodiment, the method 700 can be fully automated using application software included in the system computer 140. A specific protocol can be entered into the application software instructing the application software of desired parameters or settings for the apparatus 100. Alternatively, the method 700 can be manually performed. At the step 720, a laser pulse is generated to ablate the sample site 110 into an emissive plasma plume. A real-time video image of the sample site 110 is generated on a first window 218 of the GUI 200. The real-time video is received from the video camera 116. The plasma plume 114 is analyzed by the spectrometer 120 and the detector 130. The plasma lumina and the electromagnetic radiation generated by the plasma plume is optically communicated to the spectrometer 120 and detected by the detector 130. The position sensor 112 provides a displacement signal to the system computer 140 indicating any change in the height of the sample site 110. The system computer receives spectral information from the spectrometer 120 and the detector 130.

At the step 730, the system computer 140 generates spectral and wavelength information for presentation on the display 142. In one embodiment, intensity and wavelength data are represented as waveforms on the GUI 200. The waveform is presented in a second window 220 of the GUI 200 and includes the intensity and wavelength data. In another embodiment, a second waveform is superimposed on the first waveform 222 in the second window 220. The second waveform can include additional spectral information. For example, particle imaging information, tracking information or scaled or gated representations of the first waveform 222.

At the step 740, the steps 720 and 730 are repeated for each sample site on the sample. The spectral data for a total number of laser ablations for the sample site 110 can be averaged together. In an exemplary embodiment, the total number of laser ablations for the sample site 110 equals three laser ablations. The spectral data of the three laser ablations are averaged together to generate a 'site sum'. The site sum is a reliable and accurate representation of the elemental composition of the sample 105 at the sample site 110. Alternatively, the site sum comprises spectral data from two laser ablations. In another embodiment, the site sum comprises spectral data from one laser ablation. In still another embodiment, the site sum comprises spectral data from four or more laser ablations.

At the step 750, the site sum can be compared with spectral information generated from performing the method described herein on a known standard material. The known standard material comprises specific known elements at a known composition. Laser spectroscopy performed on the known elements generates known spectral data including known intensity values. An elemental composition for the sample site 110 can be approximated by comparing the site sum with the known standard spectral data.

At the step 760, the steps 720 through 750 can be repeated for one or more additional sample sites to generate additional site sums. The spectral data for the total number of site sums can then be averaged together. In an exemplary embodiment, the total number of site sums equals twenty. The spectral data of the twenty site sums can be averaged together to generate a 'sample sum'. The sample sum is a reliable and accurate representation of the elemental composition of the sample 105 as a whole. Alternatively, the total number of sites sums can be ten or fewer. In another embodiment, the number of sites sums can be thirty or more.

The apparatus 100 can perform laser ablation or laser induced breakdown spectroscopy (LIBS) on a variety of materials. The materials can be heterogeneous or homogeneous solids or semi-solids. Alternatively, the materials can comprise a liquid or even a gas. In another embodiment, the apparatus 100 can be used for LIBS on biological materials. Analysis of biological material can include building a library of known spectral signatures including elemental and compositional data for specific biological material. The spectrometer 120 can collect and detect with the detector 130 spectral information on a broad range from 200 to 900 nm. An unknown biological sample can be compared with the library to determine the biological substance. The method ends at the step 780.

In an alternative embodiment, the method 700 can be used in a remote configuration. The sample material is positioned in a location that is remote from the ablation source or laser. A telescopic device can be integrated with the apparatus 100 to provide optical coupling of plasma lumina. The generation and analysis of spectral data can proceed similarly as described herein. Furthermore, other spectroscopies, in place of and/or in addition to optical emission spectroscopies can be used to obtain characteristic ablation spectral data within the scope of the present invention. For example, laser ablation inductively coupled plasma mass spectrometry (LA-ICP-MS) can be applied in conjunction with and/or as an alternative to the LIBS technique described herein.

Still further embodiments can be understood with respect to FIGS. 8-13B. Like numerals in FIGS. 8-13. Like numerals in FIGS. 8-13 designate corresponding elements.

Figure 8:
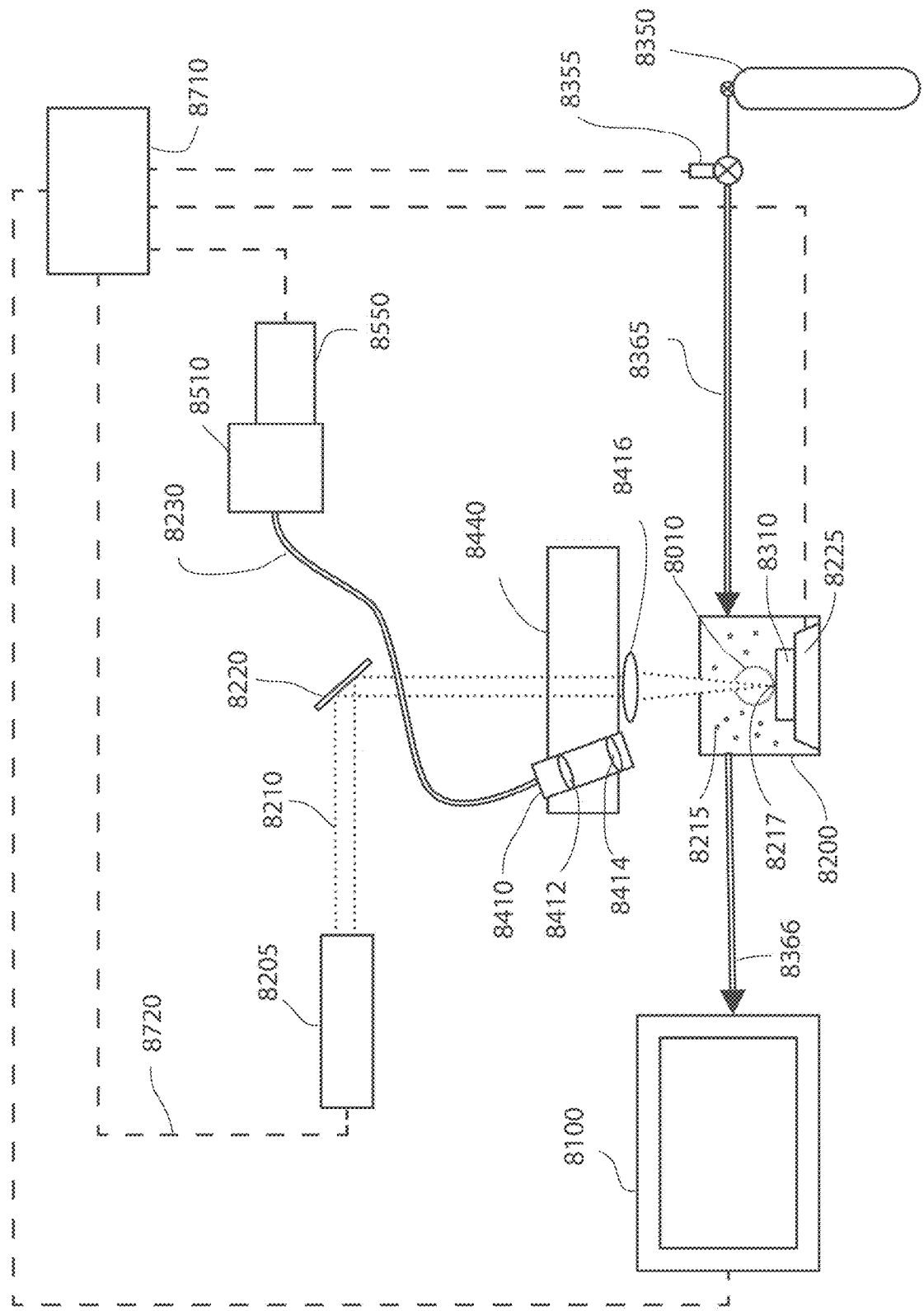

FIG. 8 is a simplified drawing of a system for laser induced ablation spectral analysis of a sample. The system has a movable stage 8225 coupled to x-y-x translation motors (not shown) that can move a sample 8310 on the stage in three independent directions. The system also has a laser 8205 that can emit a pulsed laser beam 8210, and has various optical elements such as a mirror 8220, laser beam focusing optics module 8416 and/or others that can cooperatively focus the laser beam onto a selected sample site 8217 for ablation. The sample 8310 and stage can be in an unreactive gaseous atmosphere confined within enclosure 8200. The atmosphere in the enclosure can be transparent at wavelengths comprising pulsed laser beam and/or characteristic spectral emission emanating from the plasma plume 8010. In a preferred embodiment, the pulsed laser 8205 can be a Nd YAG laser emitting a pulsed laser beam with a near infrared wavelength of 1064 nm, and the unreactive atmosphere can be inert gas such as helium and/or argon.

However, an ultraviolet wavelength selected from among 193 nm, 266 nm and 193 nm is preferred for the ablation for some applications, particularly when performing analyses using ICP-MS. UV wavelengths can provide a better sample of gaseous species from a sample site by comparison to a more conventional pulsed laser wavelength in the near infrared. Short UV wavelengths can be generated as harmonics of longer wavelength exicimer and/or solid-state lasers as will be understood by those having ordinary skill in the art.

Figure 12A:
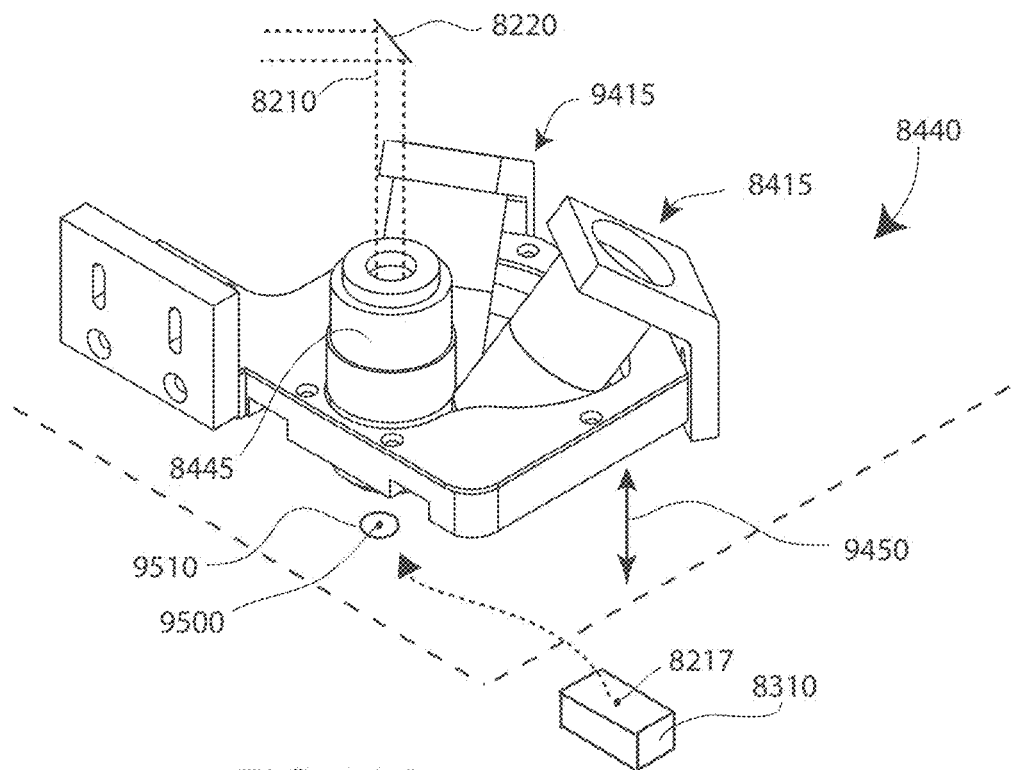
Figure 12B:
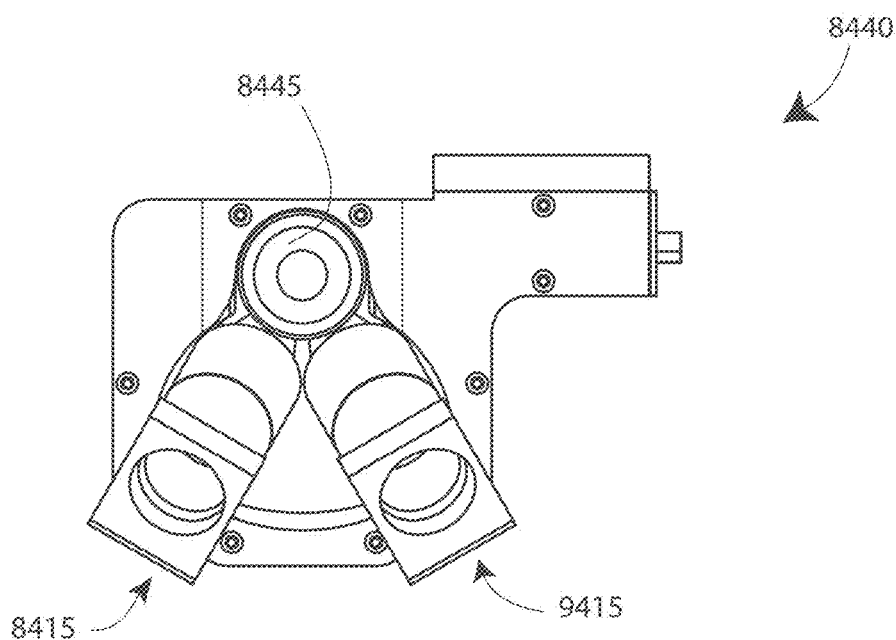

Characteristic spectral emission emanating from the plasma plume 8010 generated by ablation can be gathered with a collection optics module 8410. The collection optics module can couple the spectral emission into a lightguide 8230. The lightguide can transmit the optical emission to an optical spectrometer comprising wavelength separation unit 8510 and detector 8550. The collection optics module can include lenses 8412, 8414 and/or other optical elements and is disposed in a preselected position and orientation by optical frame 8440. Further details of an optical frame structure 8440 are disclosed in FIGS. 12A, 12B and 13. As shown in FIG. 12A, the laser beam focusing optics module 8445 is secured to frame 8440 in a position where it can center a precise laser spot circle 9510 of predetermined size in plane 9460 on a point 9500. Plane 9460 is a preselected distance 9450 below optical frame 8440. Accordingly, stage 8225 can movably translate a selected sample site 8217 (also see FIGS. 9-10) to the center laser spot circle position to perform precise and consistent laser ablation of material from the selected site.

As can be understood with respect to FIGS. 10-13, the optical frame 8440 has support substructures 8415, 9415 operable to secure collection optics modules 8410 and/or 9410 in a preselected position with respective central axis/axes 8416 and/or 9416 of each collection optics module aimed at a situs 9300 of the plasma plume. This arrangement positions each laser ablation and its ensuing plasma plume in the same location relative to the optics support structure 8440. Accordingly, each optics support substructure 8415, 9415 can hold a respective collection optics module 8410, 9410 in a fixed position and orientation that can optimize light collection from a plasma plume arising from the spot circle position.

In various embodiments, a gas flow system such as shown with respect to FIG. 8 can maintain an atmosphere of unreactive carrier gas in sample/stage enclosure 8200. A source of pressurized unreactive gas 8350 can be coupled to a flow controller 8355 through a fluid channel comprised of conventional tubing, pipe and/or fittings. The flow controller 8355 can deliver a selected flow rate of the carrier gas to enclosure 8200 through fluid passage 8365. Flow controller 8355 can be a pneumatic flow controller, an electronic mass flow controller, a fixed orifice, and others. The flow rate can be controlled using a computer 8710 to actuate the flow controller and/or provide a setpoint by way of a communication channel represented by the dashed line between a computer 8710 and flow controller 8355.

In some embodiments, gaseous laser ablation products 8215 generated in chamber 8200 can be transported in the carrier gas from enclosure 8200 to an inductively coupled plasma-mass spectrometer (ICP-MS) 8100 through flow channel 8366. In various embodiments, the gaseous laser ablation products can include permanent gases, vapors, molecular clusters, suspended particles, aerosols and/or others. The inductively coupled plasma-mass spectrometer (ICP-MS) 8100 is operable to perform a further spectral analysis of the ablation products based on the mass of ionized species. In various embodiments, the ICP-MS comprises an inductively coupled thermal plasma sustained in an inert carrier gas such as argon. Those having ordinary skill in the art will recognize that thermal plasma sustained in the ICP-MS 8100 have sufficiently high temperature (over 5000K) to ionize the gaseous laser ablation products. Ionized products from the thermal plasma are introduced into a mass analyzer within the ICP-MS where they can be separated and identified based on characteristic charge to mass ratio. Accordingly, the ICP-MS analysis can provide additional information useful to augment, improve, and/or confirm an emission spectroscopy determination of sample site composition based on lumina from the plasma plume.

It has also been found that ICP-MS may not be particularly effective to determine relative relatively light elements (atomic number less than about 10) and elements generally found in organic compounds (carbon, hydrogen, oxygen and nitrogen). In this regard, it has been found that the LIBS analysis can complement and quantify the concentrations of various elements that may not be acceptably measured using ICP-MS alone. Furthermore, it is difficult to measure high concentrations of elements (bulk composition analysis) in an ICP-MS while simultaneously performing trace level chemical analysis with the same instrument. On the other hand, ICP-MS is highly sensitive and can perform trace level detection/analysis at levels as low as 1 part per billion, and under some circumstances even lower levels are operable. It has been found that a combination of laser ablation emission spectroscopy and laser ablation ICP-MS can determine both high concentration level analysis as well as trace levels at 1 ppm or even 1 ppb of a single sample site, which could not be performed using either laser ablation emission spectroscopy or laser ablation ICP-MS alone. Yet another advantage having both techniques in combination arises from an ability to detect pulse-to-pulse variations in the amount of ablated material based on a signal level in from wideband emission spectra. The emission signals can be useful to normalize and/or correct the ICP-MS mass/charge intensities thereby improving accuracy.

A system with respect to FIG. 8 can include at least one computer 8710. The computer comprises machine readable media operable to store data and instructions and a processor that can read the data and perform the instructions. Furthermore, media has various modules operable to effectuate various control functions, control loops, displays, human interfaces, and others. The dashed lines 8720 shown in FIG. 8 represent communications channels between the computer and various system components such as pulsed laser 8205, ICP-MS 8100, an optical spectrometer wavelength separation unit 8510, a spectrometer detector 8550, an electronic flow controller 8355, and a stage position controller for x-y-z stage 8255. The system can also include communications channels for a sample site position sensor, and other physical and/or software components not shown in FIG. 8. It will be recognized that a communication channel can be implemented in various different ways. For example, data and/or instructions can be carried by way of physical media as point to point wiring, over a parallel bus, over serial and/or parallel fiber optic connections, with a virtual circuit in a network protocol layer, and/or others.

It will be understood that various embodiments with respect to FIG. 8 can further include a number of additional elements and structures disclosed in relation to FIGS. 1-7 above. These elements are been omitted from the drawing to avoid obscuring other concepts simplify the explanation. By way of example, a system with respect to FIG. 8 can include a video camera, a sample site position sensor and an x-y-z stage position controller in a stage position control circuit, a triangulation laser, and others. Furthermore, some embodiments do not include all of the elements and subsystems shown. For example, there are embodiments with an ICP-MS. In these embodiments unreactive carrier gas from enclosure 8200 can be vented into an exhaust line (not shown).

Figure 9:
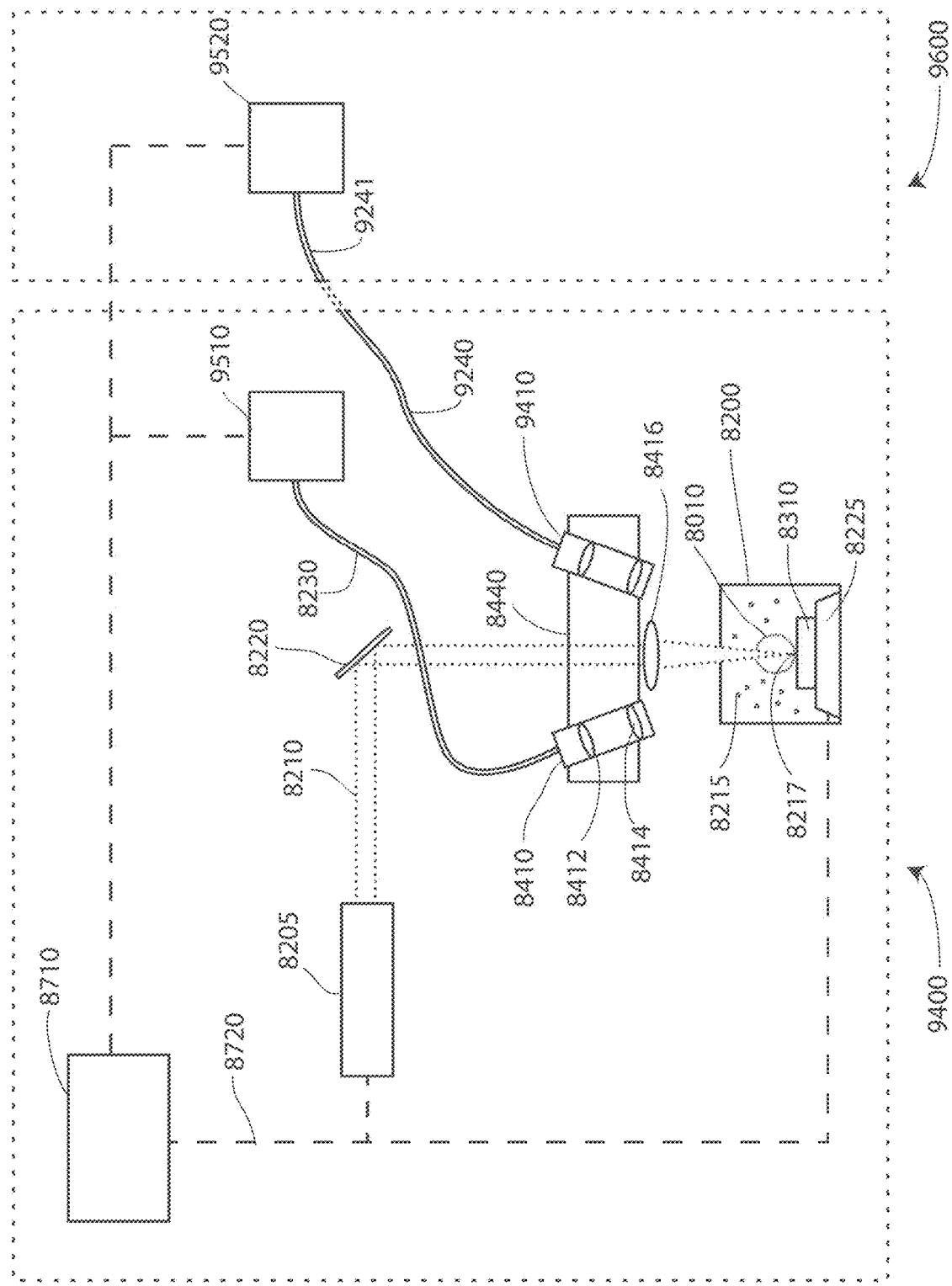

Other embodiments of a system for material analysis using LIBS can be understood with respect to the simplified diagram in FIG. 9. A system with respect to FIG. 9 comprises a master system module 9400, and can have an optional extension spectrometer module 9600. The master system module 9400 can include any of the elements and/or structures disclosed with respect to FIG. 8, including elements not shown in FIG. 9 (e.g. the carrier gas components 8350, 8355, and others are omitted for clarity). The optical frame 8440 of master unit 9400 is operable to support a second collection optics module 9410. The second collection optics module can gather spectral emission from a plasma plume 8010 and couple the light into a second lightguide 9240. Lightguide segment 9241 can deliver spectral emission to extension spectrometer 9600. In some embodiments lightguide segment 9240 in the master module and segment 9241 in the extension spectrometer module can be portions of one single continuous fiber. In further embodiments, segments 9240 and 9240 can be physically different fibers optically joined through an interface connection between the master module and the extension spectrometer module.

An operable system with respect to FIG. 9 can comprise a master system module without any extension spectrometer 9520 (master only). The master only configuration can perform laser ablation optical spectroscopy using spectrometer 9510. Furthermore, a master only system can be field reconfigured to add an extension module. An extension model upgrade can add the capability to acquire emission spectra from a plume from the master system module spectrometer 9510 and extension spectrometer 9520 simultaneously. Spectral data from similar and/or different types of detectors in spectrometers 9510 and 9520 can be communicated to computer 8710 through communication channels 8720. A collection optics module 9410 to acquire plasma plume light emission for the extension spectrometer module 9600 can be included in master unit module 9400 when it is shipped from the factory, or a second collection optics module 9410 can added to an optical frame 8440 in the field. Various embodiments with respect to FIG. 9 comprise an optical frame 8440 having collection optics module support substructures 8415, 9415, shown with respect to FIGS. 12A, 12B and 13, to hold respective collection optics modules 8410 and 9410 in a preselected positions and orientations as shown.

Figure 13A:
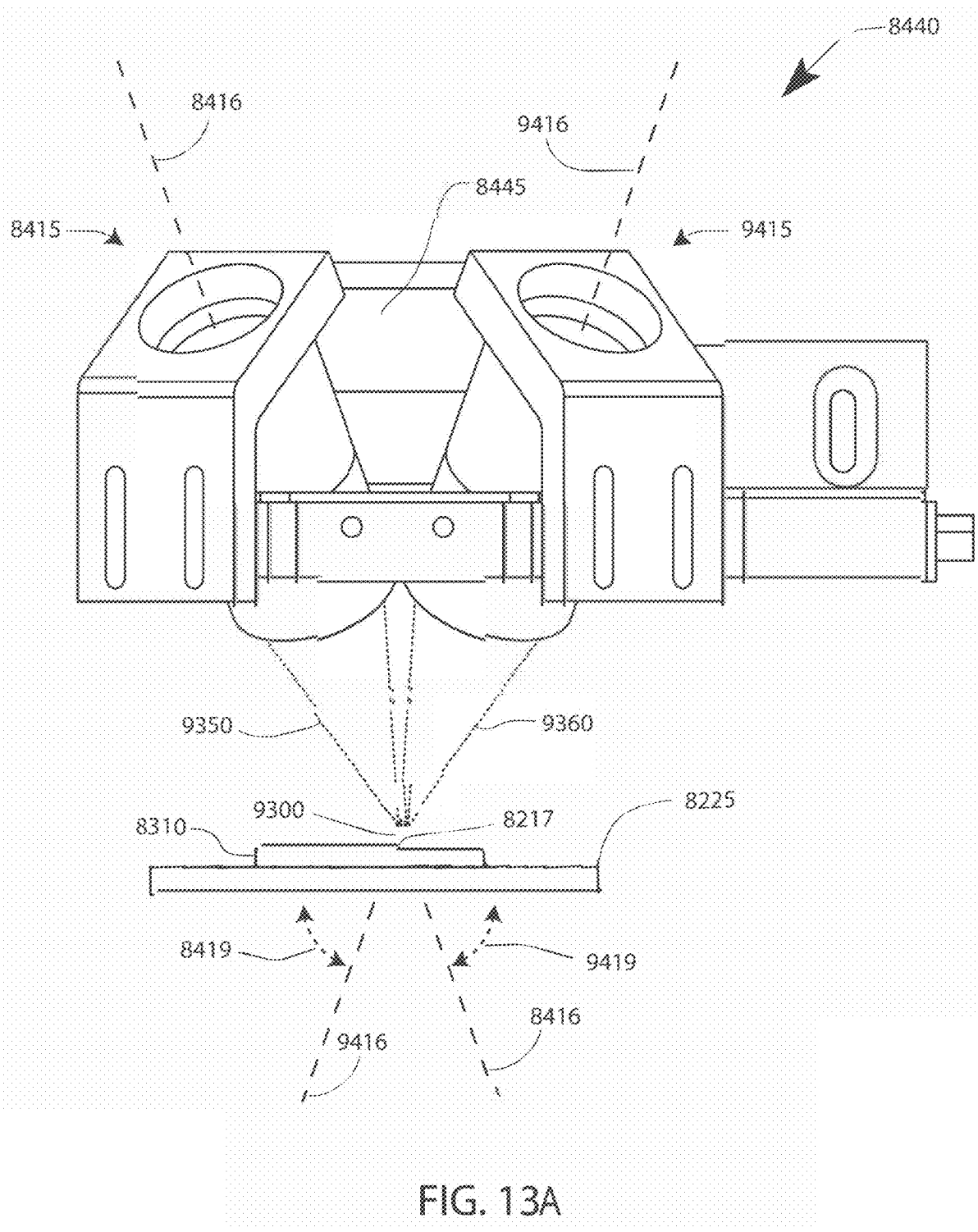

As shown with in FIG. 13A, the supporting substructures 8415 and 9415 can have mirror symmetry with respect one another to be in predetermined positions directing the central axis 8416, 9416 of each collection optics modules to a point 9300 equidistant from each module, where the pulsed laser 8205 spot circle can generate a precise plasma plume. The central axes 8416, 9416 intersect an x-y plane parallel to the stage at equal angles 8419, 9419, from which each module can view from a plume at 9300 and capture equal portions of the light through equal solid angle cones 9350, 9360 subtended by the collection optics modules.

Figure 10:
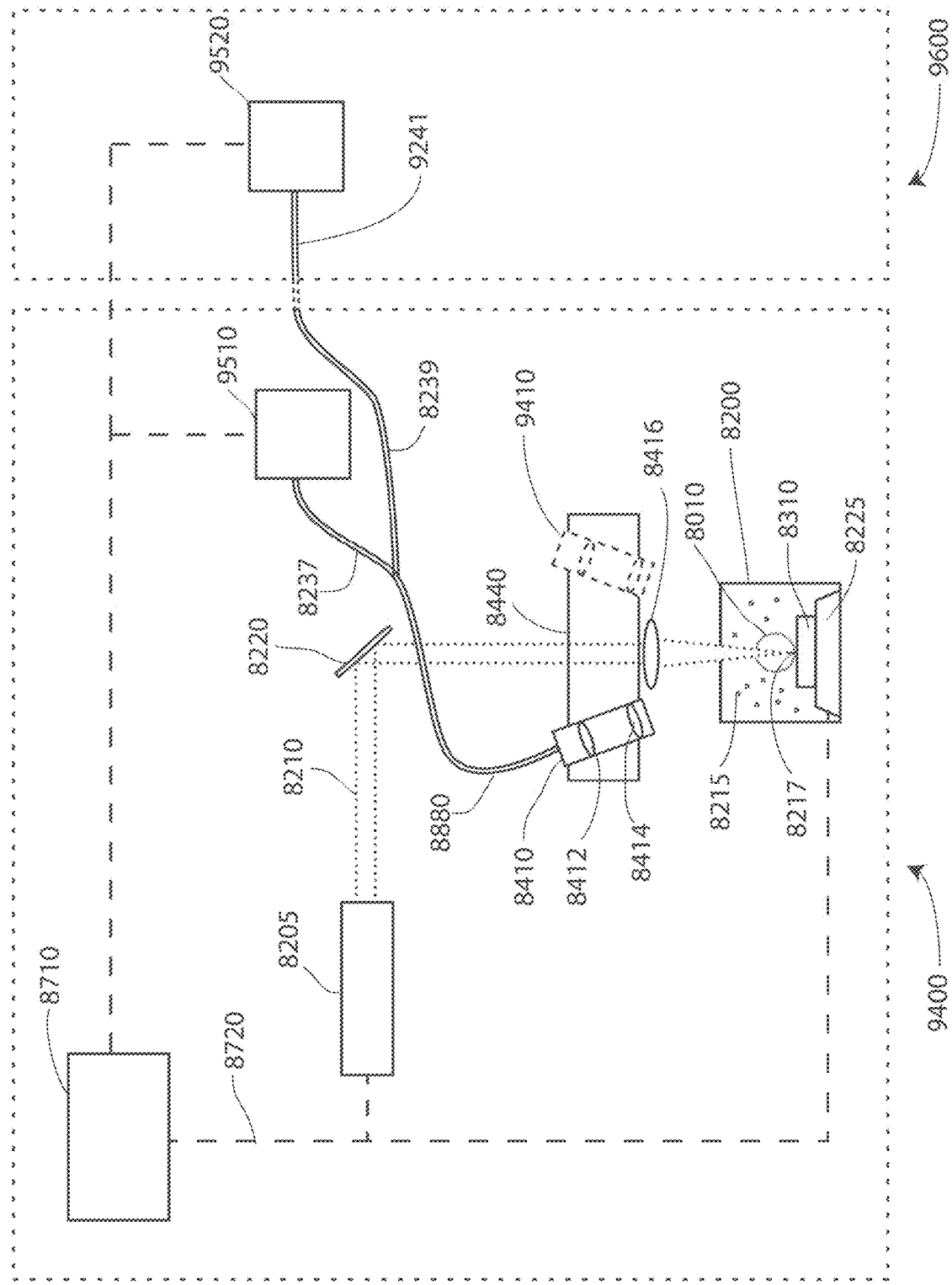
Figure 11:
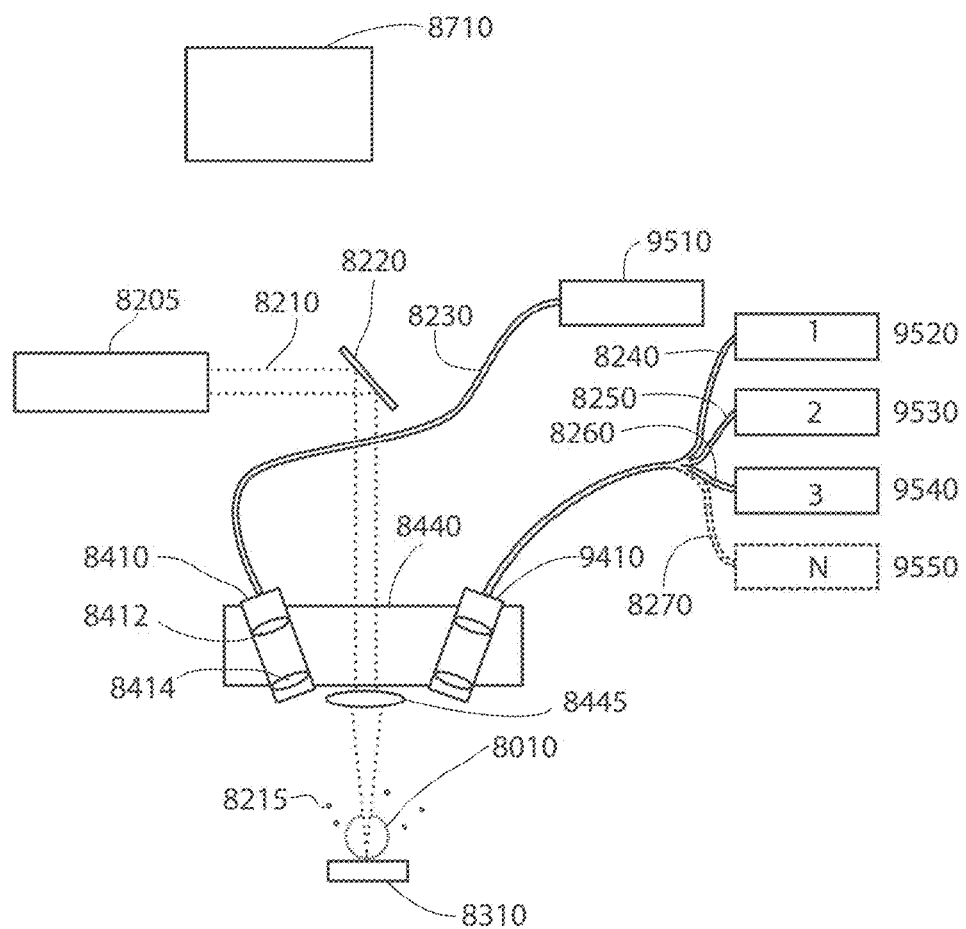

In various other embodiments, a master system module can include one or more of the additional spectrometers and structures shown in an extension module with respect to FIGS. 9-11 (e.g. a single master module LIBS system can comprise various spectrometers, lightguides (optical fibers), and others disclosed with respect to FIGS. 9-11), within one physical unit (the instrument).

Some further LIBS system embodiments can be understood respect to FIG. 10. A lightguide fiber optic bundle 8880 connected to collection optics module 8410 can have a bundle of equal diameter fibers at a principal (proximal) end that is subdivided into smaller bundles leading to the distal split ends 8237 and 8239. Each of the distal split ends can illuminate a separate spectrometer 9510, 9520.

Furthermore, each of the distal split end bundle portions 8237, 8239 can have different numbers of fibers. Accordingly, luminous flux received from a collection optics module by the proximal end can be divided among the split distal ends in proportion to the number of fibers constituting each split end branch. In various embodiments relative to FIG. 10, total spectral power entering the proximal principal end of fiber bundle 8880 from collection optics module 8410, can be split to deliver a relatively smaller portion of the total power through a split end bundle 8237 comprising a relatively smaller number of fibers, and can deliver a relatively larger portion of the total power through a split end bundle 8239 comprising a relative larger number of fibers. The smaller portion of power can be delivered to a high sensitivity and/or low efficiency spectrometer 9510, and the larger portion of the power can be delivered to a low sensitivity and/or low efficiency spectrometer 9520. It will be appreciated that splitting total power in this manner can provide relatively more illumination where more power is necessary and/or desired, and relatively less illumination can be directed to a spectrometer where light intensity from the collection optics module might otherwise saturate its detector.

Relative to systems having two independent collection modules and two independent lightguides disclosed with respect to FIG. 9, use of a spit end lightguide, and/or split end lightguide optical power distribution system distribution (FIG. 10) can save the costs associated of a second collection module 9410 and/or second collection module support structure elements on the optical frame 8440.

Still further embodiments are disclosed relative to FIG. 11. A system with respect to FIG. 11 can provide a first collection optics module 8410 configured to couple a maximum portion of acquired luminous power to spectrometer 9510 through lightguide 8230. Various embodiments can also have a collection optics module 9410 coupled to the proximal principal end of an n-way split end fiber optic bundle. Each split end branch can convey spectral emission to a separate spectrometer. An embodiment with respect to FIG. 11 comprises a fiber lightguide assembly having 4 distal split end bundles 8240, 8250, 8260, 8270 configured to couple to respectively different spectrometers 9520, 9530, 9540 9550. Various further embodiments can have N different spectrometers coupled to a collection optics module with using an N-way split end fiber optic lightguide. There are also embodiments having a plurality of collections optics, where at least two of the modules are coupled to first and second pluralities of different spectrometers (e.g. N and M) using N-way and M-way split end fiber optic lightguides. In this regard, all of the spectrometers in system embodiments disclosed herein can be operable to simultaneous receive the spectral emission emanating from each plasma plume generated in a laser ablation of a sample site.

A LIBS system with the capacity to analyze the spectral emission from the plasma plume at an ablation site in real time, using a plurality of optical spectrometers to receive spectral emission simultaneously, and/or in tandem, has many advantages that enable superior analytical capability relative to prior art systems. Wavelength separating elements (monochromators, polychromators, filters, and others) as well as the detectors (i.e. CCD, ICCD, EMCCD, silicon photodiodes, photomultipliers, and others) useful in an optical spectrometer have absolute and spectral sensitivity limitations that can make it impractical and/or impossible to have sufficiently high spectral resolution, sensitivity, spectral bandwidth, and temporal resolution in a single optical spectrometer instrument that is operable to broadly determine a composition of unknown samples by LIBS multi-wavelength analysis in real time. However, an individual spectrometer can be optimized to enhance sensitivity, resolution, and/or temporal resolution over limited range wavelengths. Accordingly, a plurality of optical spectrometers, individual selected and/or tuned to have optimal characteristics in a limited wavelength region, can provide spectroscopic analyses that are beyond capability of a single spectrometer system.

Analysis of a sample site by optical emission spectroscopy of the ablation plasma plume also can be limited by inherent characteristics of the plasma plume itself. For example, continuum emission can obscure characteristic spectral lines emanating from the ablated material from a sample site. As already disclosed above, continuum interference can be diminished and/or eliminated by using a high-speed detector that is gated to exclusively detect line emission during a time interval after continuum intensity has decayed. Nevertheless, there are also inherent limitations arising from spectral overlap, interference, broadening, and/or low emission intensity at certain characteristic wavelengths, that remain difficult and/or impractical to overcome. Emission spectra analysis has some limitations can be traversed by applying a different spectral technology. For example, an ICP-MS can perform elemental and/or isotopic composition analyses at material concentrations well below 500 ppb, or even less than 1 ppb, that are inaccessible using emission spectroscopy alone. In various embodiments with respect to FIG. 8 simultaneous analysis of gaseous species from a sample site using ICP-MS can provide complementary ion mass to charge ratio peak intensity analytical information. In various embodiments, computer 8710 has analytical software operable to determine the composition of a sample site based on the spectroscopic data from plasma plume emission and the ICP-MS ion mass/charge ratio intensity data as a whole. It is found that the analysis based on LIBS optical emission spectroscopy and ICP-MS ion mass/charge ratio peak intensity data as a whole can detect far more elements, and can have greater analytical accuracy relative to LIBS emission spectroscopy or ICP-MS alone.

A multi-spectrometer system such as disclosed relative to FIGS. 8-11 can have use different types of optical spectrometers and detectors at the same time to advantage. Some embodiments comprise a scanning Czerny Turner spectrograph (CZ) coupled to an ICCD detector. This combination can effectuate extremely high sensitivity owing to maximal light throughput to the ICCD (high efficiency) from the spectrograph, and ICCD capability to amplify weak signals in the detector. Accordingly, it is advantageous where the highest possible sensitivity is needed to detect numerous different elements present in the range of 1 to 10 parts per million. However, this combination has the disadvantage that it can only capture a relatively narrow range of preselected wavelengths with a predetermined spectral resolution. Furthermore, the wavelength range and resolution vary inversely. The higher the spectral resolution, the narrower the range of wavelengths that can be covered at one time. Accordingly, to capture high resolution spectral information from atomic elements having spectral emissions in widely separated wavelength regions using only one CZ-ICCD, the CZ must be sequentially reconfigured to access each of the separated wavelength regions, and an additional ablation of the sample site must be performed after each reconfiguration to generate the spectral emissions for capture.

An embodiment may also include an Echelle spectrometer coupled to an ICCD detector. This combination has the advantageous capability of being able to capture a broad range of wavelengths at one time in emission from the plasma plume arising from a single ablation (a typical range is 200 nm-900 nm, although in a preferred embodiment the range is 190 nm-1040 nm and it can be greater). On the other hand, an Echelle spectrometer generally has low light throughput (low efficiency). For example, an Echelle spectrometer can typically have f/10 aperture light throughput whereas a typical CZ spectrometer generally has about throughput in the range of f/3 to f/4. It can be seen that an Echelle-ICCD system is insensitive by comparison to the CZ-ICCD.

Accordingly, some embodiments comprise a plurality of CZ-ICCD spectrometers wherein each spectrometer is configured to receive a different preselected wavelength range. The plurality of spectrometers as a whole can capture a broad range of wavelengths at one time yet have very high sensitivity and resolution. The wavelength ranges can be contiguous and/or can be separated. Furthermore, various wavelength ranges can be non-overlapping or can have overlapping segments. All of the spectrometers can receive a portion of spectral emission a plasma plume simultaneously from one collection optics module through a split end fiber optic lightguide (described above with respect to FIGS. 10-11), and/or at least some of the spectrometers can receive equal portions of luminous energy from a dedicated of collection optic module as shown with respect to FIGS. 9, 11, and 12-13. One or several of these spectrometers can include a transmission grating operable to provide enhanced sensitivity in the red and near-infrared spectral region.

Some further embodiments comprise an array of Czerny Turner-CCD optical spectrometers (e.g. each comprising a Czerny Turner monochromator with multichannel CCD detector). Each spectrometer covers a preselected, non-overlapping, wavelength region. The array of spectrometers is operable to acquire spectral data synchronously from each ablation. The embodiments have an advantage of being able to capture broadband spectral information in a wide range of wavelengths. For example, an operable range of wavelengths can be 190 nm-1040 nm, although a narrower range can be preferable for greater resolution, depending on the application. In some embodiments there can be overlapping spectrometer wavelength regions. A partially overlapping wavelength region can be useful to calibrate the response of the different spectrometers regions with respect to one another using regions of overlap.

The various detectors and monochromators/spectrographs have advantages and disadvantages with respect to one another. For example, while a CCD detector is generally less sensitivity than an ICCD, CCD technology is relatively inexpensive in comparison to an ICCD having an equivalent number of channels. A CCD detector is well suited for broadband analysis. Besides having less sensitivity, another limitation of CCD detector arrays is that they cannot be gated on and off in very short intervals to discriminate against continuum emission and/or other interference.

In the analysis of unknown samples, a broadband CCD spectrometer and/or array of spectrometers can be first used to survey the principal elements that are present, and identify the elements present in majority, minor, and/or trace concentration levels. After a sample is characterized using a broadband optical spectrometer (such as one comprising a CZ-ICCD or CZ-CCD combination), higher resolution lower intensity spectral data obtained from a high resolution, lower sensitivity spectrometer and/or plurality of high resolution/high sensitivity spectrometers in an array can be provide trace element analysis. As disclosed above, various embodiments can acquire both broadband and low intensity, high resolution spectroscopic data from a single ablation plume simultaneously.

In some embodiments, the sample may be in a solid phase or a liquid phase (i.e., the sample may be condensed matter). In some embodiments, the sample may be in a gas phase. In some embodiments, the sample may be an aerosol; an aerosol is a suspension of fine solid particles or liquid droplets in a gas.

In some embodiments an apparatus includes a laser, a sample holder, an emission collection system, and a spectrometer. The sample holder is configured to hold a sample. The laser is configured to apply laser energy to the sample and generate a plasma 220. The emission collection system is configured to collect optical or electromagnetic emissions from the plasma 220 that may then be input to the spectrometer.

In some embodiments, the spectrometer may be operable to detect electromagnetic radiation of a wavelength of about 200 nanometers (nm) to 900 nm. For example, the spectrometer may be operable to detect intensity and wavelength values of the electromagnetic radiation. In some embodiments, the emission collection system may include collection optics configured to receive light from the plasma and a fiber optic cable operable to transmit the light from the collection optics to the spectrometer. In some embodiments, a detector that is included as part of the spectrometer may include an intensified charge coupled device (ICCD), a charge-coupled device (CCD), or a photomultiplier tube (PMT).

There are some embodiments where a method may be performed with the apparatus 200. A laser energy is applied to a region of a sample with a laser to generate a plasma. In some embodiments, the sample may be in a solid phase, a liquid phase, or a gas phase. In some embodiments, the sample may be an aerosol. A spectrum generated by a plurality of molecular species in the plasma is recorded with a spectrometer or other device. For example, with the apparatus 200, the ablation laser may be used to generate a plasma from the sample, and the emission collection system and the spectrometer may be used to record the spectrum generated by the plurality of molecular species. The spectrometer may detect electromagnetic information (e.g., light) generated by the plasma.

In some embodiments, the laser energy may be applied to the region of the sample in a pulse of laser energy. Any laser wavelength, laser energy, and laser pulse width may be used to generate a plasma. In some embodiments, the laser wavelength may be about 1064 nanometers (nm), the laser energy may be about 50 millijoules (mJ) to 100 mJ, and the laser pulse width may be about 4 nanoseconds (ns). For example, a neodymium doped yttrium aluminum garnet (Nd:YAG) laser may be used to generate energy in the near infrared region of the electromagnetic spectrum with a wavelength of 1064 nm. With a pulse duration of about 4 ns, a laser beam with a power density of greater than one GW/cm2 at the laser beam focal point can be formed. In some embodiments, the pulse duration can be decreased to femtoseconds. In some embodiments, the laser beam can be focused to a spot size of about 10 micrometers to 500 micrometers, or about 150 micrometers to 200 micrometers.

Some embodiments may include ablating the sample with the applied laser energy. Such a process may be referred to as laser ablation or ablation.

Further embodiments may include vaporizing the sample with the applied laser energy. Other embodiments may include desorbing the sample with the applied laser energy. Some embodiments include vaporizing the sample or desorbing the sample with the applied laser energy, a plasma may not be formed with the applied laser energy. In these embodiments, the method may further include imparting additional energy to the vaporized or desorbed sample to form a plasma including the plurality of molecular species.

In some embodiments, additional energy may be imparted to the plasma. The additional energy may cause molecular species in the plasma to produce additional optical or electromagnetic emissions that can be detected with the spectrometer. In some embodiments, such additional energy may be imparted to the plasma in a microwave field or a radio frequency (RF) field. In some embodiments, such additional energy may be imparted to the plasma with an additional pulse of laser energy. For example, there are some embodiments that may include applying a first pulse of laser energy at a first angle with respect to the sample, and then applying a second pulse of laser energy at a second angle with respect to the first angle. In some embodiments, the second angle may be about 0 degrees to 90 degrees with respect to the first angle.

The plasma may include ionic, atomic, and molecular species. In some embodiments, the plasma, immediately after application of the laser energy may include a molecular species or a plurality of molecular species. In some embodiments, species atomized from the sample may react with each other to form a molecular species or a plurality of molecular species. The molecular species may include diatoms (e.g., $Na_2$, $C_2$) or excimers (e.g., $He_2$, $Xe_2$, and $XeCl$), for example.

In some embodiments, the plasma may be allowed to react with species in the surrounding environment to form a molecular species. For example, operation may be performed in ambient air under ambient pressure. Species in the plasma may react with oxygen or nitrogen, for example, in the air to form oxide molecular species or nitride molecular species, respectively. Whether the as-formed plasma includes molecular species depends in-part on the laser wavelength, the laser pulse duration, the laser power, the laser spot size, and the laser fluence. When the plasma is allowed to react with species in the surrounding environment to form a molecular species, the time needed for such a reaction or reactions also depends in-part on the laser wavelength, the laser pulse duration, the laser power, the laser spot size, the laser fluence, the sample, and the molecular species.

In some embodiments, a period of time between operations is set or specified to increase or maximize the intensity of molecular emission and to decrease or minimize atomic emission and ionic emission (i.e., emission from atoms and atomic ions). Again, this period of time depends in part on the laser wavelength, the laser pulse duration, the laser power, the laser spot size, the laser fluence, the sample, and the molecular species.

As noted above, optical or other electromagnetic emission generated by the plasma may be recorded by a spectrometer or other device. Some embodiments include recording the spectrum with visible spectroscopy, recording the spectrum with ultraviolet spectroscopy, recording the spectrum with infrared spectroscopy, or recording the spectrum with near-infrared spectroscopy. Some embodiments include recording direct optical emission of the plurality of molecular species, recording optical absorption of the plurality of molecular species, recording induced fluorescence of the plurality of molecular species, recording Raman scattering of the plurality of molecular species, recording luminescence of the plurality of molecular species, recording phosphorescence of the plurality of molecular species, recording photoacoustics of the plurality of molecular species, or recording photoionization of the plurality of molecular species.

In some embodiments, the method may be performed more than once or a plurality of times on the same region of the sample. The recorded spectrum for each repetition of the method may then be averaged. For example, in some embodiments, the method may be repeated two times or three times on a region of a sample. Performing the method on the same region of the sample multiple times and averaging the results may yield a spectrum with less noise and less experimental error.

A chamber may contain a specific gas or gasses at a specific pressure or pressures. The gas or gasses may be specified, depending on the sample being analyzed, such that desired molecular species may be formed that aid in quantifying the abundance of isotopes in the sample. For example, a gas may be selected such that the spectra formed by two molecules, each including a different isotope of an element, in the sample have an isotopic spectral shift that is able to be resolved by the spectrometer being used. Further, the sample inside the chamber may be held at a specific temperature. When a sample is held at one temperature versus a different temperature, different molecular species may be formed in the plasma. Using such an apparatus 700, some control over molecular species formed when the plasma reacts with the environment may be achieved; i.e., by controlling the plasma properties, the formation of specific molecules can be controlled.

Some embodiments, to control the gas or gases with which the plasma may react, the chamber may be operable without a chamber. In some of these embodiments, tubes or other devices may be used to deliver a gas to the region where the plasma is to be formed.

In some embodiments, laser energy is applied to a region of a sample with a laser to generate a plasma. The plasma generated may be generated in a chamber of the apparatus. The chamber may contain a specific gas or gasses at a specific pressure or pressures. A spectrum generated by a plurality of molecular species in the plasma is recorded with a spectrometer or other device.

Liquid Sample Analysis

LIBS apparatus and methods operable to analyze the elemental composition of liquids having various viscosities without prior sample preparation or phase change are described.

Various embodiments of a laser ablation analysis instrument are suitable for elemental analyses of liquid phase samples having wide range of physical characteristics and chemical compositions. For example, virtually any liquid such as petroleum, light and heavy fuels, liquid food products, and solvents can be analyzed.

Figure 13B:
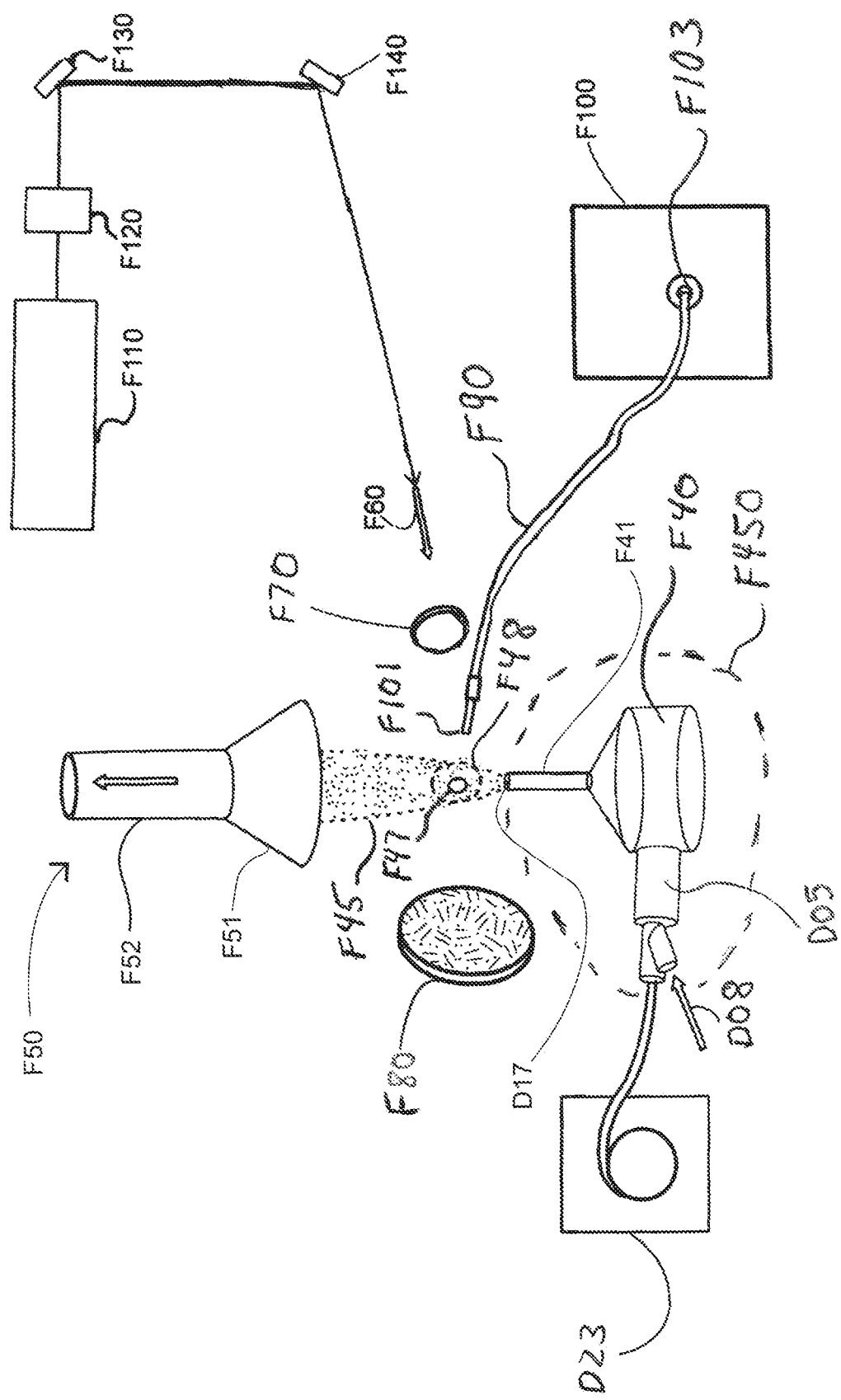

FIG. 13B shows a schematic diagram of a LIBS apparatus and optical paths of a laser beam for analysis of a liquid phase in an illustrative embodiment according to the present disclosure. A LIBS apparatus for analysis of liquid samples can include an aerosol jet source (AJS) F450 to create an aerosol jet flow F45 flowing in a vertical direction. The aerosol jet has small liquid phase sample droplets suspended in a carrier gas. The carrier gas can be introduced into the AJS through a tubulation D08 as shown in FIG. 13B. In some embodiments the liquid sample can be introduced into AJS F450 with a computer-controlled metering pump D23.

In some embodiments, an AJS can be effectuated using a nebulizer D05 coupled to a spray chamber F40. The carrier gas can be nitrogen, air, argon, helium and others, depending on the embodiment. The carrier gas can be supplied to the AJS from a conventional source such as a module comprising a compressed gas tank, a pressure regulator, a pneumatic or electronic flow controller, valves, tubing, fluid connectors, and others.

The LIBS apparatus can further include a pulsable laser F110 and various optical elements such as an attenuator F120 to control laser power, mirrors F130, F140 to direct a beam of laser pulses F60 to an ablation region/analysis zone F48, and a lens F70 to focus to the laser beam to a preselected focal point and a laser spot size to create a plasma plume F47 comprising material from liquid sample droplets in the region F48 surrounding the laser focal point.

The light emanating from the laser-induced plasma can be collected and focused using a concave collection mirror F80 to concentrate the collected light at a focus point inside the proximal end F101 of a fiber optic lightguide F90. A distal end F103 of the lightguide F90 can couple spectral light into an optical spectrometer/detector F100 that can disperse the light and detect spectral wavelength and intensity values. The spectral wavelength and intensity data values are sent to a system computer in the apparatus, where spectral analysis software is used to determine the liquid phase sample composition based on the spectral data.

The apparatus also has an exhaust system F50 which is operable to remove substantially all of the material in the vertical aerosol jet that emanates from an orifice of the AJS. The exhaust system F50 can include a suction funnel F51 operable to provide boundary conditions for the streamlines of the aerosol jet and a surrounding blanket of the atmospheric gas within the apparatus to pass through the funnel and be exhausted from the system through fluidic passage F52. The exhaust system can also include a pump or fan that can impose a differential pressure across the fluidic passage operable to draw the aerosol and surrounding surround gas through a conventional scrubber and/or purification filter such as a HEPA filter, activated carbon, and/or others.

Sensitivity and accuracy of the liquid LIBS system depends on various system parameters. Particularly critical factors include characteristics of the bounded/ducted aerosol flow within the AJS, outlet orifice diameter and other hydrodynamic variables controlling the free aerosol jet flow (e.g. Reynolds number), vertical position of the laser focus spot relative to the AJS orifice, and the droplet number density and size distribution of the aerosol jet. It is particularly critical to have a narrow size distribution without any large droplets, since large aerosol droplets may not be vaporized and/or ionized sufficiently, and large droplet can distort/scatter laser pulses. Excessively small droplets, on the other hand, may be blown out of the jet by a shockwave from the ablation. In this regard, the aerosol droplets should have a diameter no greater than about 10 μm. In a preferred embodiment, an aerosolized liquid droplet size distribution is in the range of 0.1 μm to 10 μm. It is also important to optimize the alignment and geometry of LIBS optical components, the laser ablation position, and the amount of light that can be collected from a plasma plume.

An aerosol jet should include an amount of liquid sufficient to produce an intense optical LIBS signal, but the number density of droplets should be low enough to avoid coalescence of droplets, or distorting the spatial/temporal stability and/or profile of the free aerosol jet.

An embodiment according to FIG. 13B, can have an AJS comprising a nebulizer D05, a spray chamber F40, and a nozzle/collimating channel F41 leading to an outlet orifice D17. The density and size distribution of droplets in the aerosol jet can be varied by adjusting flow rates of carrier gas and liquid sample feeds to the AJS. The length and dimensions of the output nozzle (e.g. the collimating channel and orifice) also influence the aerosol density and size distribution. Laser pulse energy, placement of the light receiving end of the fiber optic lightguide (e.g. vertical distance of the light receiving end of the fiber optic lightguide relative to the orifice and horizontal distance from the aerosol jet), and the design and dimensions of the light collection optics (particularly the effective capture solid angle of the collecting mirror) are critical factors to obtain a high signal to noise ratio and accuracy in liquid LIBS analysis of trace elements.

Figure 14A:
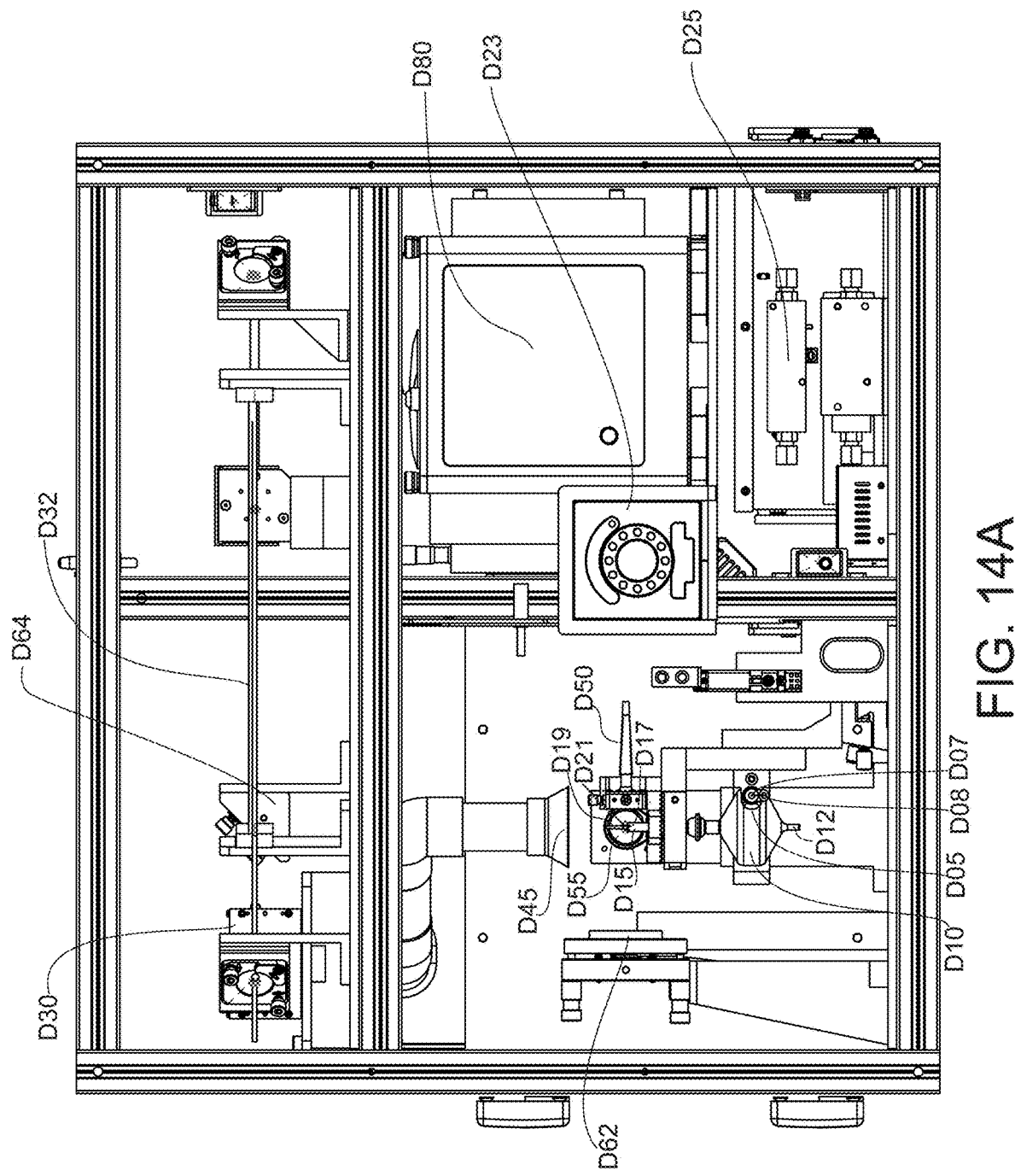
Figure 14B:
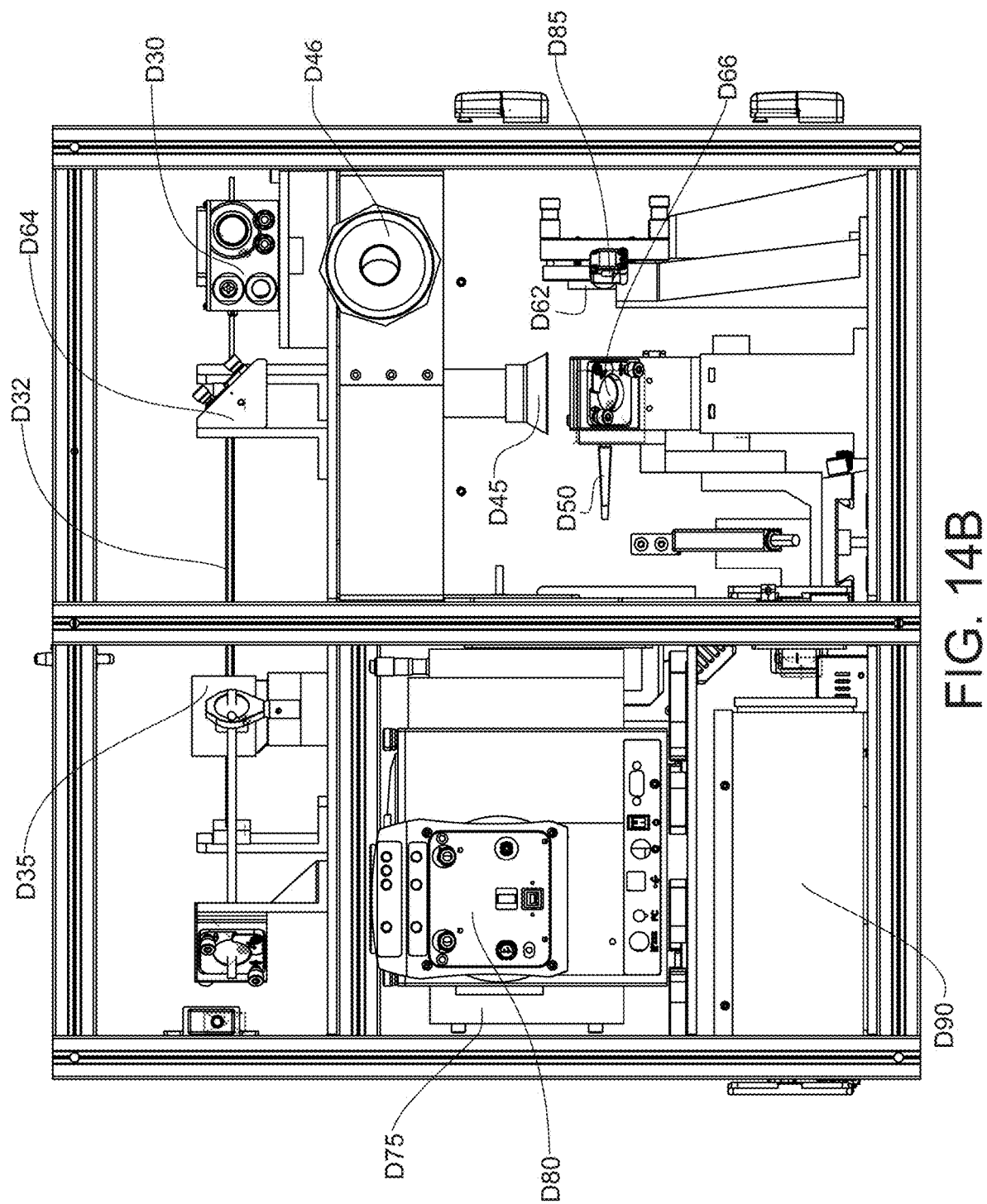
Figure 14C:
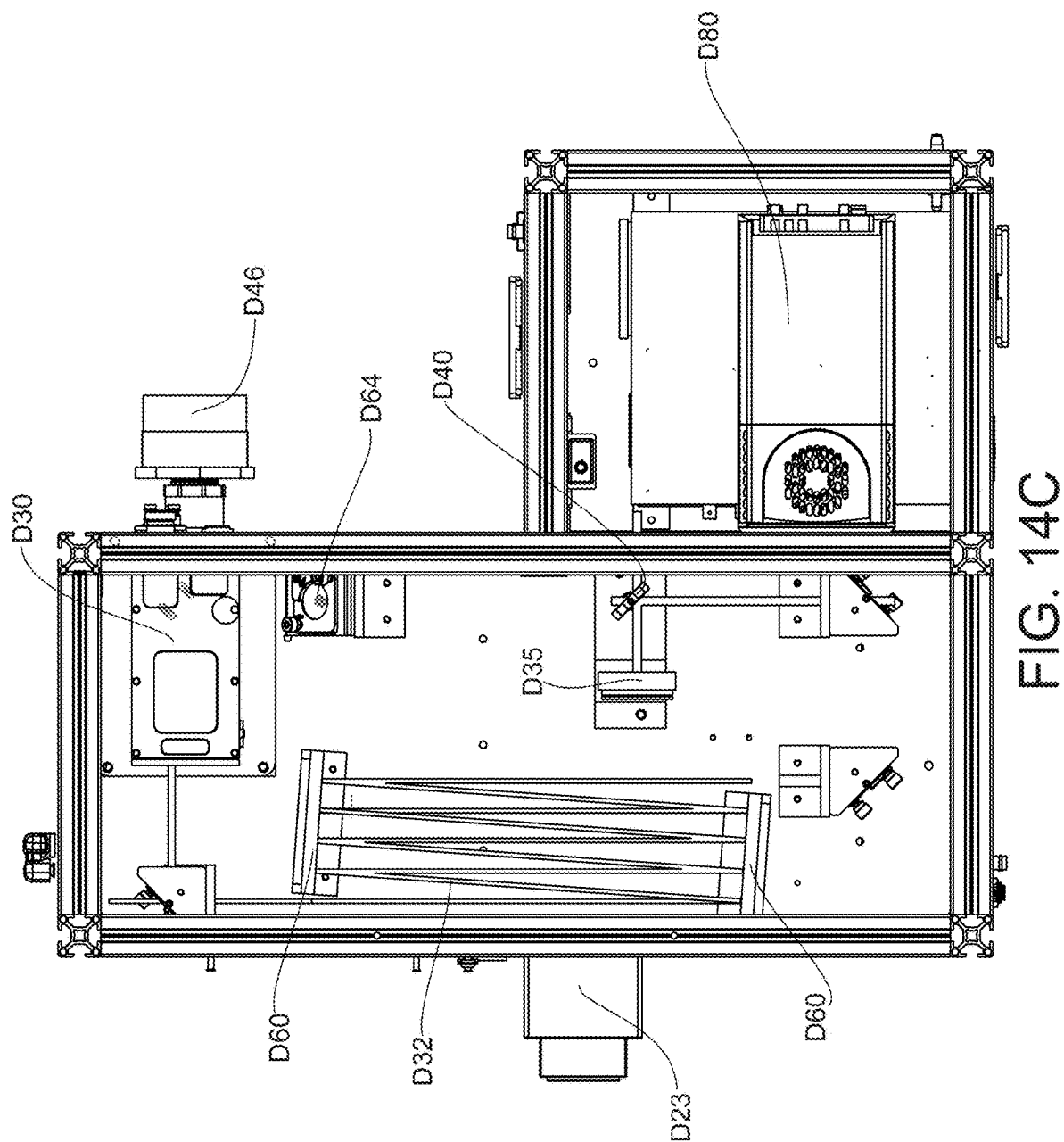

FIGS. 14A-C show diagrams of another liquid LIBS embodiment. The embodiment includes an aerosol jet source (AJS) comprising a nebulizer D05, a cyclonic spray chamber D10, an aerosol output nozzle D15 and an aerosol output nozzle orifice D15, a compact pump D23 to deliver a liquid phase sample material D07 with a preselected flow rate to the nebulizer D05, a flow controller D25 to regulate the flow rate of a pressurized carrier gas D08 introduced into the nebulizer D05, a pulsable laser D30, a beam splitter D40, an energy meter D35 to monitor the laser power, various optical elements to create a plasma plume from an aerosolized liquid sample material, an exhaust system including an exhaust funnel D45 and a pipe system D46 for removal of aerosol droplets from the LIBS apparatus, light gathering and transmitting elements (which can include a lightguide including a plurality of optical fiber bundles D50, various lenses D55, mirrors such as a folding mirror D60, a concave mirror D62, a downward folding mirror D64, and a sideway folding mirror D66) to focus and confine a laser beam D32 to a preselected an aerosol jet stream D19 area and collect lights from a plasma plume D21, a spectrometer D75 with a detector D80, a viewing camera D85 to monitor a plasma plume D21 formed in the system and help alignment of optical components, various electronics D90 including a power supply, a digital/analog 10 control, a pulse generator and a power distribution board, computer software and/or firmware operable to perform real time data analysis, and various control loops operable to automate operations without human interaction.

Figure 15A:
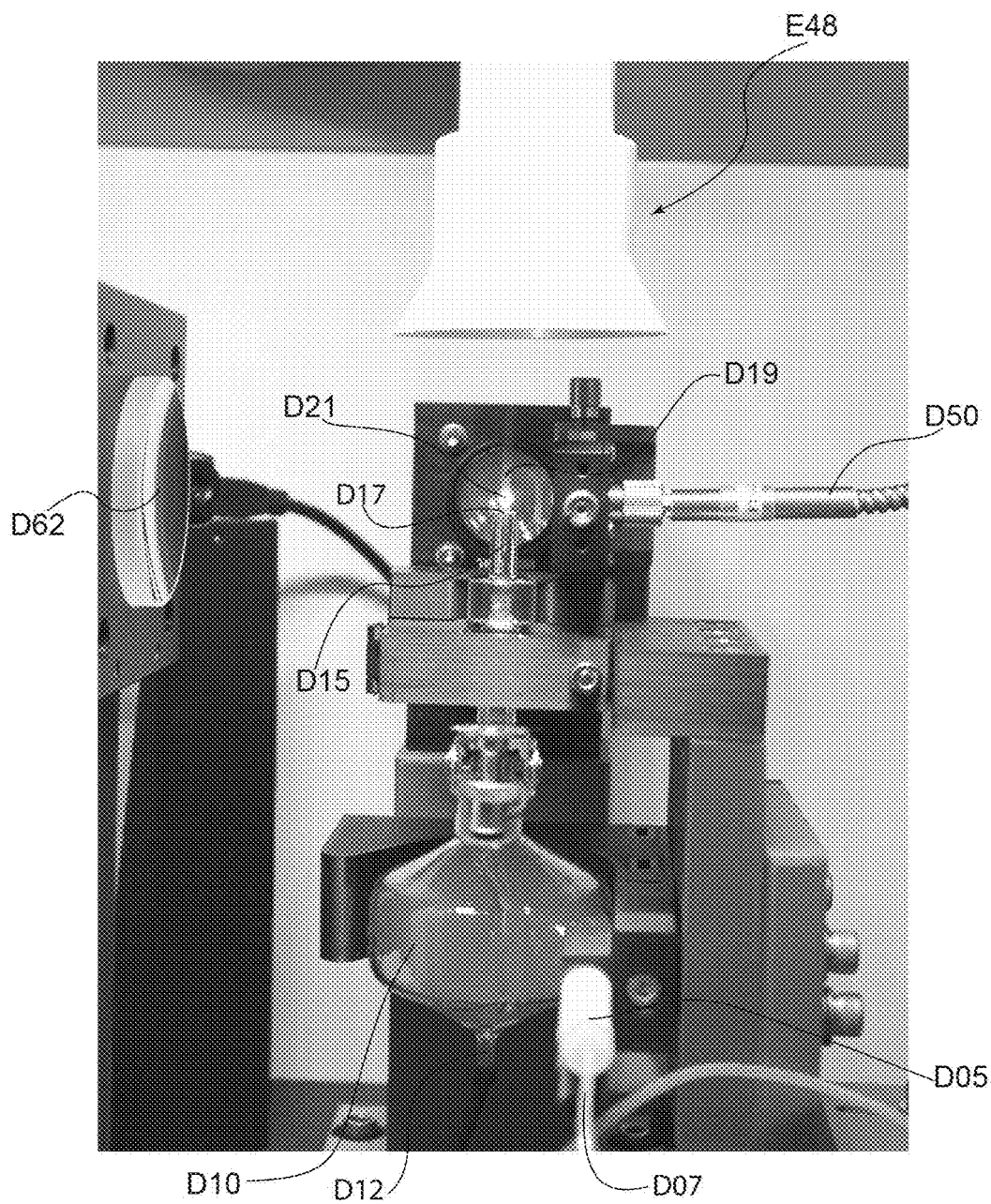
FIG. 15B is a drawing of an aerosol jet source and various optical components in a liquid LIBS embodiment.
FIG. 15C shows a top view of an aerosol jet source and various optical components of the liquid LIBS shown in FIG. 15B.
FIG. 15D shows a side view of an aerosol jet source and various optical components of the liquid LIBS shown in FIG. 15B.
FIG. 15E shows a simplified top view of the optical components of a liquid LIBS and their relative positions.
Figure 15B:
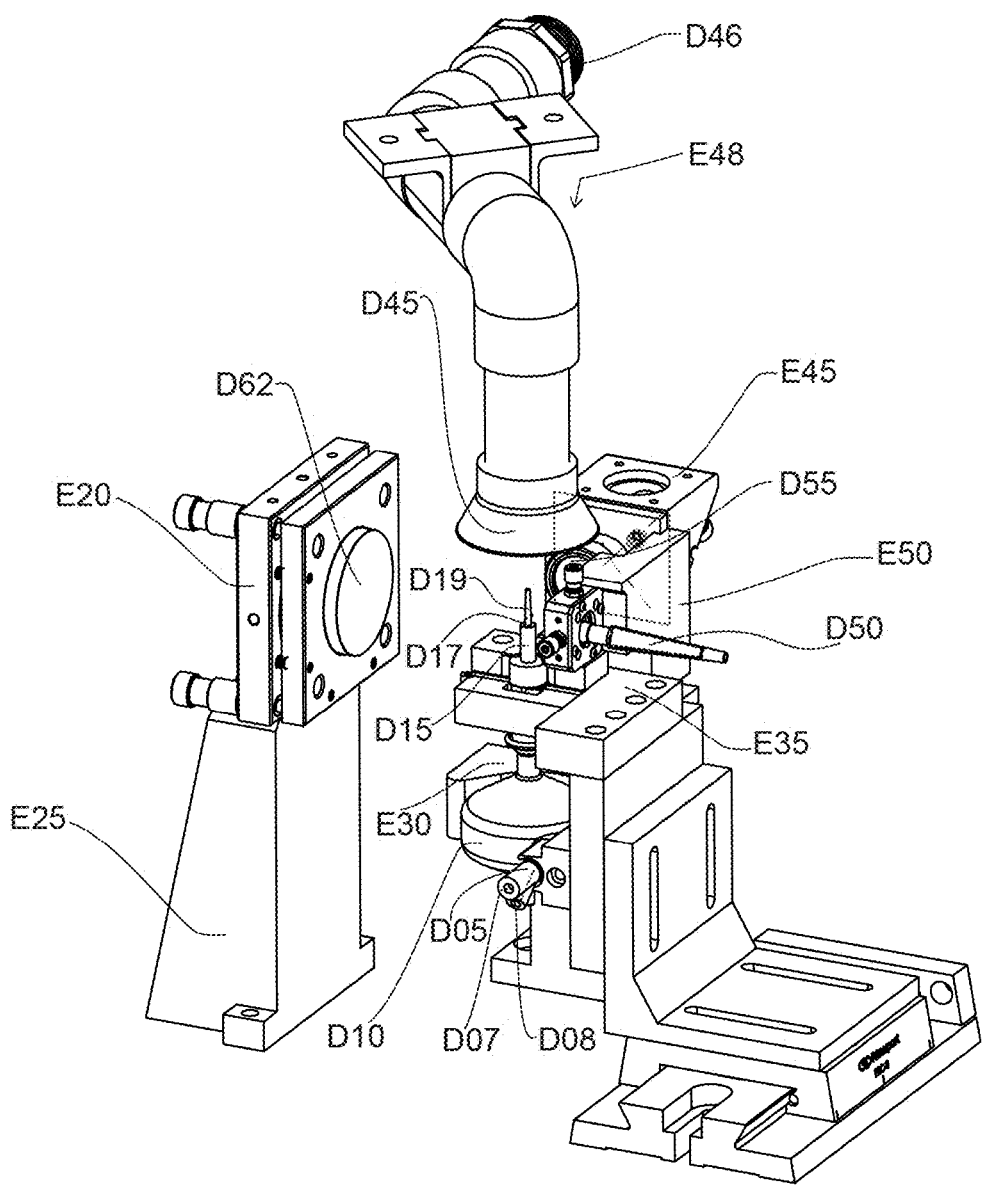
Figure 15C:
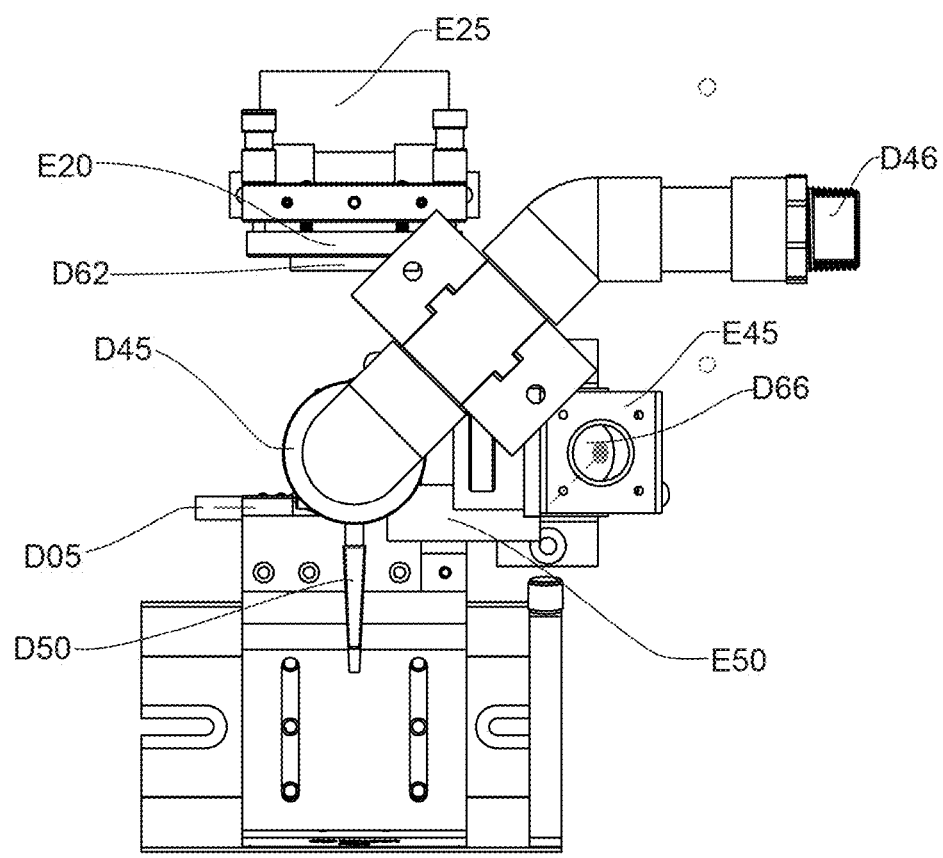
Figure 15D:
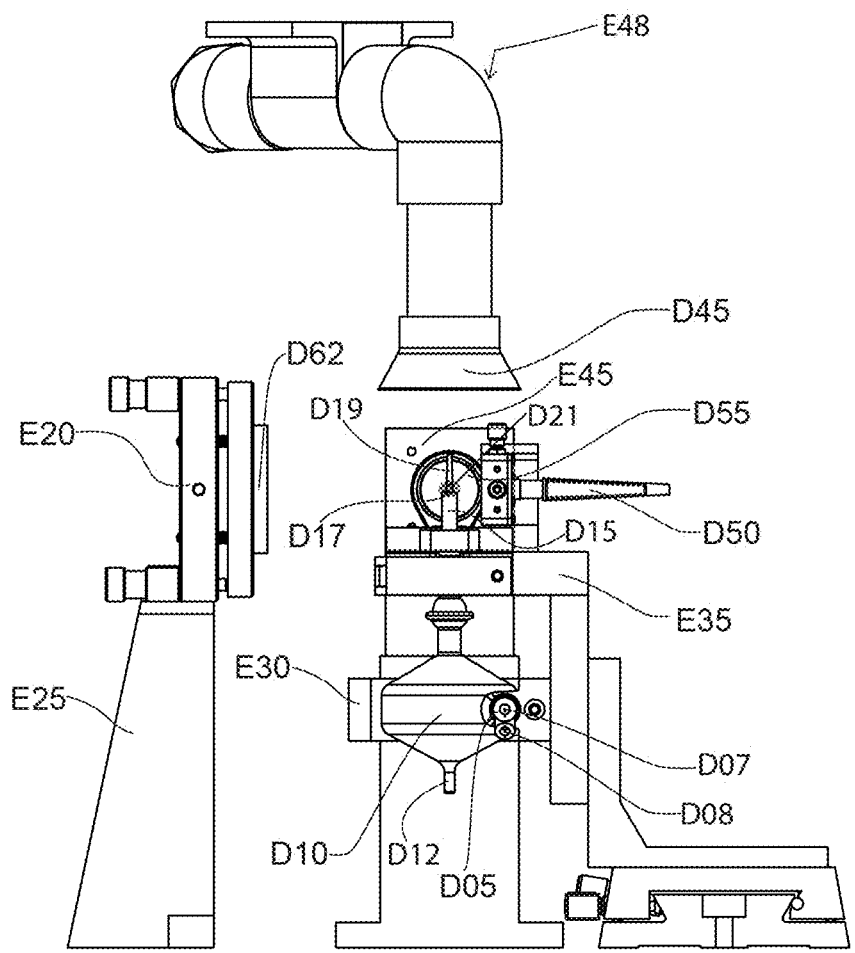
Figure 15E:
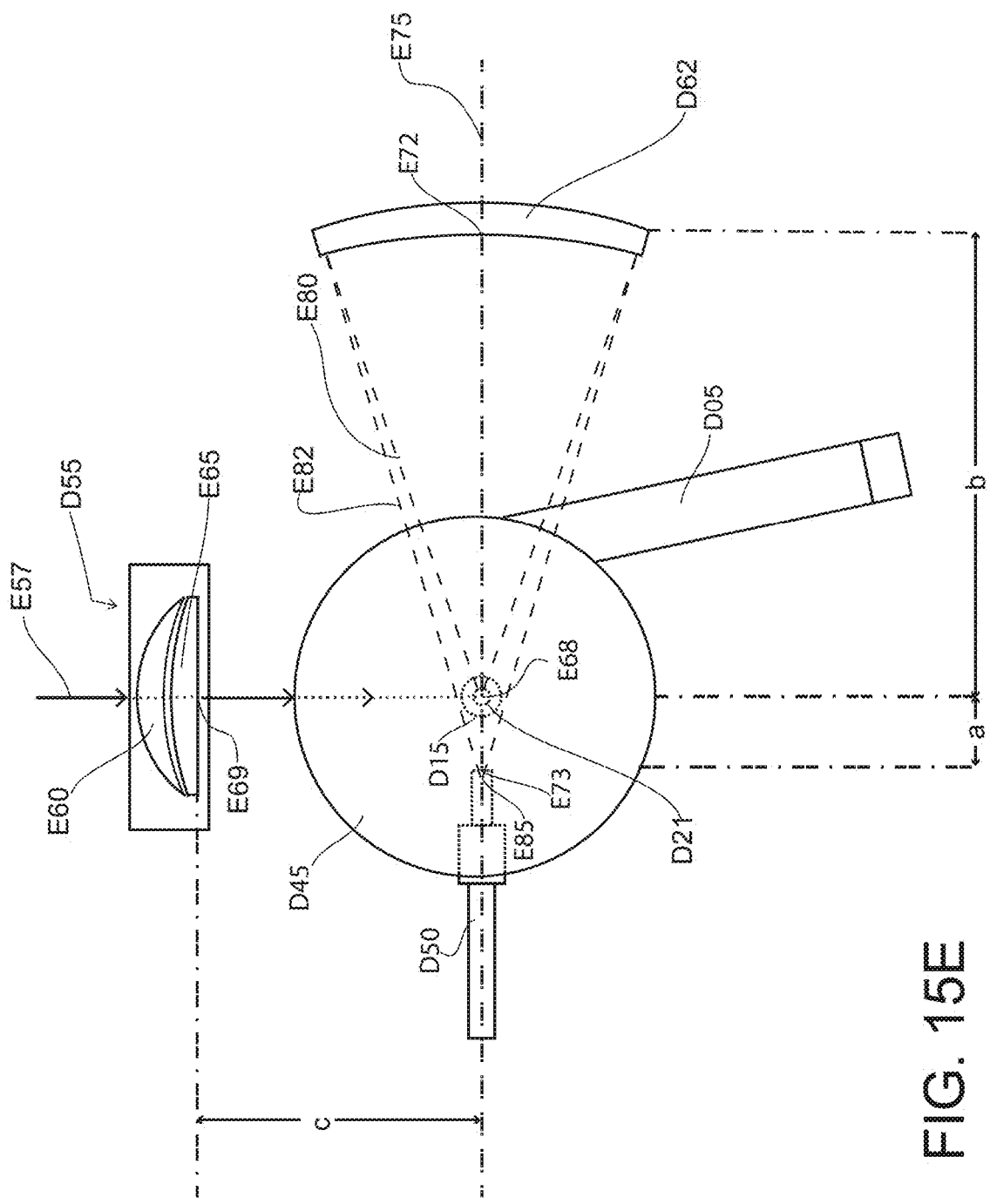

In some embodiments, a laser beam D32 produced by a laser D30 goes through serious of optical paths to a predetermined laser focus area in FIG. 14C and FIG. 15E. Two flat mirrors D60 can be installed at a fixed low angle of incidence that causes the laser beam D32 to undergo multiple reflections. Two sideway folding mirrors reflect the laser beam to a beam splitter D40. The split laser beam goes a downward folding mirror D64 and a sideway folding mirror D66 to produce a laser beam with an approximately Gaussian amplitude profile E57 shown in FIG. 15E. A Gaussian beam profile is generally an optimal profile for generating plasma in an aerosol jet because it can be focused tightly and therefore can produce a highly energetic plasma. In some embodiments, the laser beam is focused to a spot diameter in the range of 10 μm to 100 μm. In an embodiment, a laser pulse can deliver an energy in the range of about 40 mJ to 100 mJ.

The aerosol jet can exhausted through a by a pump having air purification filters such as an activated carbon, HEPA, ASHRAE, any combination thereof, and/or others connected to an exhaust funnel system. Vertical and horizontal distance of the exhaust system from an aerosol nozzle D15 are optimized to cover a large enough area of aerosol jet stream D19 produced by an AJS without disturbing the flow of the aerosol jet D19. In an embodiment, the exhaust funnel D45 of a diameter of 55 mm is aligned vertically with the aerosol output nozzle D15 of a 2.5 mm inner diameter and placed approximately 76.6 mm to 101.6 mm above the aerosol output nozzle D15. In some embodiments, a negative pressure generated in the exhaust system can drive the movement of an aerosol jet stream D19 toward an exhaust funnel D45, and then filtered by an activated carbon or HEPA filter and released through the exhaust pipe D46 to an ambient air. In further embodiments, a positive pressure in a LIBS instrument compared to an exhaust system can help traveling of aerosol droplets along a stream line by (Hydrodynamics by Sir Horace Lamb, Cambridge University Press, 1932, 6th Edition) toward the exhaust funnel D45. Unused liquid sample can be drawn off into a recycling or waste bottle.

In an exemplary embodiment, FIGS. 15A-D illustrate an aerosol jet source (AJS) configured for a liquid LIBS apparatus and relative positions of some liquid LIBS optical components. The AJS comprises a nebulizer D05 to form aerosolized droplets, a spray cyclonic chamber D10 to improve size distribution and density of aerosol produced by the nebulizer D05, a liquid removal outlet D12, and an aerosol release nozzle D15. The nebulizer D05 is connected to the spray chamber D10 mounted on a spray chamber mount E30. The spray chamber mount E30 holds and/or supports the spray chamber D10 during an aerosol droplet generation. The spray chamber D10 includes a vertical aerosol collimating nozzle D15, which is tightly held by a nozzle mount E35, and a liquid removal outlet D12 to remove unwanted liquid present in the spray chamber D10. In some embodiments, a liquid phase sample material D07 of 1-10 mL volume can be introduced to the nebulizer D05 with a flow rate ranging from 250 to 800 µL/min. For example, the flow rate of liquid of liquid can be 250 µL/min for 75cSt mineral oil and 550 µL/min for aqueous solutions. Depending on the application, a pressurized carrier gas D08 with a flow rate ranging from 0.6 to 1 L/min can be delivered to the nebulizer D05. The liquid phase sample material D07 and the pressurized carrier gas D08 are mixed in the nebulizer D05 forming aerosolized droplets. The aerosolized liquid emerging from the nebulizer D05 enter into the spray chamber D10 and circulates briefly to eliminate large droplets. The large droplets fall to the bottom of the spray chamber D10 due to the circulation step and are removed from the chamber D10 via the liquid removal outlet D12. The circulation step in the spray chamber D10 filters the aerosol droplets and thus only relatively fine aerosol droplets exit from the aerosol output nozzle orifice D17. In some embodiments, an aerosol droplet diameter can be in the range of 0.1 µm to 10 µm to provide an efficacious liquid LIBS analysis. The velocity of the free aerosol jet emerging from the nozzle orifice D19 is largely determined by the flow rate of the carrier gas entering the nebulizer. The density of the aerosol droplets can be determined based on the ratio of an amount of liquid aerosolized to the volume of the carrier gas introduced the nebulizer D05. The amount of liquid aerosolized is the difference between the amount of the liquid introduced to the nebulizer and the amount of liquid removed from the outlet D12. It is found that the aerosol jet source disclosed herein produces aerosol droplets with approximately 10 to 20 percent efficiency. About 80 to 90 percent of the liquid sample material delivered into the nebulizer is discarded from the outlet D12. Based on 10% efficiency and the disclosed flow rates of a liquid sample material and the carrier gas, the liquid to gas ratios in the aerosol jet stream can be estimated in the range of $2.50 \times 10^{-5}$ to $13.33 \times 10^{-5}$. For the 20% efficiency of the aerosol jet source, these ratios for the liquid to gas in the aerosol jet stream can be calculated in the range of $5 \times 10^{-5}$ to $26.67 \times 10^{-5}$. These ratio ranges show that the amount of the liquid material in the aerosol jet stream D19 is about four orders of magnitude less compared to the carrier gas. Hydrodynamics of the aerosol jet stream D19 is very similar to the hydrodynamics of the carrier gas. In order to have a good insight into the flow pattern(s) of an aerosol jet stream, the Reynolds numbers of the carrier gas are calculated. The carrier gas is assumed to be air in these calculations. Using the lower and higher flow rate of the carrier gas disclosed herein, a characteristic distance (aerosol outlet nozzle orifice diameter, 2.5 mm), density air (1.225 kg/m$^3$), and viscosity of air (0.01682 cP), the Reynolds numbers of the carrier gas are estimated to change between 387±50 and 661±50 indicating that the aerosol jet stream produced from AJS is in a laminar flow regime. The free aerosol jet D19 maintains an initial diameter of approximately 2.5 to 3 mm (approximately the orifice diameter) for a considerable distance (over 10-20 orifice/initial jet diameters) as can be seen in FIG. 15A.

As described above, horizontal AJS often form some droplets that can drip from orifice and/or perturb and/or deflect the aerosol flow jet stream from the intended trajectory centered around the laser focus area. Spurious droplets also can spray and/or otherwise wet various optical components in the system causing optical distortions/aberation and/or beam misalignment. These problems have been found to cause large fluctuations/instabilty in liquid LIBS signal intensity and resolution. A vertical AJS configuration such as shown in FIGS. 15A-D have found to be free of such problems. In particular, a vertical collimating nozzle orientation have been found operable to prevent formation/accumulation of liquid and/or large droplets at the on the orifice tip of a nozzle D15.

In further embodiments, a curtain of compressed air and/or another inert gas is emitted to surround the aerosol jet stream D19 from where it emerges from the aerosol generator nozzle orifice D17. The velocity of the inert gas curtain can be similar to the velocity of the aerosol flow so as to minimize shear and/or turbulence between the curtain and aerosol jet. This inert gas curtain can provide a buffer between the aerosol droplets and fiber lightguide. This curtain can allow the light gathering end of the lightguide to be positioned relatively closer to plasma plume without being impacted by droplets that might otherwise wet and/or collect on the end of the lightguide. Reducing the distance between the plasma and end of the lightguide allows more efficient light collection and less magnification of the image of the plasma emanating from the collection mirror D62. In a preferred embodiment, the smallest practical magnification was found to be about 1.2.

FIGS. 15A-D also illustrate some optical components of a liquid LIBS including the lightguide D50, a compound lens system D55 and a sideway folding mirror D66, and a concave mirror D62 configured to use for liquid LIBS analysis. A right-angle kinematic mirror mount E45 holds the sideway folding mirror D66 at a 45° angle to the vertical axis of the apparatus to refract the laser beams towards the compound lens system D55 in FIGS. 15B-D. The compound lens system D55 includes a plano-convex lens E60 and a meniscus lens E65, each having a diameter of 2.54 cm, focuses a laser beam to a preselected small focus region in an aerosol jet stream D19 as shown in FIGS. 15A-D and FIG. 15E. Using a combination of a convex lens E60 and a positive meniscus lens E65 shown in FIG. 15E reduces the focal length and minimizes spherical aberration. The meniscus lens prevents a second focus point of the secondary laser rays reflected from the main convex lens. In some embodiments a preselected small focus position of the laser beam can be at the interaction between the center of an aerosol jet emerging from an output nozzle E68 and a preselected distance above the tip of the aerosol output nozzle D15 in FIG. 15E. Choosing an optimal vertical distance from the tip of the output nozzle D15 for the laser focal position is critical to achieving highly sensitive and reproducible liquid LIBS analyses. In a preferred embodiment, a laser beam is focused to a position in the range of about 1-3 mm above the tip of the aerosol output nozzle D15. An output nozzle with an inner diameter of 2.5 mm sets the outer boundaries of an aerosol jet stream D19 emerging from the nozzle output orifice D17. A suction from the HEPA filters located in the exhaust system E48 forces an aerosol jet stream D19 go straight toward the exhaust funnel. A laser beam focused on a preferable focus area in an aerosol jet stream ablates the aerosol droplets at the focus area and forms a plasma plume D21. In some embodiments, the diameter of laser spot (or region) can be around 100 μm or less, approximately 10 times bigger than the largest favorable aerosol droplets size (10 μm) and 1000 times bigger than the smallest favorable aerosols droplet size (0.1 μm). Depending on an application, the energy of a laser beam between 40 millijoules and 100 millijoules per 100 μm laser spot size is found to be sufficient to vaporize and ionize aerosol droplets and form a plasma plume D21 effectively. A mirror mount E25 and a mirror holder E20 holds the concave mirror D62 in a preselected position to collect a large proportion of the lights from the plasma plume E10 and transmit to the lightguide D50 shown in FIGS. 15A-E. In some embodiments, the concave mirror D62 can have a focal length of 38.1 mm and a diameter of 5.08 cm. The lightguide D50, which is maintained at a preselected position by an optical fiber mount E50, collects and transmits the lights from the concave mirror D62 to a spectrometer with a detector. Depending on the type of detector being used, the diameter of a lightguide can be between 1 and 2 mm.

An exhaust system E48 connected to a HEPA filter removes the remaining aerosol droplets and/or an aerosol jet stream from the laser ablation area after the LIBS analysis is completed.

In further embodiments, a liquid LIBS apparatus without the concave mirror D62 can be made if a protective gas is used around an aerosol jet stream D19. The protective gas enables a shorter distance between the lightguide and the aerosol jet streamtube, and prevents the wetting of the lightguide optical fibers. Thus, in some applications, a sufficient light can be collected for a LIBS analysis without having a concave mirror D62.

The arrangements and positions of a liquid LIBS's optical components relative to the aerosol output nozzle D15 can be further optimized to obtain maximum signal efficiency with minimum signal fluctuation and no aerosol droplets and/or byproducts deposition on the optical components of the liquid LIBS apparatus.

FIG. 15E shows a simplified top view of an optical components of a liquid LIBS apparatus and their arrangements. A lightguide D50, an aerosol outlet nozzle D15, and a concave mirror D62 are aligned in the same axis of symmetry as shown with a dotted line D75 in FIG. 15E. The positions of the lightguide D50 and the concave mirror D62 can be altered relative the aerosol output nozzle D15 of an aerosol jet source depending on the characteristics of the liquid phase sample material and/or the optics used. In some embodiments, a concave mirror D62 with a diameter 5.08 cm and a 38.1 mm focal point can be placed opposite to lightguide D50 as shown in FIG. 15E to collect an incoming light E80 from a plasma plume D21 and transmit a reflected light E82 to a lightguide optical fiber D50. Generally, the shorter the distance between the lightguide D50 and the plasma plume D21, the more light is collected for LIBS analysis. However, the lightguide D50 is more likely covered by oil, aerosol droplets, and ablation byproducts in shorter distance. For example, a distance of 4 mm between a lightguide D50 and aerosol output nozzle D15 requires frequent oil removal from the front end of a lightguide D50. In some embodiments, the lightguide D50 is can be mounted 7 mm to 10 mm away from the center of the aerosol output nozzle D68 along the axis of symmetry D75 (the distance "a" in FIG. 15E). In a preferable embodiment, the concave mirror D62 can be placed about 71 mm from the center of the aerosol release nozzle E68 along the axis of symmetry D75 (the distance "b" in FIG. 15E) to collect the light from a plasma plume D21 more effectively. A compound lens system D55 consisting of a plano-convex E60 and a meniscus lens E65 focuses and confines a laser beam E57 to the center of an aerosol jet stream above a preselected vertical distance from the tip of the aerosol output nozzle D15. In a preferable embodiment, the center of compound lens system E69 can be placed about 45 mm from the center of the aerosol nozzle E68 perpendicularly to the lightguide D50 or the concave mirror D62 (distance "c" in FIG. 15E) and approximately 2 mm above the tip of the aerosol output nozzle D15.

Liquid and Solid Sample Analysis

A compact portable LBS apparatus, capable of analyzing the elemental composition of any liquid or solid samples in real time without any sample preparation or transformation is disclosed. The disclosed LIBS instrument can be used as a universal elemental analyzer owing to its capability of analyzing plurality of sample states and material structures. Furthermore, it can be conveniently transported to different locations as needed owing to relatively small size. The suction hose and the power cables of the LIBS apparatus can be easily detached for transportation. Several instruments dedicated to analyze only one specific form of a sample can be replaced by the universal elemental analyzer. Thereby the disclosed LIBS apparatus and methods can improve process efficiency, cost, and space use. The disclosed methods include generation of aerosols from liquid samples operable to measure elemental composition, focusing and confining preselected laser beam to the aerosol using optical elements, ablating a stream of the aerosol to generate a plasma plume, collecting and gathering lights from the plasma plume, monitoring and analyzing optical spectra emitted by laser-induced plasma, and real time analysis of optical emission from the plasma plumes to detect and quantify elements. Furthermore, LIBS described herein provides a rapid chemical analysis of a plurality of samples without any requirement of consumables and/or generation of acidic waste as compared to other methods for elemental detection in the prior art.

Various embodiments of a multiphase laser ablation analysis instrument according to the instant disclosure, can effectuate quantitative elemental analyses of liquids and solids having a very wide range of physical characteristics and chemical compositions. For example, virtually any liquid such as petroleum, light and heavy fuels, liquid food products, and solvents, and/or solid samples such as rocks, batteries, solid chemical reagents, and others having homogenous and/or heterogenous material structure and compositions be analyzed.

FIG. 16A shows a schematic diagram of a LIBS apparatus and optical paths of a laser beam for analysis of a liquid phase or a solid phase sample in an illustrative embodiment according to the present disclosure. The LIBS technology for analysis of liquid and solid sample described herein comprises a liquid sample introduction system which can include a pump, a nebulizer, a gas carrier, and a spray chamber, a solid sample stage operable to move in x, y, z axes independently, a single pulsable laser with various optical elements to create a plasma plume from both liquid and solid sample material, an exhaust system, light gathering and transmitting elements (which can include fiber optics, lenses, mirrors and various other components described above), a spectrometer with a detector, computer software and/or firmware operable to perform real time data analysis, and various control loops operable to automate operations with no human interaction.

As shown in FIG. 16A, the portion of LIBS for liquid sample material analysis has a compact pump D23, which can be a peristaltic pump, to deliver a liquid sample into a nebulizer D05 with a preselected flow rate depending on the characteristics of the liquid sample. The cycles of the peristaltic pump can be synchronized with the laser to optimize process efficiency. A pressurized carrier gas D08 flows into the nebulizer D05 where a portion of a liquid sample was aerosolized into a stream of fine and preferably uniform aerosol particles. The nebulizer can be pneumatic (cross-flow, concentric, Babington type, V-groove, parallel-path, flow-blurring, micro-flow or self-aspirating, etc.) and/or ultrasonic. The pneumatic nebulizers require a flow of a carrier gas D08 which can be an inert gas such as nitrogen, argon and others. The self-aspirating pneumatic nebulizers do not require a peristaltic pump. The nebulizer can be pulsed, and the the pulsed nebulizer can be synchronized with the laser used for LIBS analysis. Alternatively, any nozzle, electrospray, any other types of liquid aerosolizer, and/or a mist dispenser can be used to generate a stream of aerosol F45 with a preselected size distribution depending on the application. An illustrative embodiment shown in FIG. 16A incudes a cyclonic spray chamber F40 that is used to remove large droplets produced occasionally by the nebulizer. A Scott double-pass type of a spray chamber can be used alternatively to remove large droplets from the aerosol steam. The aerosol jet can be exhausted through a conical aperture (exhaust funnel F51 (see FIG. 13B) a pump having air purification filters such as an activated carbon, HEPA, ASHRAE, any combination thereof, and/or others connected to a suction funnel F50 as shown in FIG. 16A. Unused liquid sample can be drawn off into a recycling or waste bottle.

A LIBS system for liquid or solid sample analysis can have a pulsed laser F110 shown in FIG. 16A having various power, pulse, wavelength characteristics in different embodiments. The laser can be a solid state Nd:YAG and/or an excimer gas laser. The laser pulse energy can range from tens microjoule to hundreds millijoule. The laser pulse repetition rate can change from single shot to several kilohertz. The laser can be a nanosecond or picosecond pulsed laser with a fixed spectral wavelength ranging from ultraviolet to near-infrared.

An example of a laser beam delivery scheme before reaching a solid phase sample site or a laser focal point in an analysis zone filled with flowing aerosol jet stream produced from a liquid phase sample is shown in FIG. 16A for LIBS analysis. The laser F110 in some embodiment can operate exclusively at a fundamental frequency or variable frequencies including a higher harmonic generator for operation on a multiplicative-integer frequency. Some embodiments can include an attenuator F120 to control laser power from 0% to 100%. Further embodiments can include two flat mirrors F130, F140 to effectuate a compact arrangement of the LIBS apparatus. Two flat mirrors F170, F180 can be installed at a fixed low angle of incidence that causes an input laser beam to undergo multiple reflections to produce a laser beam with an approximately Gaussian amplitude profile F60. A Gaussian beam profile is generally an optimal profile for generating plasma in an aerosol jet because it can be tightly focused and therefore can produce a highly energetic plasma. For example, a beam can enter a two flat mirror system such as F170 and F180 configured to reflect the laser beam 4 times at each mirror surface, before exiting the two-mirror system and reaching to a preselected position in an analysis zone F48 within the aerosol jet F45 comprising a portion of a liquid sample material.

A Gaussian-shaped laser beam F60 described above can be further focused by a lens F70 illustrated in FIG. 16A and/or a combination of lenses. One preferable embodiment has a combination of a plano-convex lens with a positive meniscus lens which directs the laser beam in a preselected position. A mirror or a mirror system is preferably used as a focusing element since it does not cause chromatic aberrations. Furthermore, using mirrors instead of lenses facilitates the full spectrum collection without significant losses of efficiency in the ultraviolet and near-infrared regions of a recorded spectrum. The laser beam is focused into the preselected laser focal spot (or area) F47 in analysis zone F48 including a stream of sample aerosol F45 produced by nebulizer D05 and spray chamber F40. The optical emission generated by the laser-induced plasma is collected by a curved mirror F80, preferably a concave spherical mirror. Alternatively, a system of two off-axis parabolic mirrors, or an objective lens, a combination of lenses and/or mirrors can be used to collect optical emission generated by the plasma plume. The optical emission from a laser-induced plasma is focused into an optical fiber F90 which can be coupled to an optical spectrograph F100. Alternatively, an objective lens, a combination of lenses and/or mirrors can be used to deliver the optical emission into an optical spectrograph. The optical spectrograph is fitted with an optical detector. In one preferred embodiment the optical detector can be gated. The parameters of the laser pulses and the gating of the optical detector can be cooperatively optimized to effectuate high sensitivity and/or accuracy in the chemical analysis.

In further embodiments, a movable mirror F150 shown in FIG. 16B can direct a laser beam toward a beam homogenizer F160. Mirror F150 can be planer, concave, convex and/or parabolic depending on the applications. Mirror F150 can be rotated and/or translated to a preselected position. The beam homogenizer smooths the irregularities at the edge of a laser beam and creates a beam with a uniform energy profile. It can also be used to adjust the laser spot size at the sample surface. To generate a beam with a uniform energy, the beam homogenizer can transform an output laser beam into a far-field collimated beam using a circular cross-section of approximately uniform irradiance at the focal plane. The cross-section of uniform irradiance can be linear, square, or of any other geometric shape. A collimated beam is parallel rays of light therefore has relatively uniform intensity and/or energy profile and spreads minimally as it propagates. Collimated beam F190 with uniform intensity profile, also called as a flat-top or top-hat laser beam, can be directed to the surface of a solid sample located in a chamber. In some embodiments, additional flat mirrors can be installed to facilitate the steering of a beam within a compact arrangement of the instrument. This flat-top laser beam distribution is critical for precise and accurate chemical analysis of solid phase samples.

A collimated flat-top laser beam F190 with an adjustable circular cross-section is directed toward an optical objective F230 preferably an apochromatic objective with a long working distance and a minimum of aberrations. In various embodiments, a flat mirror F220 facilitates a compact physical arrangement of the instrument. In some embodiments the mirror F220 can be a dielectric coated mirror that is highly reflective on the laser wavelength but is transparent to all other light wavelengths. A laser beam can be focused on the surface of a solid sample F240 placed into a sample chamber F250. The sample chamber can have a transparent window, through which a collimated laser beam passes perpendicularly for sample ablation. The sample chamber can be installed on a precisely movable stage F260 coupled to x-y-z translation motors that are operable to move the sample chamber on the stage in x, y, z axes independently. The size of the translation stages can range from several tens to several hundred millimeters. The stage typically can move in each direction with linear resolution less than 1 micrometer. A sample chamber can have different configurations to secure the sample. It can be non-sealed, marginally sealed such as sealing with a rubber band, or rigorously sealed to allow the analysis of sensitive and/or hazardous materials (for example, Li-ion battery or radioactive materials) in an enclosed environment. A sample chamber may include a removable spacer F270 to analyze samples with very small dimensions conveniently. The spacer can be move back and forth to accommodate different sample dimensions. To optimize the analysis of various sample sizes further and reduce the amount of unused volume in the sample chamber, spacers in different sizes having corresponding sizes can be provided. The stage with the sample chamber can precisely move the sample in a predetermined pattern relative to the laser beam ablation spot, thereby systematically ablating the selected sites of the sample to obtain a composition map of the sample. The composition map can comprise an elemental analysis of one or more sample sites. Laser ablation of the solid sample surface removes a portion of material at a selected sample site and creates a depth of the ablation craters depending on the power of the laser. A serial ablation of the sample by refocusing the laser to the depth of the ablation crater effectuates a layer-by-layer analysis, thereby generating a 3D image of the sample chemical composition.

Characteristic spectral emission emanating from a LIBS plasma plume generated by ablation of solid phase sample material is collected at a low angle relative to the incident laser beam by an objective F280 and transmitted through an optical fiber cable F285 to an optical spectrograph F290. Optical spectrograph F290 and optical spectrograph F100 in FIG. 14A can be the same or different. In some embodiments, two or more objectives F280 can be installed symmetrically in a circle around a laser beam objective F230. The later arrangement is particularly useful when an optical spectrograph F290 is a multi-channel configuration of several spectrographs. In one embodiment, each spectrograph channel can be coupled to its own optical objective F280. In further embodiments, at least a channel for ultraviolet light is coupled to a dedicated ultraviolet objective, and the other channels for visible to near infrared light are coupled to the second objective. Chromatic aberrations are substantially reduced in a configuration having multiple dedicated objectives. The laser beam focusing and light collection optics can include additional optical elements depending on the embodiments.

The laser breakdown beam is focused to a spot below the focusing objective F230 for solid sample analysis. Translation stage F260 can move a preselected sample site to the laser spot position to ablate material from the preselected sample site. The distance from the focusing objective F230 to the surface of sample F240 in chamber F250 can be measured using triangulation sensor F300 shown in FIG. 16A. Further, sample F240 in chamber F250 can be moved by stage F260 in a predetermined pattern precisely and automatically to generate a chemical image of the ablated area of a solid sample. One-, two-, or three-dimensional chemical image of a solid sample can be measured. In some embodiments flat mirror F310 and compact CMOS camera F320 provide magnified images of the sample surface for visual inspection and navigation.

Sample chamber F250 includes several miniature light emitting diodes F330, F340 for even and adjustable flood illumination of the sample. A sample chamber can have an inlet and outlet F350, F360 to admit and exhaust a flow of unreactive gas and/or air through the chamber. The unreactive gas can be an inert gas such as nitrogen, argon, or helium which can come from a cylinder F370. The flow rate of gas from the cylinder can be controlled using a mass flow controller F380. The choice of a carrier gas depends on the sample and element(s) planned to be measured. For example, an argon atmosphere facilitates optical excitation of metal and other atoms providing a stronger signal in LIBS measurements. On the other hand, a helium atmosphere facilitates optical excitation of halogen and other non-metal atoms. In an embodiment, a sample chamber can include also lights on the bottom of the chamber to illuminate transparent samples. In some embodiments, the temperature of a sample chamber can be adjusted depending on the characteristics of the sample. It can be heated using an electrical resistance heater and/or can be cooled using a refrigeration coupled to an exchanger, a thermoelectric cooler, and/or a phase change medium such as ice water to optimize the LIBS signal. Furthermore, the sample chamber can accommodate multiple samples at the same time which increases the efficiency of loading samples to the instrument.

FIG. 16B is a simplified diagram of a portion of apparatus showing a beam emanating from a laser and optical elements to direct and/or focus the laser beam to form an emissive plasma from an aerosolized liquid sample or a solid sample, according to an embodiment. A pulsed laser F110 generates a laser beam that passes through an optical attenuator F120 toward a flat mirror F130. The flat mirror F130 reflects a laser beam perpendicularly toward a precisely movable mirror F150. When movable mirror F150 is in position F152, the laser beam can be reflected in an optical path including a negative lens F390. The negative lens F390 in cooperation with a positive lens F400 can expand the laser beam diameter. The expanded laser beam passes through diaphragm aperture F410. Aperture F410 is configured to pass only the central part of the laser beam having an approximately uniform radial intensity profile. The relatively uniform laser beam produced thereby is directed along an optical path to a solid sample chamber to produce a plasma plume for LIBS analysis. The size of a laser spot generated at a sample site can be in the range of 10 µm to 200 µm or sometimes even larger. In other position F151 of the movable mirror F150, the laser beam from a flat mirror F130 passes to another flat mirror F140 shown in FIGS. 16A and B The second flat mirror F140 reflects a laser beam perpendicularly toward a system of two flat mirrors F170, F180 as shown in FIG. 16A to produce a laser beam with an approximately Gaussian intensity profile. The laser beam with an approximately Gaussian intensity profile is directed toward liquid sample analysis.

The diagrams in FIGS. 16A and 16B are the illustrative examples showing various practical embodiments of the present disclosure. In various embodiments, a collimated flat-top laser beam, a Gaussian beam, and/or other laser beam profiles can be formed and used for analysis of different solid or liquid phase sample materials depending on the application. In a number of embodiments, different lasers types, optical elements, optical spectrographs, detectors, other components of the LIBS can be used interchangeably to optimize LIBS signals further.

In an embodiment, a compact pump can be used to introduce a portion of liquid sample into a nebulizer operable to aerosolize liquid sample material into a stream of carrier gas. The liquid sample aerosol flows through collimating nozzle F41 and emerges from an orifice as the free aerosol jet flow F45. Mirror F150 is moved into non-intercepting position F151 to allow laser pulses emanating from single laser F110 to follow an optical path F60 to a focal point F47 in analysis zone F48 within the flowing aerosol jet F45. The laser pulses produce an emissive plasma plume surrounding the focal point comprising liquid sample material. The optical spectrum emanating from the plasma plume generated by the laser ablation can be measured with a spectrometer. The liquid samples can be any aqueous and non-aqueous solutions including as waste water, beverages, urine, solvents, kerosene, gasoline, diesel, biofuels, mineral oil and crude petroleum samples, and others. Both univariate and multivariate calibrations can used to quantify the spectroscopic sample measurements using known reference standards.

The sensitivity of the LIBS analyses obtained using apparatus and methods disclosed herein met or exceeded American Society for Testing and Materials (ASTM) standard method D5185 for multi-element ICP-OES analysis of lubricating oils. In general, lower limits of detection for the present methods and apparatus for elements tested were also found meet or exceed the requirements of ASTM standard method D5185 which is hereby incorporated by reference in its entirety (ASTM Volume 05.02 Petroleum Products, Liquid Fuels, and Lubricants (II): D4177-D6468, ASTM International, 2020).

Clean or used motor oil from a variety of vendors such as diesel fuels, PremiSolv solvent (odorless proxy to kerosene), and fuel additives (lubricants, boosters, inhibitors) were also analyzed using the LIBS apparatus and methods disclosed herein. The minor elements found in the petroleum products tested according to our liquid LIBS methods disclosed herein included Ca, Mg, V, and Na indicating that these products contaminated with particulate matter likely caused by metal wear. The small particulates were readily atomized, measured and quantified using the apparatus and methods based on LIBS. The limits of detection defined by tripled standard deviation in spectra of blank sample ($3\sigma$) for metallic contaminants were estimated to be around "single-digit" ppm (mg/kg). A person having ordinary skills in the art would appreciate that small particulates in a liquid sample may be insoluble and/or difficult to atomize using ICP plasma.

100 laser pulses with 10 Hz frequency were used in a typical trial to form luminous plume(s) for measuring each chemical element spectra with an analysis time of 10 sec. The spectra from the laser plumes were used to calculate the relative standard deviations of the measurements, to construct linear calibrations for each element, and to determine $3\sigma$ limits of detection and triple standard deviations of a blank sample. The results of these measurements are summarized in table in FIG. 17 that shows the detection limits of the elements tested using LIBS in argon and nitrogen flows and the lower limits of detection specified in the ASTM standard test method D5185 for ICP-OES analysis of lubricating oils. As shown in the table in FIG. 17, considerably smaller concentrations of most elements tested were detected using present LIBS apparatus embodiment in an argon flow as compared to those using the standard test method for ICP-OES. Furthermore, the detection limits using instant LIBS in a nitrogen flow also met or exceed for some elements (V, K, Na, Li, Fe, Mg) as compared to those performed in the argon flow tests.

The table in FIG. 17 shows the lower limits of detection of analyte trace elements tested using present LIBS methods and apparatus in different carrier gas and/or solvents in comparison to the limits of detection specified in the ASTM test method D5185 for ICP-OES analysis performed in tenfold diluted lubricating oils and nebulized by argon carrier gas. The limits of detection by present LIBS for aqueous solutions in argon flow shown the column 3 in the table obtained by LIBS instrument configured with a 6-channel spectrograph, and measuring broadband spectra from 1000 laser pulses on CCD detectors. Column 4 shows the limits of detection of the elements in Conostan base oil (a) directly nebulized in argon flow using LIBS instrument configured with a compact Czerny-Turner spectrograph and ICCD camera, and accumulating spectra from 100 laser pulses. Column 5 demonstrates the limits of detection in base oil (b) measured in the same configuration as Column 4 but using nitrogen flow as a carrier gas. Column 6 shows the limits of detection in base oil (c) measured in a similar configuration as Column 5 but using a compact Czerny-Turner spectrograph and ICCD camera from a different vendor. The latter configuration of present LIBS, the limits of detection for aqueous solutions nebulized in nitrogen flow that are order of magnitude lower than the records shown in Column 3.

The National Institute of Standards and Technology (NIST) reference materials such as Vanadium in Venezuelan Crude Oil (RM-8505) and Trace Elements in Fuel Oil 'No. 6' (SRM-1634c) were analyzed for traces of vanadium to evaluate the performance of instant LIBS apparatus and methods. Vanadium concentration in Venezuelan crude is specified to be about 390 ppm (mg/kg) and a certified mass fraction of vanadium in Fuel Oil 'No. 6' is only 28.19±0.40 ppm (mg/kg). NIST reference materials for both of these levels were successfully measured using a LIBS apparatus embodiment as shown in FIG. 18. The spectra of Venezuelan Crude Oil G10 and Trace Elements in Fuel Oil No. 6 G20 after background subtraction for the region of the most prominent ionic quintet of vanadium spectral lines are shown in FIG. 18. The most intense emission line in this quintet was observed at 309.31 nm. The background emission in this spectral interval comprises continuum bremsstrahlung radiation from plasma electrons and molecular transitions of free radicals OH and CH. The CH emission originates from the oil matrix but it does not directly interfere with the vanadium spectral lines. The OH emission originates from the water content in oil and humidity of the ambient air. The OH spectrum in this region has many partially-resolved rotational lines that should be subtracted or at least accounted as a possible interference.

The ability of a LIBS apparatus embodiment to perform multi-purpose analyses of all kinds of the petroleum-related liquid samples was demonstrated with especially good sensitivity for traces of metals. Optical emission from major, minor and trace elements in various samples was detected, measured and quantified. For example, metal signals from samples of Conostan base oil standards (kinematic viscosity 20 and 75 cm2/s, cSt), mineral paraffin oil, Arabian, Azerbaijani, Texan and algae crude oils, lubricants, fresh and used motor oils were measured. Elemental quantification of the LIBS data was done with standard univariate calibration using an area under a spectral line contour fitted by Lorentzian profile.

To investigate the utility of LIBS ability for analyzing the lightest distillation fractions, the samples of methanol, ethanol, acetone, ortho-xylene, isopropanol, isooctane, gasoline, methyl isobutyl ketone, water and aqueous solutions were nebulized, ablated and the signals from the aerosolized samples were measured. For example, FIG. 19 shows the LIBS spectra of Mg ionic emission at 279.55 nm from the gasoline sample H70 and the calibration standards prepared using PremiSolv (Conostan, a Division of SCP SCIENCE) as a pure source with known concentrations of magnesium (0 ppm Mg H10, 0.05 ppm Mg H20, 0.1 ppm Mg H30, 0.5 ppm Mg H40, and 1 ppm Mg H50). The concentration of Mg in a gasoline sample obtained from a regular gas station was about 10-fold higher than the limit of detection of the LIBS instrument shown in FIG. 19.

The hydrogen-to-carbon (H/C) ratio is an important parameter for petroleum characterization since the quality of a petroleum cut (fraction) generally increases with the H/C ratio. The greater the H/C ratio, the greater the amount of energy that can be released when petroleum fuel undergoes combustion. The H/C ratios also correlate with the aromaticity indexes and specific gravity of hydrocarbons. A person having ordinary skills in the art would appreciate that these measurements cannot be performed using conventional inductively coupled plasma (ICP) or x-ray fluorescent (XRF) analysis in a single instrument and/or in combination.

Quantitative calibration for determination of the elemental H/C and O/C ratios in solvents using the broadband LIBS spectra was successfully performed using the present LIBS methods.

Organic solvents namely ethanol, methanol, ortho-xylene, and their mixtures were chosen to investigate the ability of LIBS to measure the H/C ratio in liquid samples. These solvents have very different ratios: The H/C for methanol is 4 and the H/C for ortho-xylene is 1.25. The mixtures of methanol and ortho-xylene yield intermediate H/C ratios. An embodiment equipped with a compact 6-channel spectrograph having CCD detectors was used for rapid acquisition of the broadband spectra of these samples. Undiluted ortho-xylene samples exhibited the highest intensity of molecular emission from CN and $C_2$ radicals since the ortho-xylene molecule has an aromatic ring with conjugated double bonds. A methanol molecule does not have double carbon bonds. Consistent with this, the LIBS spectrum of aspirated methanol exhibited only weak emission at the Swan bands of $C_2$. The recorded spectra imply that the intensity of molecular emission of CN and $C_2$ radicals can be associated with the molecular structure of an interrogated sample.

Quantitative calibration plots were constructed to determine the H/C ratio in solvents with the acquired broadband spectra. A person having ordinary skill in the art would appreciate that non-linearity of the calibration plots impeded determination of the H/C ratio. Such non-linearity problems were overcome using the entire broadband spectra (190-1000 nm) for multivariate calibration based on partial least squares regression. Using conventional instruments, it is difficult to acquire such broadband spectra. An exemplary multivariate partial least squares regression for calibration of the C/H ratio measurement using instant LIBS instrument is shown in FIG. 20.

Separation of an unknown samples requires laborious manual or semi-manual spectral examination using conventional techniques. On the other hand, unknown samples can be easily separated using instant LIBS embodiments. The chemometric data of the LIBS spectra were processed using principle component analysis (PCA). For example, FIG. 21 shows a clear separation of gasoline I40, ethanol I30, and two mineral oil samples (25cSt I10 and 75cSt I20) in principal component space after statistical analysis.

In various embodiments, principal component analysis (PCA) and partial least squares regression (PLSR) are embedded in the data analysis software in an embodiment, and operate cooperatively to effectuate simple statistical algorithms that provide quantitative analyses.

The argon flow was used to facilitate comparison between the performance of instant LIBS apparatus and methods and conventional ICP-OES analyses. The ICP technique uses an inductive plasma sustained in flowing argon. Another reason for using argon is that when laser ablation is performed in an argon atmosphere, relatively more intense emission is obtained compared to other common gas media. Nitrogen was also tested as a carrier gas for analysis of Conostan oil standards (NIST traceable) and various crude oil samples. The net emission signal in argon was higher than the signal in nitrogen, but the continuum background and noise in nitrogen were found to be lower than in argon. As a result, it was found that estimated detection limits for some elements in various embodiments were lower in nitrogen (offering better detectability) than those done using an argon flow. Compressed air was also tested as a carrier gas and was found to be compatible with various analyses. Although argon flow provided better detection limits for most elements, the compressed air flow, nonetheless, was found to result in better (lower) detection limits for the elements Al, K, Li and Na.

LIBS analysis using nitrogen gas or compressed air as a carrier gas provided a degree of detectability, sensitivity, and accuracy that improve upon ICP-OES using argon flow. Moreover, LIBS does not have the well-known limitations of ICP. For example, introduction of a substantial amount of liquid (especially organic) sample into the ICP analysis region may quench and extinguish the plasma. Furthermore, ICP is burdened by a loss of sensitivity when sample dilution is necessary to avoid extinguishing of plasma.

The spectra acquired from four motor oil samples of 10W30 grade made by Chevron, Shell, Valvoline and Mobil were processed using a partial least square (PLS) algorithm by taking into account the small differences in the intensities of major spectral features (O, N, H, CN, C2) and the substantial differences in trace constituents (additives, impurities) among the samples. Accurate discrimination between new and used motor oil was achieved with a high degree of confidence. This is due to a significant increase in metal emission originating from metallic contaminants, mostly particulates, in used oil. Thus, LIBS can improve the efficiency of monitoring oil and fuel quality as well as the extent of metal wear in vehicular systems and hydraulic equipment. The chemometric algorithms enabled correct identification and rapid classification of different oils and fuels without traditional elemental calibration.

Detection of halogens and trace metals in biofuel products is important to monitor clean combustion and to prevent corrosion of components when using these alternative fuel sources. Certain trace metals in plant-derived biomass are valuable to fermentation in biorefinery, but other trace metals are detrimental. The oxidizing metal ions have significant effects on the catalytic oxidation of biomass that can lead to depolymerization of the biomaterials such as starch, cellulose, and lignin.

Using an embodiment, choline emission at 837 nm in oil was measured using a helium stream at low pressure. The estimated detection limit was found to be 13 ppm. In various tests, the Cl spectral line was on top of an emission background determined by free-electron continuum (bremsstrahlung radiation) and molecular C2 bands. In helium flow, an emission contribution arising from excimer molecule He2 was also seen. Background emissions were normalized and subtracted using the blank oil sample as a reference. Various embodiments also used Lorentzian fitting and statistical noise rejection to reduce and/or remove background interferences.

Similar tests demonstrated the detection limit of 250 mg/kg (ppm) for the chlorine measurement in mineral oil using helium flow at atmospheric pressure. The detection limit for chlorine in water using helium flow at atmospheric pressure was 43 ppm. The ability to measure the chlorine content in water is important for analysis of produce and fracking water.

The leading cause of aviation fuel thermal stability failures is known to arise from contamination by metal traces. Modern aircraft turbine engines are vulnerable to fouling by contaminants in jet fuels (e.g., JP-5). This occurs because of thermal degradation and oxidation of the fuel at elevated temperatures (250-300° C.) in the engine. Fuel atomizers have been considered the most critical components because they have relatively small diameters, and are generally exposed to relatively highest temperatures. It is believed that dissolved oxygen in the fuel is quickly converted to organic naphthenates, and then to hydroperoxides which decompose to carbonaceous residue that tends to accumulate on the walls of orifices. The decomposition process can be catalytic. The catalysts for degradation are thought to be Cu and other trace elements such as Cd, Zn, Fe, Co, Ni and Pb.

Trace level Cu in aviation turbine fuel can significantly accelerate thermal instability of the fuel, leading to oxidation and production of detrimental insoluble deposits in the engine. Metals such as dissolved Cu can degrade the storage stability or thermal stability of the aviation turbine fuel by catalytic action. Cu is believed to be the most detrimental of these materials and the contamination can occur during distribution from the refinery to an airport. One source of contamination common to aircraft carriers is "admiralty metal" used as fittings on fuel hoses on most Navy ships. This material is approximately 70% Cu and 30% Zn. Contact with an admiralty metal fitting may cause fuel to be contaminated quickly at some level.

The thermal stability of aviation fuel is often measured by a laboratory device called a Jet Fuel Thermal Oxidation Test (JFTOT) analyzer. The method used is ASTM D3241 which is hereby incorporated by reference in its entirety (ASTM D3241-20a. Standard Test Method for Thermal Oxidation Stability of Aviation Turbine Fuels, ASTM International, West Conshohocken, PA, 2020, www.astm.org) Fuel in this tester is heated to 260-275° C., passed through a stainless-steel filter and onto an aluminum tube. The test is run for 2 hours; the appearance of the aluminum tube is then evaluated for the pass/fail result. Only a slight darkening of the tube (0-2) is permitted for a pass. Greater darkening (3-4, Peacock and Abnormal) is considered to be failure. JFTOT tests on fuels containing known amounts of metals reveal that only 0.05 ppm of Cu will affect the test. Greater than 0.05 ppm Cu will likely result in a failure. Amounts exceeding 0.1 ppm of Cd, Zn, Fe, Co, Ni and Pb will also negatively affect the JFTOT result.

Necessity for real-time determination of the trace contaminants in fuels requires the development of an advanced portable analyzer with sub-ppm to ppb level sensitivity for Cu and other metals. The analyzer should perform rapid analysis of fuel as it is delivered to aircraft either shipboard or at an air field. Presently, Air Force fuel samples with suspected contamination are collected on site and then shipped to a fixed regional laboratory that performs the analysis by ICP-OES or ICP-MS. That process can typically take 2-10 days for results depending on site and international customs. During this transit and analysis time, fuel inventories and fuel servicing equipment are placed in a quality hold status, preventing the ability to support aircraft or ground vehicle generation and mission requirements. The multi-day turnaround delays the aircraft in its mission. In addition, the effect of admiralty metal aboard aircraft carriers may be overlooked entirely.

Aviation jet fuels (JP-5, JP-8), diesel and kerosene are all similar hydrocarbons. JP-5 is a hydrocarbon mixture of C9 to C16 with boiling range 156-293° C. The composition of JP-5 includes 53% paraffins, 31% cycloparaffins, 16% aromatics, and 0.5% olefins. It is essentially refined kerosene. Boiling temperature of JP-8 jet fuel ranges between 175 and 300° C. Diesel fuel consists of refined hydrocarbons, primarily 75% saturated alkanes, normal, iso- and cyclo-alkanes and 25% aromatics like naphthalenes and alkylbenzenes. It includes C10-C15 hydrocarbons having a boiling temperature range of 150 to 380° C.

The disclosed LIBS apparatus provided the following limits of detection in PremiSolv (a proxy for jet fuel) directly nebulized by a pneumatic nebulizer in argon flow using a compact Czerny-Turner spectrograph fitted with an ICCD camera and accumulating spectra from 100 laser pulses: Cu 0.07 mg/kg; Fe 2.4 mg/kg; Mg 0.01 mg/kg; Zn 0.6 mg/kg. These results demonstrated utility of the instant apparatus and methods for rapid analysis of aviation fuel that can be performed directly in the field.

There has been a long felt need for an advanced analytical measurement technology to meet the analytical requirements and provide real-time determination of the trace impurities in aviation and ground fuels. V, Ni, Fe, and Na are the major metallic constituents of crude oil that can propagate down to the final refined fuel product. Other metals can be introduced during production, transportation and storage, either in diluted or micro/nano-particulate forms. The real-time detection of these metals at a sub-ppm level is critical to ensure high quality of defense logistics fuels. An analytical technology that can be instantly applied anyplace on-site is key to the efficient fuel quality surveillance program. However, such analytical technology has not existed before the present embodiments and methods.

Pulsed laser ablation does not introduce any risk of fuel ignition because the fuel aerosol micro-droplets are instantly atomized and there are no combustion reactions. Operation in a nitrogen flow avoid the presence of any oxidant that can support combustion. Currently, commercial benchtop LIBS instruments designed for solid samples provide detection limits at levels of low to sub-ppm for most metals, and low ppb for some of them (comparable to ICP-OES). Ultrasonic nebulizers in some present embodiments are operable to produce an aerosol approximately 10 times denser than conventional ICP nebulizers, they can accordingly provide 10 times lower detection limits.

An ultrasonic nebulizer cannot be directly used to inject a dense liquid aerosal for analysis in ICP-OES or ICP-MS because the plasma would be extinguished by the very high sample load supplied by such nebulizers. Thus, a desolvation system would be required between the nebulizer and the plasma to effectuate analysis in this matter. This is an inherent limitation of an inductively coupled plasma source regardless of whether an aqueous solution or organic material such as jet fuel is the subject of analysis. By contrast the apparatus and methods of using instant LIBS for analysis of liquid samples, does not suffer from this limitation because the LIBS laser directly excites emission via excitation and ionization brought about by laser ablation.

Accordingly, LIBS in combination with ultrasonic nebulization function cooperatively to provide a method of elemental liquid analysis that has not been possible with prior art methods and apparatus. An ultrasonic nebulizer can be based on using a crystal transducer to impart energy operable to break up a liquid sample into fine droplets. The transducer without the desolvation apparatus can be miniaturized. It can be seen that the disclosed combination of a nebulizer and LIBS will be operable to achieve at least sub-ppm to ppb level detection limits for most metals in a liquid medium. Moreover, an ultrasonic nebulizer having no desolvator can retain even volatile elements (e.g Hg), which would otherwise be depleted or totally lost during desolvator processing.

A series of tests using aqueous solutions and light solvents confirmed that the LIBS apparatus embodiments were useful to analyze any liquid sample having low enough viscosity for direct nebulization.

Chemical analysis of jet fuel using instant LIBS with direct nebulization is feasible. Owing to the fact that jet fuel is ordinarily clean and free from large particles (>0.5 μm) and is neither too volatile nor too viscous for direct nebulization. Similarly, the properties of diesel fuel are also compatible with the direct nebulization in combination with LIBS. Both fuels were easily converted into a dense aerosol using an ultrasonic nebulizer. This dense aerosol was effectively excited by a LIBS laser thereby facilitating ultra-sensitive trace analysis.

Several low-viscosity nutrient liquid samples used in the food industry were analyzed using the disclosed methods in an embodiment. An instrument configuration having a compact 6-channel spectrograph and CCD detectors was used to perform rapid acquisition of broadband spectra emitted from a luminous LIBS plume. A multivariate partial least squares regression was applied for quantitative calibration of the LIBS spectra. For comparison, concentrations of Mg in these samples was also measured using conventional ICP-OES. The results of LIBS and ICP-OES measurements from 5 different samples of nutrient liquid are shown in FIG. 22. The measured values of Mg concentrations by both techniques are in good agreement.

An embodiment of the disclosed LIBS methods and apparatus combines and integrates a liquid analysis module and a solid analysis module in one instrument. A software-controlled mechanism operable to move a mirror was used to switch the ablation laser beam between the modules, for analysis of a liquid or solid sample as required. This design is modular and can be customized to satisfy various different needs and requirements. Some end users may prefer a lower cost embodiment having relatively fewer functions. There are embodiments of the disclosed apparatus configured to be portable, yet they allow quantitative analysis of metals without compromising sensitivity at the low ppm or sub-ppm ranges.

Another aspect relates to the LIBS described herein includes the capability to quantify the 3-dimentional (3D) elemental composition of any solid phase samples in high spatial and temporal resolution. Solid samples such as multilayered, coated, composite, granulated, other forms of structured materials and/or material structures can be mapped and profiled chemically in x, y and z axes using LIBS. These types of 3D chemical analyses are useful for new battery design structures, learning lithium-ion transfer cycling mechanisms, impurity detection, quality control, evaluation of distribution and structural changes due to aging of devices.

In some embodiments, the elemental composition of thin-film structures found in photovoltaic, electronic devices, and solar cell structures can be analyzed using the 3D chemical imaging methods of LIBS to assess quality and/or state of a product. In another embodiment, instant LIBS 3D mapping and profiling methods can be used to analyze the binder and conductive agent distributions, a critical parameter of a battery performance, in Li-ion batteries and/or similar types of batteries. Any inhomogeneity in the binder and conductive agent distribution affects electrical performance of a battery adversely and may cause reduced battery performance.

3D elemental imaging can be essential for the analysis of spent catalysts to inspect how and when contaminants attach to a catalyst surface in a battery. In some embodiments, 3D elemental distributions of catalyst materials in batteries can be measured using present LIBS 3D chemical imaging apparatus and methods to assess the battery performance as these catalyst materials are good indicators of the activity and performance of a catalytic process. In some embodiments, 3D chemical mapping of a catalyst surface and depth profiling overtime can be useful to monitor to understand how contaminant elements adhere, bond and penetrate into the catalyst volume. In further embodiments, the chemical characterization of individual particles and grains of minerals provides information related to the composition, location of inclusions, mineral phases, and mineralogical distribution of elements. The disclosed LIBS instrument and methods herein allow users to spatially analyze solid samples for all major, minor, and trace elements including the lighter, organic, and halogen elements (e.g. H, Li, Be, B, C, O, N, F, and Cl) that are difficult or impossible to detect by conventional techniques.

Generally, a relatively high fraction of alumina and silica in typical catalyst materials used by petroleum refineries makes them difficult to dissolve in acids or aqua regia as necessary for traditional ICP analysis. Digestion of catalysts often requires hydrofluoric (HF) acid, which is dangerous, expensive and generates hazardous waste. The chemical mapping of the catalyst surface and depth profiling are important for monitoring how the impurity metals (e.g. Al, Ni, Fe, V, Cu, and Ti) adhere, bond and penetrate into the catalyst volume. A reconstructed elemental image of a spent catalyst sample demonstrated significantly elevated concentrations of nickel at and close to the surface. The concentration of Ni dropped with depth in a profile going into the bulk sample.

In an exemplary embodiment for 3D solid sample analysis of instant LIBS, each component in a cell in an Li-ion battery structure can be mapped and depth profiled to generate a 3D chemical imaging and to assess the quality of each component in a cell rapidly. FIG. 23A shows a typical cell structure K10 in a Li-ion battery K50 and a 3D chemical analysis procedure using instant LIBS. The cell structure K10 includes chemically distinct layers such as layer 1, layer 2, layer 3, and layer 4. A 3D chemical image of a solid sample can be generated by repeating the profiling procedure in a grid of preselected x and y map locations K70. Laser pulses are directed repeatedly into a preselected planar coordinate location in x, y, z directions until a substrate and/or a bottom of the analyzed structure is reached. Each laser pulse ablates a consecutive volume of sample material K20, and thus penetrates deeper into the sample structure. Each laser pulse generates an optical spectrum that characterizes that portion of the sample ablated by a single laser pulse. FIG. 23B shows the spectral intensities corresponding to layer 1, layer 2, layer 3, and layer 4 of cell structure K10 in a Li-ion battery. The depth profiling resolution of laser ablation was found to typically be in the range of 10 to 100 nm depending on the sample material. Minimum lateral resolution can typically be as low as 10 µm. Although in practice lateral resolution is often more than 10 µm it also depends on sample material. Generally hard materials characteristically support the best spatial resolution. Depth profiles can be performed on structures with more than 100 µm thickness with less than 1 µm depth resolution.

Also, measuring 3D chemical distributions can be useful for posterior analysis of human biominerals, gallstones, kidney stones, bladder stones, sialoliths, teeth, fingernails, bones, malignant skin, and other biological tissues. The disclosed LIBS profiling apparatus and methods can be also beneficial for microbiological, animal and plant studies, particularly for measuring distributions in contaminated or doped plant leaves. LIBS enables 3D elemental imaging at microscopic spatial resolution of entire organs especially after administering metal-based nanoparticles. The disclosed LIBS apparatus is important for environmental forensics, geological studies, analyzing drilling cores, shale exploration, and many other fields.

Another aspect for solid sample analysis provides a method of the 2D- and 3D-elemental imaging of individual minerals and mineralogical distribution of elements in geological samples. Practitioners in the field will appreciate high sensitivity of LIBS to spatially analyze lighter elements with atomic numbers Z<10 (e.g. H, Li, Be, B, C, O, N, and F) that can be present in high abundance in natural minerals. These elements can be the main constituents of minerals, e.g. Li and F that are often found in some micas. The lighter elements are missing from the analysis by conventional techniques due to lack of sensitivity and failure to detect. LIBS allows for in situ analysis of small mineral grains and inclusions. The analysis of water or gas inclusions in minerals and rocks is also possible using LIBS.

In one embodiment for exemplary demonstration, LIBS can be used as a means for detecting fluorine and oxygen in a mineral sample containing distinct regions of bastnasite (carbo-fluoride) and barite ($BaSO_4$). The sample was analyzed and the elemental composition over an area of interest was mapped using contour plots. FIG. 24A-C illustrate the results of 2D elemental profile of the bastnasite-barite sample using instant LIBS. Low concentrations of elements are represented by white color and higher concentrations are represented by darker shades in FIGS. 24B and 24C. 2D elemental imaging analysis of the mineral by present LIBS shows different 2D distribution patterns of fluorine (see FIG. 24B) and oxygen (see FIG. 24C) in the mapped area of the mineral sample.

In another example of elemental mapping for ruby-in-zoisite gem rock, LIBS revealed the distribution of elements such as H, O, Li, K, Na, and Mg that are difficult or impossible to detect using conventional techniques. Instant LIBS was effective in identifying main ruby and zoisite crystals as well as other constituent minerals within the analyzed area. Spatially resolved chemical information provides valuable insight on mineral phases present, location of inclusions, mineral distribution of elements harmful to downstream product extraction, and overall content of the target minerals. An embodiment of the disclosed LIBS apparatus allows geochemists to measure the content and distribution of elements that remained elusive in the past. LIBS analysis can improve decisions about processing mineral products.

The present disclosure also includes analysis of individual solid particles on a substrate such as filter paper, swipes, or double-sided adhesive tape. The advantage of the disclosure is that LIBS can measure elemental composition of the particles which are significantly smaller than a laser spot size on the sample site. Analysis of particles with sub-micron sizes and sub-nanogram masses is possible according to an embodiment of instant LIBS apparatus. Using instant LIBS method, chemical analysis of toxic, radioactive, or other particles on specimen surfaces can be done easily. Furthermore, analysis of individual solid particles embedded in ice or other matrices and/or detection and quantification of nanoparticles-based biomarkers and labels administered to tissues are also feasible. Similarly, the sensitive analysis of micro-particles is necessary in forensics and safeguarding against illicit manufacture of nuclear materials.

In an exemplary trial with a Peltier cooled chamber, polar ice-core samples were analyzed for determining paleoclimate proxy indicators such as particles containing Ca, K, Mg, Na, and other metals. Earlier analysis of these ice samples by ICP-MS established average elemental concentrations of parts-per-trillion (ppt). A LIBS embodiment effectuated visual navigation through a magnified image of the ice samples to enact relevant movement of x-y-z stages to place a particle into a spot where a laser beam would impinge. A single laser pulse obliterated the whole particle, revealing a spectrum and therefore composition of each individual particle. High spatial precision of LIBS allowed narrowing the age interval (<0.5 years) to see abrupt paleoclimate change events. Such high sensitivity is unattainable by ICP-OES, XRF and/or similar techniques. Only average concentrations in a ppt range can be measured by ICP-MS. Other applications include rapid metallurgical analysis and identification of individual debris particles collected on filters from aviation fuel and/or used motor oil. Debris alloy identification facilitates assessment of the degree of possible damage in engine components.

Repeatability of the LIBS measurements was tested using aerosolized samples of organic solvents and mineral oil with 100 ppm vanadium traces. The relative standard deviation of the vanadium line intensity was 1.45% over 12 sets of measurements with 20 accumulated spectra each. Experiments with bulk analysis of solid samples demonstrated that signal averaging over multiple ablation pulses improves the precision of measurements. Analysis by the disclosed LIBS apparatus of a thin glassy film deposited on silicon wafers that represent solid homogeneous samples resulted in relative standard errors from 0.3 to 0.5% of the average LIBS intensity over 100 laser pulses. By contrast, inhomogeneous mineral samples of boron ore that were powdered, homogenized and pelletized were then analyzed by LIBS using 1360 laser pulses accumulated into 20 spectra per sample. A resulting average relative standard deviation was 1.2% among 15 samples. These trials demonstrated that the averaged LIBS measurements had acceptable precision even when the samples were inherently inhomogeneous. This is of particular importance because a person having ordinary skill in the art would appreciate that boron is difficult to measure by other techniques.

An automated version of the LIBS instruments is developed for factory shift workers or technicians with no experience performing LIBS analysis and/or quantitative chemistry. The "Axiom" software platform prompts the technician at every step of the data collection process, i.e., loading the samples, ensuring the sample focus, placing pre-loaded experimental methods in the proper locations, and saving the data. The data saved by the user is processed by an automated version of the "Clarity" data analysis software. This automated software can create calibration curves, process unknowns for quantitative treatment, and export data in the form of a tab-delimited text file. Qualitative data may also be exported in the form of depth profiles and map figures. The "Clarity" software platform can be programmed to perform traditional univariate calibration via integration of predetermined elemental emission lines or to perform multivariate calibration via historical data libraries.

The operations of the disclosed apparatus and methods are executed using a various software embedded in the instrument comprising advanced chemometric algorithms, multivariate regression models, and data acquisition. All data is acquired by the Axiom platform and is automatically uploaded into "Clarity". The Clarity data analysis software offers a full suite of data analysis tools for rapid processing of LIBS spectra. The software provides rapid analysis of large arrays of spatially-resolved LIBS data (e.g. 2D and 3D chemical imaging data). The depth profiling for 3D chemical imaging is facilitated by a real-time DepthTracker module. In various embodiments, background subtraction, signal smoothing; normalizing; averaging, obtaining intensities and standard deviations are also operable functions of this embedded software. This software also provides automatic identification of spectral lines, integration of their peak areas either directly or using Lorentzian and Gaussian fitting of the line contours, and deconvolving partially overlapped spectral line contours. The software also comprises an algorithm operable to predict spectral peak intensities and plasma temperature based on a local thermodynamic equilibrium (LTE) plasma model. Calibration can be performed using techniques based on univariate and multivariate regression models, in single or in combination. Relevant spectral reference databases can be custom-built using a reference library creator module.

The software can also be programmed to upload the results to a database automatically. This technology allows a sophisticated chemical analysis to be performed by shift workers in a factory setting without supervision. These advances facilitate fast analysis of solid samples with full automation of the data collection, reduction (based on a combination of univariate and multivariate models) and reporting that enables quick decision about production and processing of materials.

The majority of the software functions are designed for analysis of solid samples. A special part of the operating software is dedicated to the analysis of liquid samples. The "Clarity" data analysis software is common for both liquid and solid samples.

In the foregoing specification, various aspects are described with reference to specific embodiments, but those skilled in the art will recognize that further aspects are not limited thereto. Various features and aspects described above may be used individually or jointly. Other aspects of the invention, including alternatives, modifications, permutations and equivalents of the embodiments described herein, will be apparent to those skilled in the art from consideration of the specification, study of the drawings, and practice of the various aspects. Further, various aspects can be utilized in any number of environments and applications beyond those described herein without departing from the broader spirit and scope of the description. The written description and accompanying drawings are, accordingly, to be regarded as illustrative rather than restrictive.

Although various embodiments have been presented and explained using simplified examples, it will be understood that various changes and modifications are possible with regard to materials, shapes, and dimensions, without departure from the scope of the patent claims. The embodiments and preferred features described above should be considered exemplary, with the invention being defined by the appended claims, which therefore include all such alternatives, modifications, permutations and equivalents as fall within the true spirit and scope of the present disclosure.

What is claimed is:

1. A laser ablation analysis instrument operable to determine a quantitative elemental chemical composition of at least one of liquid phase and solid phase samples using laser induced breakdown spectroscopy, the instrument comprising:
   a movable stage operable to support the solid phase sample;
   a gas flow system operable to supply a stream of a carrier gas, and a nebulizer operable to aerosolize a portion of the liquid phase sample into the carrier gas to produce an aerosol jet comprising the portion of the liquid phase sample to perform laser induced breakdown of material from the liquid phase sample;
   a single laser operable to emit a plurality of individual laser light pulses less than 100 ns in duration within a time interval of one second wherein the pulses are operable to at least one of: be focused and ablate solid phase material from a site on the solid phase sample into a luminous plasma plume, and vaporize aerosolized liquid phase material proximate to a laser focus location in the aerosol jet into a luminous plasma plume;
   a moveable mirror operable to move to a first position where it does not intercept a first optical path from the single laser to a first plume location, and operable to move to an alternate second position in an alternate second optical path from the single laser to a second plume location, wherein the first plume location is a location selected from the group consisting of a location adjacent to the site on the solid phase material sample and the laser focus location in the aerosol jet, and the second plume location is the other member of said group;
   a detector coupled to a spectrometer, the spectrometer and detector being configured to receive electromagnetic radiation emanating from the plasma plume and to detect intensity and wavelength values of the electromagnetic radiation; and a computer operable to receive the wavelength and intensity values from the detector and spectrometer, and to determine a representation of a sample composition based on the received wavelength and intensity values;

wherein the instrument is operable to record the wavelength, the intensity values, and the representation of a sample composition in tangible media, and to display the quantitative elemental chemical composition of at least one of the liquid phase sample and solid phase sample.

2. An apparatus operable to analyze a composition of a liquid phase sample by aerosolizing a portion of the liquid sample and using laser induced ablation spectroscopy to analyze the aerosolized liquid sample portion, the apparatus comprising:

a laser operable to emit a plurality of individual laser light pulses less than 100 ns in duration within a time interval of one second, wherein each of the pulses is operable to be focused and produce a luminous plasma plume comprising a composition of liquid sample aerosol surrounding the focal point;

an aerosol jet source operable to receive a flow of a pressurized carrier gas and a flow of the liquid phase sample, and emanate an aerosol jet from an orifice of the aerosol jet source in a vertical direction selected from the group consisting of upward and downward vertical directions, wherein the aerosol jet contains the pressurized carrier gas and aerosol droplets no larger than 10 micrometers comprising the liquid sample portion, and the diameter of the aerosol jet diameter is less than 130 percent of the orifice diameter while flowing a distance of at least five orifice diameters from the orifice;

means for sending the plurality of individual laser light pulses along an optical path and directing each of the pulses to a preselected focal point above the orifice within the aerosol jet stream, wherein each of the pulses is operable to produce a luminous plasma plume comprising the composition of aerosolized liquid sample surrounding the focal point;

means for gathering light emanating from the luminous plasma plume into the proximal end of a fiber optic lightguide;

a fiber optic lightguide having a proximal end configured to receive the gathered light from the luminous plasma plume couple at least a portion of the light into a spectrometer from a distal end;

an optical spectrometer comprising a detector, configured to receive at least a portion of the gathered plasma plume light from the distal end of the fiber optic lightguide and detect intensity and wavelength values of the light;

a system computer comprising tangible media having data and instructions operable to receive a signal to analyze the composition of the liquid phase sample from a human interface, receive the wavelength and intensity values from the spectrometer, and determine a representation of the liquid phase sample composition based on the wavelength and intensity values;

means for capturing the entire portion of the liquid phase sample in the aerosol jet and removing said entire portion of liquid phase sample from the apparatus; and means for simultaneously supplying the flow of the pressurized carrier gas and the flow of the liquid phase sample material to the aerosol jet source.

3. The apparatus of claim 2 wherein: the vertical direction is upward, the aerosol jet diameter is less than 120 percent of the orifice diameter within a distance of at least 20 orifice diameters over the orifice, and the laser focal point position is less than 10 orifice diameters above the orifice.

4. The apparatus of claim 2 wherein the vertical direction is downward.

* * * * *